(12) United States Patent
Yamada et al.

(10) Patent No.: US 10,048,845 B2
(45) Date of Patent: Aug. 14, 2018

(54) MOBILE ELECTRONIC APPARATUS, DISPLAY METHOD FOR USE IN MOBILE ELECTRONIC APPARATUS, AND NON-TRANSITORY COMPUTER READABLE RECORDING MEDIUM

(71) Applicant: KYOCERA CORPORATION, Kyoto (JP)

(72) Inventors: Seiji Yamada, Yokohama (JP); Natsuhito Honda, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/294,449

(22) Filed: Oct. 14, 2016

(65) Prior Publication Data

US 2017/0123638 A1 May 4, 2017

(30) Foreign Application Priority Data

Oct. 28, 2015 (JP) .................................. 2015-211533

(51) Int. Cl.
*G06F 3/041* (2006.01)
*G06F 3/0484* (2013.01)
*G06F 3/0488* (2013.01)

(52) U.S. Cl.
CPC .......... *G06F 3/04845* (2013.01); *G06F 3/041* (2013.01); *G06F 3/04883* (2013.01)

(58) Field of Classification Search
CPC .... G06F 1/1626; G06F 3/0412; G06F 3/0414; G06F 3/044; G06F 3/048; G06F 3/041; G06F 3/04845; G06F 3/04883
See application file for complete search history.

(56) References Cited

U.S. PATENT DOCUMENTS

| 2006/0007178 A1* | 1/2006 | Davis ................. G06F 3/04886 345/173 |
| 2008/0163053 A1* | 7/2008 | Hwang ............... G06F 3/04886 715/702 |

(Continued)

FOREIGN PATENT DOCUMENTS

| JP | 2009-283013 | 12/2009 |
| JP | 2013-154206 | 8/2013 |

(Continued)

OTHER PUBLICATIONS

Official Action in Japanese Patent Application No. 2015-211533, dated Jan. 31, 2017, with Statement of Relevance of Non-English References, in 5 pages.

*Primary Examiner* — Hong Zhou
(74) *Attorney, Agent, or Firm* — Duane Morris LLP

(57) ABSTRACT

A mobile electronic apparatus comprises a display including a display area having a first edge and a second edge, an input unit including a detector, and at least one processor. The display displays a display screen on the display area. The detector detects an operation performed on the display area. The at least one processor places a mode change element adjacent to the first edge or the second edge of the display area, scales down the display screen in response to detection of a first operation performed on the mode change element, and displays the display screen, which is scaled down, as a scaled-down screen on a part of the display area. The at least one processor determines, in response to a user's input to the input unit, which one of the first edge and the second edge is to be adjacent to the mode change element.

19 Claims, 41 Drawing Sheets

(56) References Cited

U.S. PATENT DOCUMENTS

| | | | | |
|---|---|---|---|---|
| 2009/0042619 A1* | 2/2009 | Pierce | G02F 1/13338 | 455/566 |
| 2011/0060986 A1* | 3/2011 | Yang | G06F 3/04845 | 715/702 |
| 2011/0169749 A1* | 7/2011 | Ganey | G06F 1/1626 | 345/173 |
| 2011/0234487 A1* | 9/2011 | Hiramoto | G06F 1/1613 | 345/156 |
| 2012/0105424 A1* | 5/2012 | Lee | G09F 9/35 | 345/212 |
| 2013/0212535 A1* | 8/2013 | Kim | G06F 3/0482 | 715/841 |
| 2014/0111451 A1* | 4/2014 | Park | G06F 3/0488 | 345/173 |
| 2015/0012856 A1* | 1/2015 | Xia | G06F 3/04817 | 715/765 |
| 2015/0022471 A1* | 1/2015 | Kwak | G06F 1/3265 | 345/173 |
| 2015/0040027 A1* | 2/2015 | Cheng | G06F 3/0488 | 715/747 |
| 2015/0084885 A1* | 3/2015 | Kawamoto | G06F 3/0482 | 345/173 |
| 2015/0121262 A1* | 4/2015 | Yao | G06F 3/0484 | 715/765 |
| 2015/0149941 A1* | 5/2015 | Itagaki | G06F 3/04817 | 715/765 |
| 2015/0186040 A1* | 7/2015 | Yang | G06F 3/04886 | 345/173 |
| 2015/0205507 A1* | 7/2015 | Chen | G06F 3/048 | 715/800 |
| 2015/0242117 A1* | 8/2015 | Nakashima | G06F 3/04883 | 715/773 |
| 2015/0253955 A1* | 9/2015 | Chiba | G06F 3/04883 | 345/173 |
| 2016/0062619 A1* | 3/2016 | Reeve | G06F 3/021 | 715/773 |

FOREIGN PATENT DOCUMENTS

| | | |
|---|---|---|
| JP | 2014-002710 | 1/2014 |
| JP | 2014-179877 | 9/2014 |

* cited by examiner

F I G. 7 0
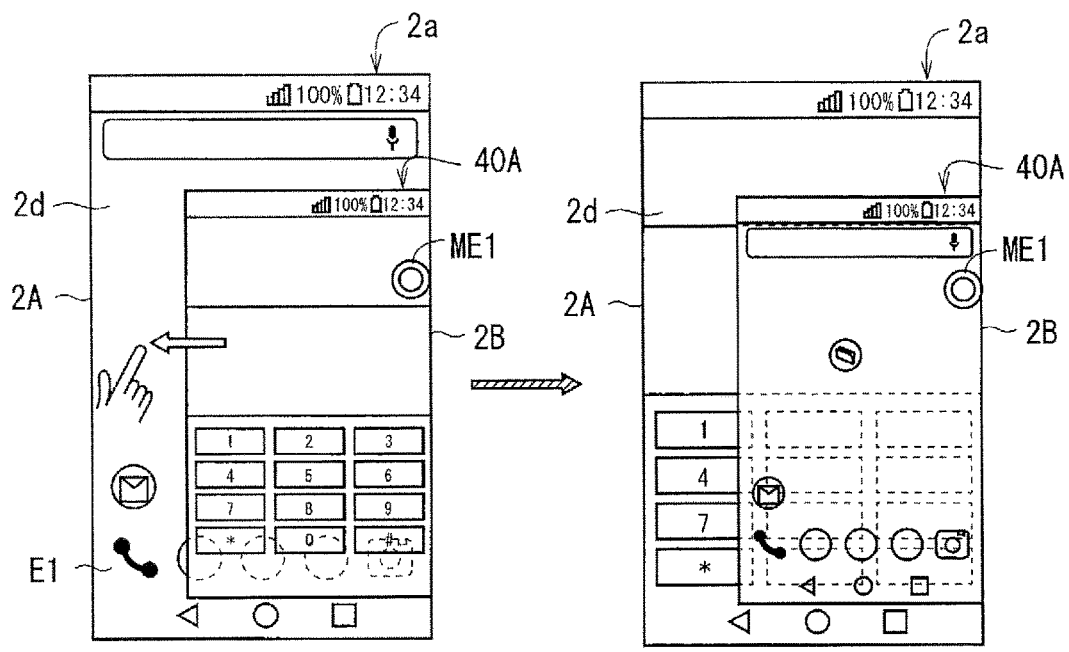

MOBILE ELECTRONIC APPARATUS, DISPLAY METHOD FOR USE IN MOBILE ELECTRONIC APPARATUS, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2015-211533, filed on Oct. 28, 2015, entitled "MOBILE ELECTRONIC APPARATUS AND DISPLAY METHOD FOR USE IN MOBILE ELECTRONIC APPARATUS". The content of which is incorporated by reference herein in its entirety.

FIELD

Embodiments of the present disclosure relate to mobile electronic apparatuses, a display method for use in mobile electronic apparatuses, and a non-transitory computer readable recording medium.

BACKGROUND

Mobile electronic apparatuses each including a display and a touch panel have conventionally been proposed. In such a mobile electronic apparatus, the display receives an operation performed by a user with a finger or the like, and the touch panel detects the received operation. The mobile electronic apparatus performs processing corresponding to the received operation.

SUMMARY

A mobile electronic apparatus, a display method for use in a mobile electronic apparatus, and a non-transitory computer readable recording medium are disclosed. In one embodiment, a mobile electronic apparatus comprises a display, an input unit, and at least one processor. The display includes a display area having a first edge. The display is configured to display a display screen on the display area. The input unit includes a detector configured to detect an operation performed on the display area. The at least one processor is configured to place a mode change element adjacent to the first edge or the second edge of the display area, scale down the display screen in response to detection of a first operation performed on the mode change element, and display the display screen, which is scaled down, as a scaled-down screen on a part of the display area. The at least one processor is configured to determine, in response to a user's input to the input unit, which one of the first edge and the second edge is to be adjacent to the mode change element.

In another embodiment, a display method for use in a mobile electronic apparatus comprises placing a mode change element adjacent to a first edge or a second edge of a display area, scaling down a display screen in response to detection of a first operation performed on the mode change element, and displaying the display screen, which is scaled down, as a scaled-down screen on a part of the display area. The display method also comprises determining, in response to a user's input to an input unit, which one of the first edge and the second edge is to be adjacent to the mode change element.

In another embodiment, a non-transitory computer readable recording medium is configured to store a control program so as to cause a mobile electronic apparatus to perform first and second steps below. In the first step, a mode change element is placed adjacent to a first edge or a second edge, a display screen is scaled clown in response to detection of a first operation performed on the mode change element, and the display screen, which is scaled down, is displayed as a scaled-down screen on a part of a display area. In the second step, in response to a user's input to the input unit, which one of the first edge and the second edge is to be adjacent to the mode change element is determined.

BRIEF DESCRIPTION OF THE DRAWINGS

FIG. 70 schematically illustrates an example of the state in which display contents on the background area and display contents on the scaled-down screen are interchanged with each other.

DETAILED DESCRIPTION

First Embodiment

Mobile Electronic Apparatus

External Appearance

Figure 1:
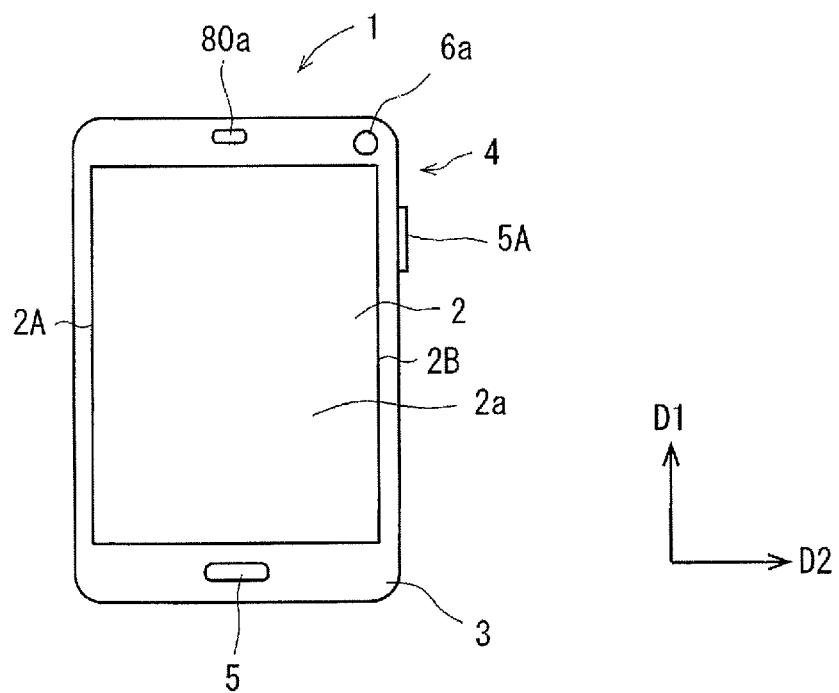
FIG. 1 illustrates a front view of an example of an overview of a mobile electronic apparatus.
Figure 2:
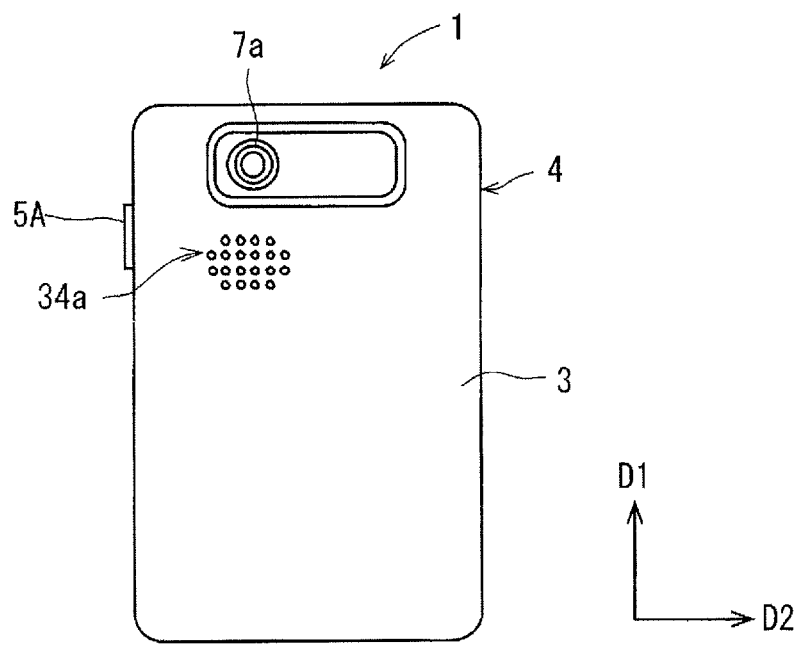
FIG. 2 illustrates a rear view of the example of the overview of the mobile electronic apparatus.

FIG. 1 illustrates an example of an overview of a mobile electronic apparatus 1 as viewed from the front side. FIG. 2 illustrates a rear view of an example of the overview of the mobile electronic apparatus 1. The mobile electronic apparatus 1 is, for example, a tablet, a personal digital assistant (PDA), a mobile phone (such as a smartphone), or a portable personal computer.

In the illustrations of FIGS. 1 and 2, the mobile electronic apparatus 1 includes a cover panel 2 and a case part 3. The combination of the cover panel 2 and the case part 3 forms a housing 4 (hereinafter also referred to as an "apparatus case") having, for example, an approximately rectangular plate shape in a plan view.

The cover panel 2, which may have an approximately rectangular shape in a plan view, is the portion other than the periphery in the front surface part of the mobile electronic apparatus 1. The cover panel 2 is made of, for example, transparent glass or a transparent acrylic resin. In some embodiments, the cover panel 2 is made of, for example, sapphire. Sapphire is a single crystal based on aluminum oxide ($Al_2O_3$). Herein, sapphire refers to a single crystal having a purity of $Al_2O_3$ of approximately 90% or more. The purity of $Al_2O_3$ is preferably greater than or equal to 99%, which provides a greater resistance to damage of the cover panel.

The cover panel 2 may be a multilayer composite panel (laminated panel) including a layer made of sapphire. For example, the cover panel 2 may be a double-layer composite panel including a layer (a sapphire panel) made of sapphire and located on the surface of the mobile electronic apparatus 1 and a layer (a glass panel) made of glass and laminated on the sapphire panel. The cover panel 2 may be a triple-layer composite panel including a layer (a sapphire panel) made of sapphire and located on the surface of the mobile electronic apparatus 1, a layer (a glass panel) made of glass and laminated on the sapphire panel, and another layer (another sapphire panel) made of sapphire and laminated on the glass panel. The cover panel 2 may also include a layer made of crystalline materials other than sapphire, such as diamond, zirconia, titania, crystal, lithium tantalite, and aluminum oxynitride.

The case part 3 forms the periphery of the front surface part, the side surface part, and the rear surface part of the mobile electronic apparatus 1. The case part 3 is made of, for example, a polycarbonate resin.

The front surface of the cover panel 2 includes a display area 2a on which various pieces of information such as characters, signs, graphics, or images are displayed. The display area 2a has, for example, a rectangular shape in a plan view. The periphery of cover panel 2 that surrounds the display area 2a is opaque because of, for example, a film laminated thereon, and thus, is a non-display part on which no information is displayed. On the rear surface of the cover panel 2 is laminated a touch panel 52, which will be described below. The user can provide various instructions to the mobile electronic apparatus 1 by performing operations on the display area 2a on the front surface of the mobile electronic apparatus 1 with, for example, a finger. Also, the user can provide various instructions to the mobile electronic apparatus 1 by performing operations on the display area 2a with an operator other than the finger, that is, for example, with a pen for electrostatic touch panels such as a stylus pen.

The apparatus case 4 houses, for example, at least one operation key 5. The individual operation key 5 is, for example, a hardware key and is located in, for example, the lower edge portion of the front surface of the cover panel 2. In the illustrations of FIGS. 1 and 2, examples of the operation key 5 include a power key 5A. The power key 5A is located in, for example, the side surface of the mobile electronic apparatus 1.

The touch panel 52 and the operation key 5 (including the power key 5A, hereinafter) are examples of an input unit used to perform an input to the mobile electronic apparatus 1. Various types of input operations, which will be described below, may be performed through the use of the touch panel 52 or the operation key 5.

In various embodiments, the input unit may be implemented using any input technology or device known in the art such as, for example, a QWERTY keyboard, a pointing device (e.g., a mouse), a joy stick, a stylus, a touch screen display panel, a key pad, one or more buttons, etc., or any combination of these technologies.

Electrical Configuration

Figure 3:
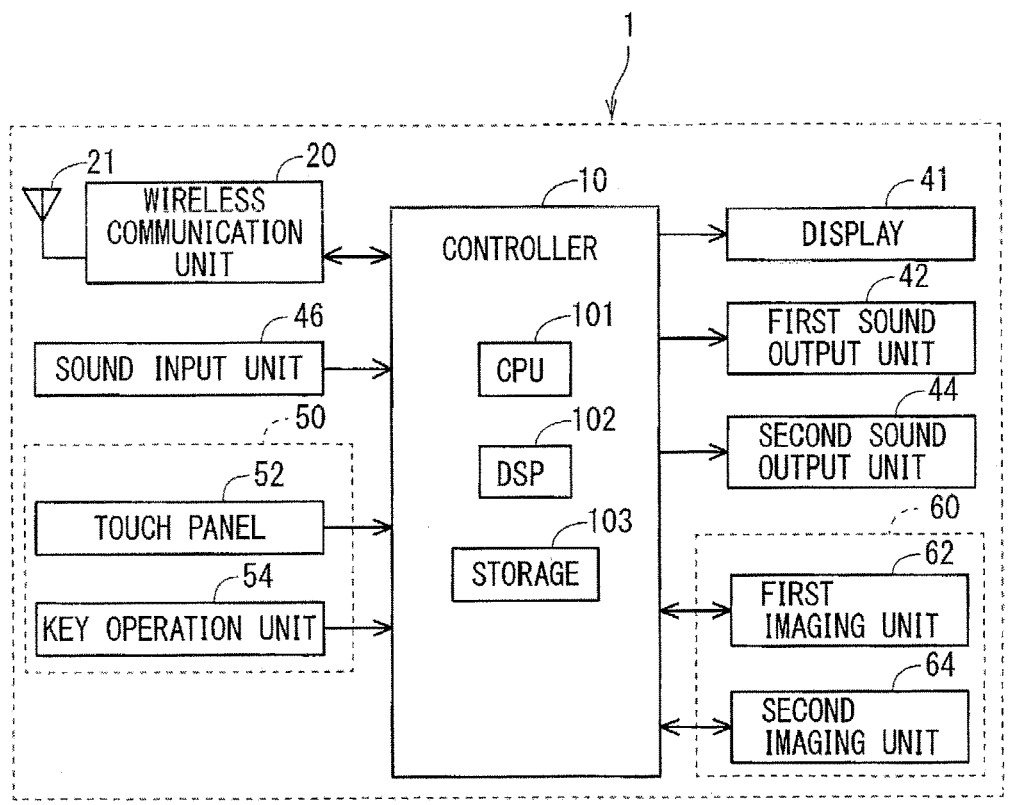
FIG. 3 schematically illustrates an example of an electrical configuration of the mobile electronic apparatus.

FIG. 3 illustrates a block diagram showing an electrical configuration of the mobile electronic apparatus 1. The mobile electronic apparatus 1 illustrated in FIG. 3 includes, for example, a controller 10, a wireless communication unit 20, a display 41, a first sound output unit (herein receiver) 42, a second sound output unit (herein speaker) 44, a sound input unit 46, the touch panel 52, a key operation unit 54, and an imaging unit 60. The apparatus case 4 houses these constituent elements of the mobile electronic apparatus 1.

The controller 10 includes, for example, a central processing unit (CPU) 101, a digital signal processor (DSP) 102, and a storage 103. The controller 10 can manage the overall action of the mobile electronic apparatus 1 by controlling other constituent elements of the mobile electronic apparatus 1. The storage 103 includes, for example, a read only memory (ROM) and a random access memory (RAM). The storage 103 can store, for example, a main program and a plurality of application programs (hereinafter also simply referred to as "applications"). The main program is a control program for controlling the action of the mobile electronic apparatus 1, specifically, the individual constituent elements of the mobile electronic apparatus 1 such as the wireless communication unit 20 and the display 41. The CPU 101 and the DSP 102 can execute various programs stored in the storage 103, so that various functions of the controller 10 are performed. Although one CPU 101 and one DSP 102 are illustrated in FIG. 3, a plurality of CPUs 101 and a plurality of DSPs 102 may be included in the controller 10. The CPUs 101 and the DSPs 102 may cooperate with one another to perform the various functions. Although the storage 103 is included in the controller 10 in the illustration of FIG. 3, the storage 103 may be located outside of the controller 10. That is to say, the storage 103 may be separated from the controller 10. All or some of the functions of the controller 10 may be performed by hardware.

The controller 10 may include at least one processor for providing control and processing capability to perform various functions as described in further detail below. In accordance with various embodiments, the at least one processor may be implemented as a single integrated circuit (IC) or as multiple communicatively coupled ICs and/or discrete circuits. It is appreciated that the at least one processor can be implemented in accordance with various known technologies.

In one embodiment, the processor includes one or more circuits or units configurable to perform one or more data computing procedures or processes. For example, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication unit 20 includes an antenna 21. The wireless communication unit 20 can receive a signal transmitted from another mobile electronic apparatus or a signal transmitted from a communication device such as a web server connected to the Internet through the antenna 21 via a base station or the like. The wireless communication unit 20 can amplify and down-convert the reception signal and then output a resultant signal to the controller 10. The controller 10 can, for example, demodulate the input reception signal. Further, the wireless communication unit 20 can up-convert and amplify a transmission signal generated by the controller 10 to wirelessly transmit the processed transmission signal through the antenna 21. The transmission signal from the antenna 21 is received, via the base station or the like, by another mobile electronic apparatus or a communication device connected to the Internet.

The display 41 is, for example, a liquid crystal display panel or an organic electroluminescent (EL) panel. The display 41 can receive, for example, a display signal indicating a display screen from the controller 10 and display the display screen. That is to say, the display 41 can display various pieces of information such as characters, signs, graphics, or images under the control of the controller 10. The information displayed on the display 41 is displayed on the display area 2a on the front surface of the cover panel 2. In other words, the display 41 displays information on the display area 2a. The display area 2a has an oblong shape elongated in a longitudinal direction D1.

The touch panel 52 is a detector that can detect an operation performed on the display area 2a of the cover panel 2 with an operator such as a finger. The touch panel 52 is, for example, a projected capacitive touch detector and is attached to the rear surface of the cover panel 2. When the user performs an operation on the display area 2a of the cover panel 2 with an operator such as an operating finger, a signal corresponding to the operation is input from the touch panel 52 to the controller 10. The controller 10 can specify, based on the signal from the touch panel 52, the purpose of the operation performed on the display area 2a and perform processing appropriate to the purpose. The touch panel 52 may be a pressure-sensitive touch panel.

The touch panel 52 can detect a user's operation on the display area 2a of the display 41, and thus, it can be described that the touch panel 52 and the display 41 cooperate with each other to form an input unit. The touch panel 52 and the display 41 may be integrally formed. For example, a combination of the touch panel 52 and the display 41 may be formed by incorporating a touch sensor into each display element of the display panel. This configuration is employed in, for example, in-cell displays or on-cell displays. The combination of the touch panel 52 and the display 41 can be referred to as a touch-sensor-equipped display, regardless of whether the touch panel 52 and the display 41 are integrally formed.

The key operation unit 54 can detect press down operations performed on the individual operation key 5 by the user. The key operation unit 54 can determine whether the individual operation key 5 is pressed down. When the operation key 5 is not pressed down, the key operation unit 54 outputs, to the controller 10, a non-operation signal indicating that no operation is performed on the operation key 5. When the operation key 5 is pressed down, the key operation unit 54 outputs, to the controller 10, an operation signal indicating that an operation is performed on the operation key 5. The controller 10 can thus determine whether an operation is performed on the individual operation key 5.

The touch panel 52 and the operation key 5 function as an input unit 50 used to perform an input to the mobile electronic apparatus 1. Each operation key 5 can be used to perform the corresponding input through the touch panel 52, which will be described below.

The first sound output unit (e.g., the receiver) 42 can output a received sound and the like, and is, for example, a dynamic speaker. The receiver 42 can convert an electric sound signal from the controller 10 into a sound, and then output the sound. The sound is output from the receiver 42 to the outside through a receiver hole 80a in the front surface of the mobile electronic apparatus 1. The volume of the sound output from the receiver hole 80a is set to be lower than the volume of the sound output from the second sound output unit 44 through speaker holes 34a.

The receiver 42 may be replaced with a piezoelectric vibration element. The piezoelectric vibration element is controlled by the controller 10 and vibrates based on a sound signal. The piezoelectric vibration element is located on, for example, the rear surface of the cover panel 2. The vibrations of the piezoelectric vibration element based on the sound signal cause the cover panel 2 to vibrate. Thus, the vibrations of the cover panel 2 are transmitted as voice to a user's ear. In this configuration, the receiver hole 80a is not necessary.

The second sound output unit (e.g. the speaker) 44 is, for example, a dynamic speaker and can convert an electric sound signal from the controller 10 into a sound and then output the sound. The sound is output from the second sound output unit 44 to the outside through the speaker holes 34a in the rear surface of the mobile electronic apparatus 1. The volume of the sound output from the speaker holes 34a is set to be a degree such that the sound can be heard at a location apart from the mobile electronic apparatus 1. That is to say, the volume of the sound output from the second sound output unit (speaker) 44 is set to be higher than the volume of the sound output from the first sound output unit (the receiver 42 or the piezoelectric vibration element).

The sound input unit 46 is, for example, a microphone, and can convert a sound from the outside of the mobile electronic apparatus 1 into an electric sound signal and then output the electric sound signal to the controller 10. The sound from the outside of the mobile electronic apparatus 1 is taken into the mobile electronic apparatus 1 through a microphone hole in the front surface of the cover panel 2 and then is received by a microphone 46.

The imaging unit 60 includes, for example, a first imaging unit 62 and a second imaging unit 64. The first imaging unit 62 includes an imaging lens 6a and an image sensor. The first imaging unit 62 can capture a still image and video under the control of the controller 10. As illustrated in FIG. 1, the imaging lens 6a is located in the front surface of the mobile electronic apparatus 1. Thus, the first imaging unit 62 can capture an image of an object in front of the front surface (the cover panel 2) of the mobile electronic apparatus 1.

The second imaging unit 64 includes, for example, an imaging lens 7a and an image sensor. The second imaging unit 64 can capture a still image and video under the control of the controller 10. As illustrated in FIG. 2, the imaging lens 7a is located in the rear surface of the mobile electronic apparatus 1. Thus, the second imaging unit 64 can capture an image of an object in front of the rear surface of the mobile electronic apparatus 1.

How User Operates Mobile Electronic Apparatus

Figure 4:
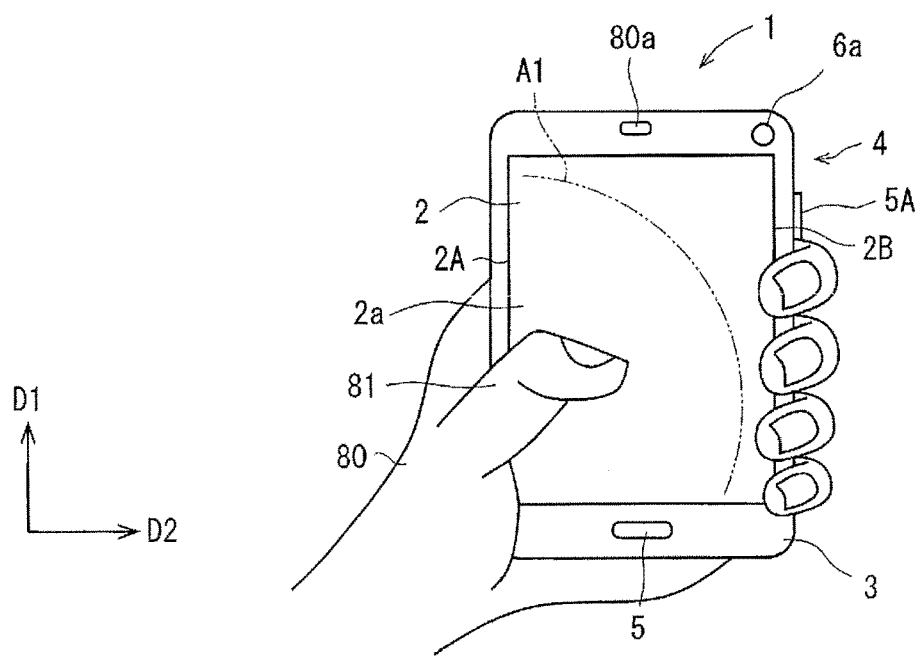
FIG. 4 schematically illustrates an example of the state in which the mobile electronic apparatus is held in a left hand.
Figure 5:
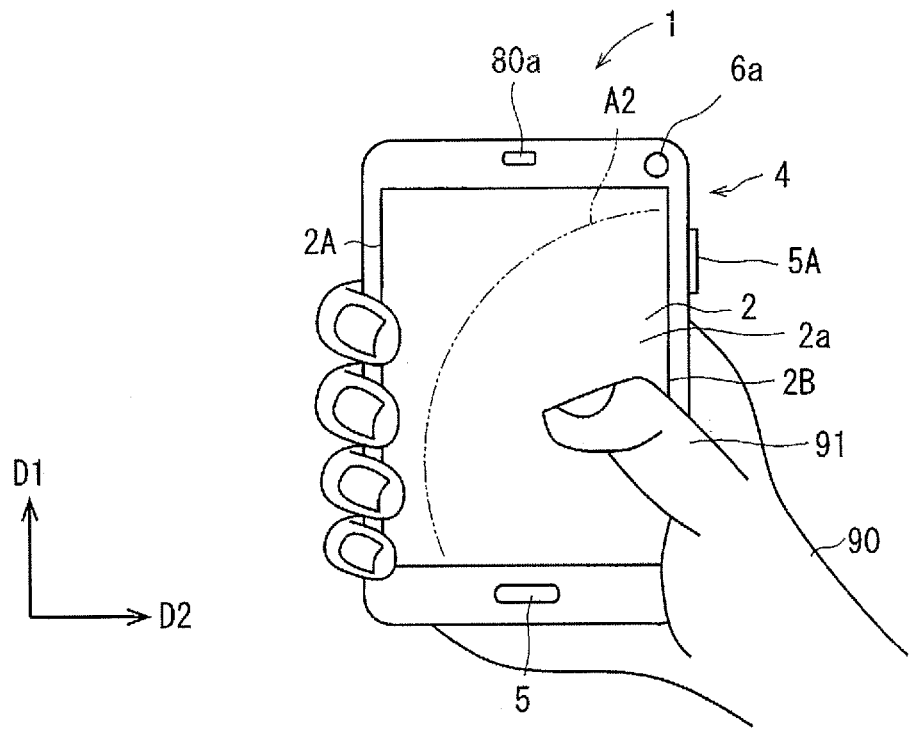
FIG. 5 schematically illustrates an example of the state in which the mobile electronic apparatus is held in a right hand.

FIGS. 4 and 5 illustrate examples of the state in which the user operates the mobile electronic apparatus 1. In the illustration of FIG. 4, the user holds the mobile electronic apparatus 1 in a left hand 80 and performs an operation on the display area 2a with a thumb 81 of the left hand 80. In the illustration of FIG. 5, the user holds the mobile electronic apparatus 1 in a right hand 90 and performs an operation on the display area 2a with a thumb 91 of the right hand 90. In the illustrations of FIGS. 4 and 5, the user holds the mobile electronic apparatus 1 in one hand, which bridges across the mobile electronic apparatus 1 along a transverse direction D2.

The edges of the display are 2a that are located side by side along the transverse direction D2 are hereinafter referred to as edges 2A and 2B. For example, the edges 2A and 2B both extend along the longitudinal direction D1 and face each other in the transverse direction D2. The edge 2A is located close to the thumb 81 when the mobile electronic apparatus 1 is held in the left hand 80 of the user.

As the size of the display area 2a increases, it becomes more difficult for the user, who is holding the mobile electronic apparatus 1 in one hand, to operate every part of the display area 2a. In the illustration of FIG. 4, the user can easily touch and operate, with the thumb 81 of the left hand 80, the area inside an imaginary arc A1 of a circle with the center at the base of the thumb 81. Conversely, it is difficult for the user to touch and operate, with the thumb 81, the area that is close to the edge 2B beyond the imaginary arc A1. Similarly, in the illustration of FIG. 5, the user can easily touch and operate, with the thumb 91 of the right hand 90, the area inside an imaginary arc A2 of a circle with the center at the base of the thumb 91. Conversely, it is difficult for the user to touch and operate, with the thumb 91, the area that is close to the edge 2A beyond the imaginary arc A2.

One embodiment therefore has an object to control the display screen displayed on the display area 2a, thereby enabling the user to easily operate the mobile electronic apparatus 1 with one hand. This will be described below in detail.

Controller

Figure 6:
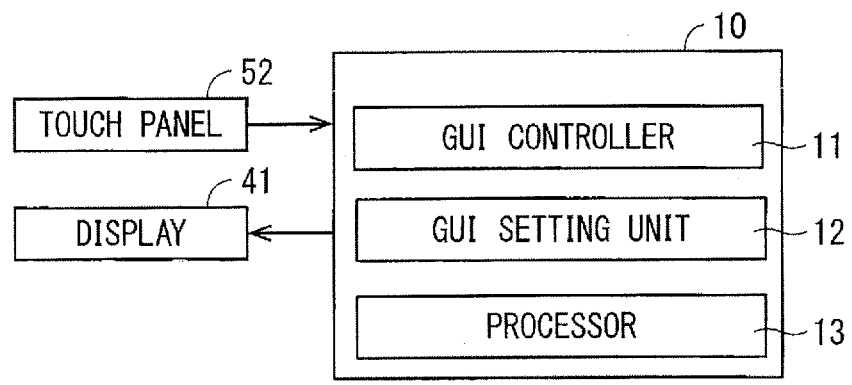
FIG. 6 schematically illustrates an example configuration of a controller.

FIG. 6 schematically illustrates an example configuration of the controller 10. The controller 10 includes a GUI controller 11, a GUI setting unit 12, and a processor 13. These functions may be performed by software. All or some of these functions may be performed by hardware.

The processor 13 can perform various functions of the mobile electronic apparatus 1. For example, the processor 13 can perform a keyguard processing for eliminating or reducing inadvertent operations on the mobile electronic apparatus 1, perform a lock processing for eliminating or reducing operations of an unauthorized outsider, and cause the display 41 to display an initial screen (hereinafter also referred to as a "home screen").

Figure 7:
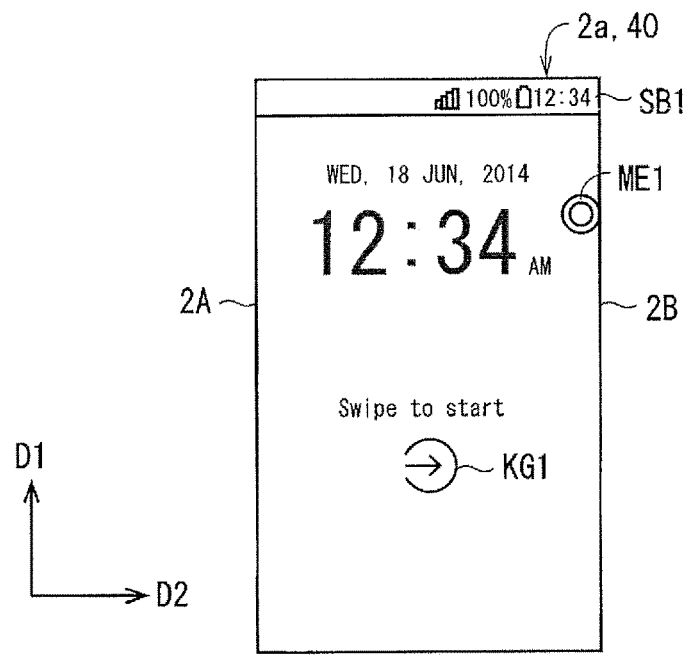
FIG. 7 schematically illustrates an example of a display area.

FIG. 7 schematically illustrates an example of a display screen 40 displayed on the display area 2a in response to the execution of the keyguard processing. The display screen is a screen for eliminating or reducing inadvertent operations on the mobile electronic apparatus 1 and is also referred to as a keyguard screen. Unless the keyguard screen is removed, a user's input to the mobile electronic apparatus 1 is restricted. The keyguard screen can be removed in response to a user's appropriate operation.

The display screen 40 illustrated in FIG. 7 shows, for example, a keyguard removing element KG1. The processor 13 can remove the keyguard screen in response to an appropriate operation performed on the keyguard removing element KG1. Such an appropriate operation is, for example, an operation of bringing an operator close to the keyguard removing element KG1 and then moving the operator in a predetermined direction (in the right direction on the paper plane), with the operator kept close to the keyguard removing element KG1. When being brought close to the element, the operator may be in close proximity to the display area 2a or may be in contact with the display area 2a. The operation is detected by the touch panel 52 and then is output to the processor 13.

The keyguard removing element KG1 may be a graphic symbol that can prompt the user to perform the operation mentioned above. For example, the keyguard removing element KG1 may include an arrow showing the user an appropriate operation direction or may include text describing how to perform the operation.

Figure 8:
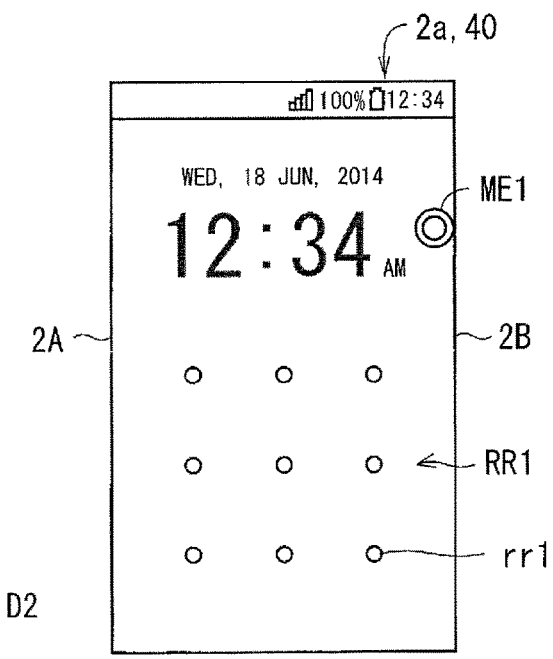
FIG. 8 schematically illustrates an example of the display area.

In response to an appropriate operation on the keyguard removing element KG1, the processor 13 ends the keyguard processing. When ending the keyguard processing, the processor 13 may execute, for example, the lock processing. FIG. 8 schematically illustrates an example of the display screen 40 at the execution of the lock processing. In response to an appropriate operation on the display screen 40 (the lock screen), the processor 13 can remove the lock screen. For example, the display screen 40 shows a removal pattern input element RR1. The removal pattern input element RR1 includes a plurality of points rr1. In the illustration of FIG. 8, nine points rr1 are arranged in a lattice pattern. The lock screen can be removed in repose to operations performed on predetermined points rr1 among the plurality of points rr1 in, for example, a predetermined order. These operations are detected by the touch panel 52 and then are output to the processor 13.

Figure 9:
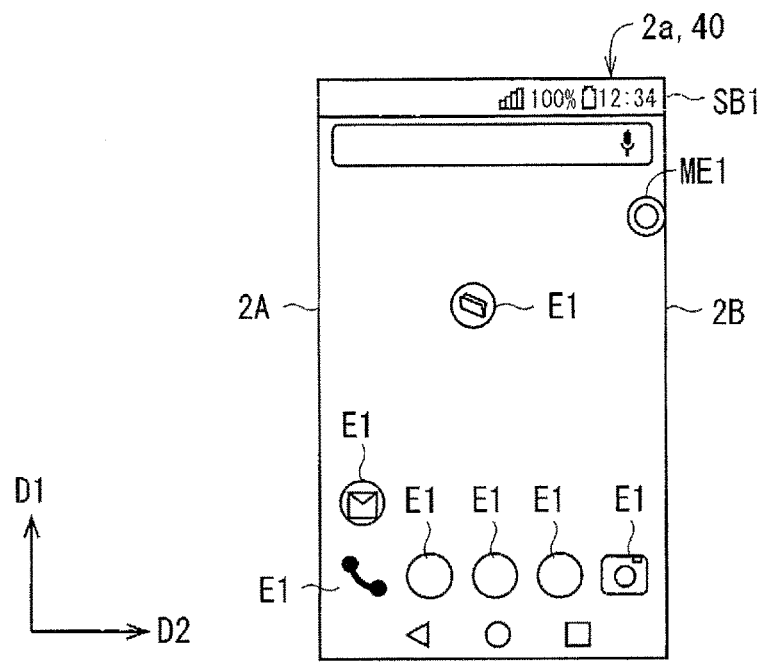
FIG. 9 schematically illustrates an example of the display area.

In response to appropriate operations on the removal pattern input element RR1, the processor 13 ends the lock processing. When ending the lock processing, the processor 13 may display, for example, the display screen 40, which is also referred to as the home screen, on the display area 2a. FIG. 9 schematically illustrates an example of the display screen 40. On the display screen 40 (the home screen), elements E1 (e.g., icons) for executing various applications are displayed. An operation on the individual element E1 is detected by the touch panel 52 and then is output to the processor 13. The processor 13 reads, from the storage 103, the application corresponding to the individual element E1 on which the operation has been performed and then executes the application. Various kinds of functions can be performed accordingly.

The GUI controller 11 can place and display a mode change element ME1 adjacent to the edge 2A or the edge 2B of the display area 2a. The mode change element ME1 can be displayed while any processing is performed by the processor 13. For example, the mode change element ME1 can be displayed on the display area 2a in any of FIGS. 7 to 9.

In the illustrations of FIGS. 7 to 9, the mode change element ME1 is displayed adjacent to the edge 2B. The user can easily touch the edge 2B with the thumb 91 of the right hand 90 and can easily operate the mode change element ME1 with the thumb 91 accordingly (see FIG. 5 as well). Unlike the mode change element ME1 displayed in the center of the display area 2a, the mode change element ME1 displayed adjacent to the edge 2B is less likely to interfere with displaying of other elements (e.g., the keyguard removing element KG1, the removal pattern input element RR1, and the elements E1). When a first operation is performed on the mode change element ME1, the first operation is detected by the touch panel 52 and then is output to the GUI controller 11. Examples of the first operation include an operation (a "tap operation") of bringing an operator close to the display area 2a and then moving the operator away from the display area 2a.

Figure 10:
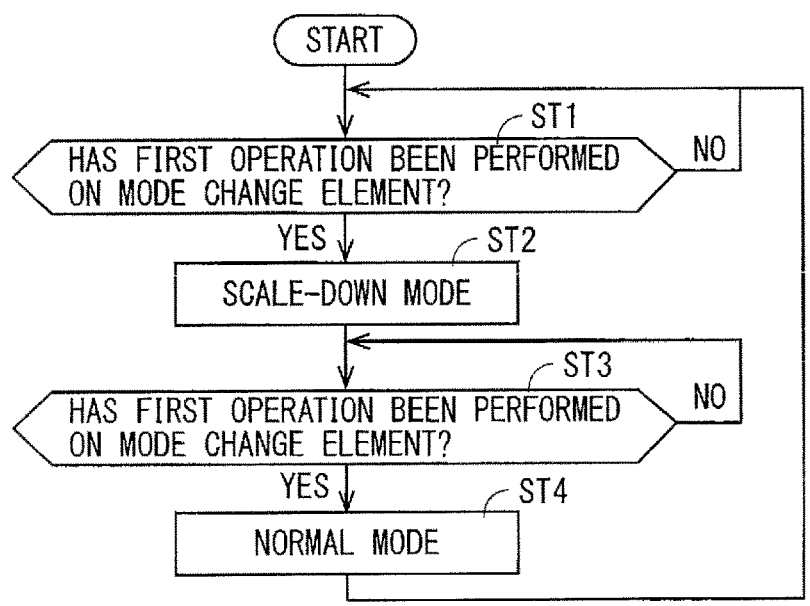
FIG. 10 illustrates a flowchart showing an example of a specific action of a GUI controller.
Figure 11:
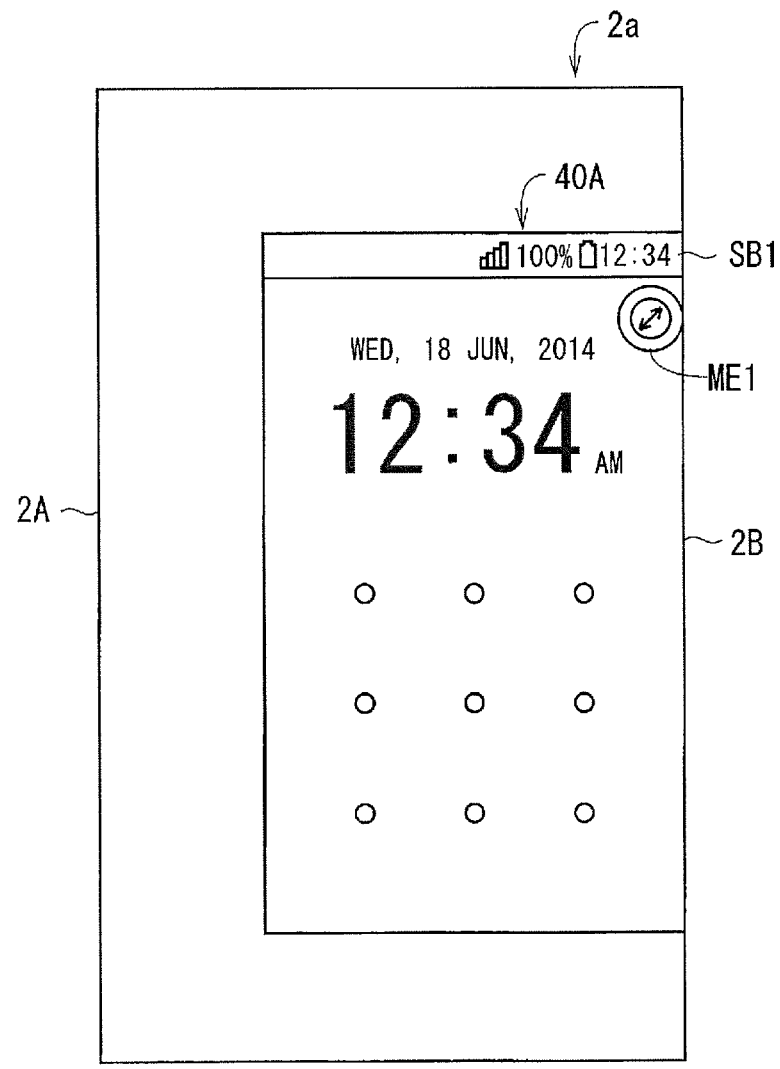
FIG. 11 schematically illustrates an example of the display area.

In response to the first operation, the GUI controller 11 can scale down the display screen 40 and display the resultant display screen 40, as a scaled-down screen 40A, on a part of the display area 2a. FIG. 10 illustrates a flowchart showing an example of an action of the GUI controller 11. FIG. 11 schematically illustrates an example of the display area 2a in which the scaled-down screen 40A is displayed.

Firstly, in Step ST1, the GUI controller 11 determines whether the first operation has been performed on the mode change element ME1. If determining that the first operation has not been performed on the mode change element ME1, the GUI controller 11 executes Step ST1 again. If determining that the first operation has been performed on the mode change element ME1, in Step ST2, the GUI controller 11 scales down the display screen 40 and then displays the resultant display screen 40, as the scaled-down screen 40A, on the display area 2a (see FIG. 11 as well). Here, the mode in which the scaled-down screen 40A is displayed is also referred to as a scale-down mode, and the mode in which the display screen 40 is displayed is also referred to as a normal mode.

As illustrated in FIG. 11, in the scale-down mode, the scaled-down screen 40A is displayed on a part of the display area 2a. The scaled-down screen 40A illustrated in FIG. 11 corresponds to the display screen 40 (the lock screen) illustrated in FIG. 8. That is to say, FIG. 11 illustrates an example of the display area 2a in which the mode change element ME1 shown in FIG. 8 is operated.

As illustrated in FIG. 11, the GUI controller 11 may display the scaled-down screen 40A, which is slid sideways on the display area 2a so as to adjoin one side of the display area 2a. In the illustration of FIG. 11, the scaled-down screen 40A is displayed so as to adjoin the edge 2B.

As described above, in the scale-down mode, the contents of the display screen 40 in the normal mode are displayed in the scaled-down screen 40A. In the illustration of FIG. 11, the scaled-down screen 40A is displayed so as to adjoin the edge 2B, so that the user can easily touch every part of the scaled-down screen 40A with the thumb 91 of the right hand 90. In this configuration, the user can readily perform an operation with the right hand 90. Naturally, when the scaled-down screen 40A is displayed so as to adjoin edge 2A, the user can easily touch every part of the scaled-down screen 40A with the thumb 81 of the left hand 80. In this configuration, the user can readily perform an operation with the left hand 80.

The mode change element ME1 in the scale-down mode may be displayed in the same position and the same size as the mode change element ME1 in the normal mode. Alternatively, similarly to the display screen 40, the mode change element ME1 may be displayed after being scaled down.

Referring back to FIG. 10, subsequent to Step ST2, the GUI controller 11 determines in Step ST3 whether the first operation has been performed on the mode change element ME1. If determining that the first operation has not been performed on the mode change element ME1, the GUI controller 11 executes Step ST3 again. If determining that the first operation has been performed on the mode change element ME1, in Step ST4, the GUI controller 11 scales up the scaled-down screen 40A and then displays the resultant display screen 40 on the display area 2a. That is to say, in response to the first operation on the mode change element ME1, the GUI controller 11 performs the switching between the normal mode and the scale-down mode.

The GUI setting unit 12 can determine, based on a user's input to the input unit 50, which one of the edge 2A and the edge 2B is to be adjacent to the display position of the mode change element ME1. A specific example of the setting method will be described below.

In the case where the user operates the mobile electronic apparatus 1 with the right hand 90, the mode change element ME1 may be set to be displayed adjacent to the edge 2B. The user can easily touch the mode change element ME1 displayed adjacent to the edge 2B with the thumb 91 of the right hand 90, and thus, can easily operate the mode change element ME1. Meanwhile, in the case where the user operates the mobile electronic apparatus 1 with the left hand 80, the mode change element ME1 may be set to be displayed adjacent to the edge 2A. The user can easily touch the mode change element ME1 displayed adjacent to edge 2A with the thumb 81 of the left hand 80, and thus, can easily operate the mode change element ME1.

Unlike the mode change element ME1 displayed in the center of the display area 2a, the mode change element ME1 displayed adjacent to the edge 2A or the edge 2B is less likely to interfere with displaying of other elements. The user can thus comfortably view the display screen and readily perform operations on other elements.

As illustrated in FIGS. 7 to 9 and FIG. 11, the graphic symbol representing the mode change element ME1 in the normal mode may be different from the graphic symbol representing the mode change element ME1 in the scale-down mode. In the normal mode in the illustrations of FIGS. 7 to 9, the mode change element ME1 is represented by a double circle. In the scale-down mode in the illustration of FIG. 11, the mode change element ME1 is represented by a double circle enclosing a diagonal double-headed arrow pointing down and to the left side of the paper plane and pointing up and to the right side of the paper plane.

In one embodiment mentioned above, the mode change element ME1 is displayed on the display area 2a in any of the illustrations of FIGS. 7 to 9. In some embodiments, the mode change element ME1 is placed neither on the keyguard screen nor on the lock screen, but the mode change element ME1 is placed on the home screen. In other words, the scale-down mode cannot be enabled while the keyguard screen or the lock screen is displayed. The mode change element ME1 may be displayed, as appropriate, on any screen that replaces the home screen.

Method for Setting Display Position of Mode Change Element ME1

Figure 12:
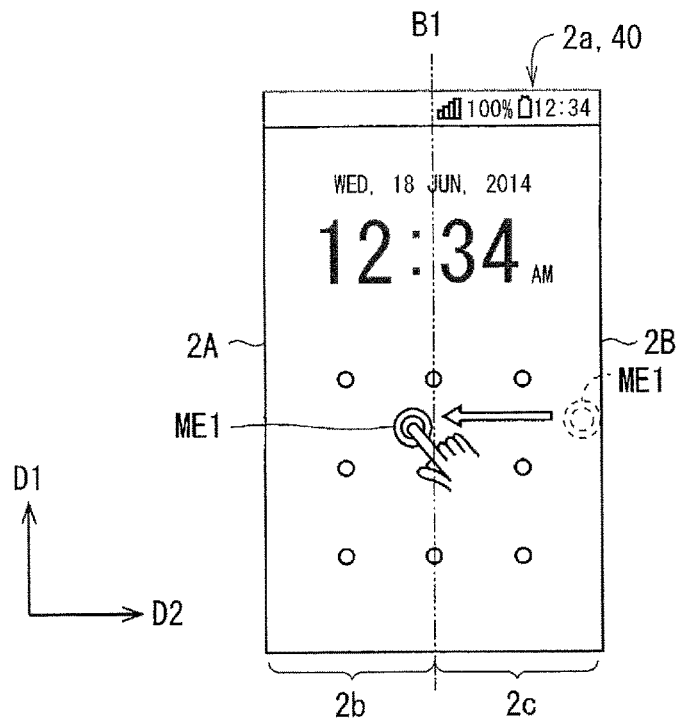
FIG. 12 schematically illustrates an example of the state in which the position of a mode change element is set.

The display position of the mode change element ME1 may be set (to the edge 2A or the edge 2B) as will be described below. As illustrated in FIG. 12, for example, an imaginary reference line B1 is provided to divide the display area 2a. In the illustration of FIG. 12, for example, a set of points located at an equal distance from the edge 2A and the edge 2B constitute the reference line B1. The reference line B1 extends in the longitudinal direction D1 of the display area 2a and divides the display area 2a in two equal parts located side by side along the transverse direction D2. The reference line B1 divides the display area 2a into a first area 2b and a second area 2c. The first area 2b extends from the reference line B1 to the edge 2A and the second area 2c extends from the reference line B1 to the edge 2B.

In response to a second operation on the first area 2b adjoined by the edge 2A, the GUI setting unit 12 can set the display position of the mode change element ME1 to the edge 2A. In response to the second operation on the second area 2c adjoined by the edge 2B, the GUI setting unit 12 can set the display position of the mode change element ME1 to the edge 2B. Performing the second operation means, for example, ending a drag operation on the mode change element ME1. A drag operation on the individual element refers to an operation of bringing an operator close to the element and then moving the operator in parallel with the display area 2a, with the operator kept close to the element. The element, which is the target for the drag operation, is displayed in a manner to follow the operator.

When the user performs a drag operation on the mode change element ME1 and then when the user ends the drag operation in the first area 2b, the GUI setting unit 12 can set the display position of the mode change element ME1 to the edge 2A. Similarly, when the user ends the drag operation in the second area 2c, the GUI setting unit 12 can set the display position of the mode change element ME1 to the edge 2B. This will be described below in further detail with reference to FIGS. 12 to 14.

Firstly, the GUI setting unit 12 accepts a drag operation performed on the mode change element ME1. As illustrated in FIG. 12, the user performs a drag operation on the mode change element ME1 displayed adjacent to the edge 2B and accordingly moves the mode change element ME1 toward the edge 2A. In the illustration of FIG. 12, a block arrow indicates the direction of the movement of the operator caused by the drag operation and broken lines indicate the mode change element ME1 on which the drag operation has not been performed yet. Also, FIG. 12 schematically illustrates an operating finger with which the drag operation is performed on the mode change element ME1. The mode change element ME1 is displayed in a manner to follow the operating finger.

Figure 13:
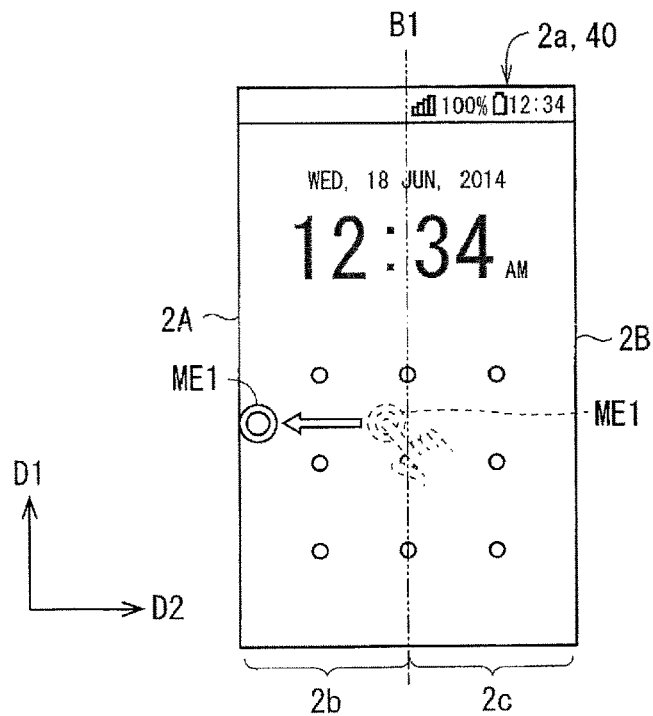
FIG. 13 schematically illustrates an example of the state in which the position of the mode change element is set.
Figure 14:
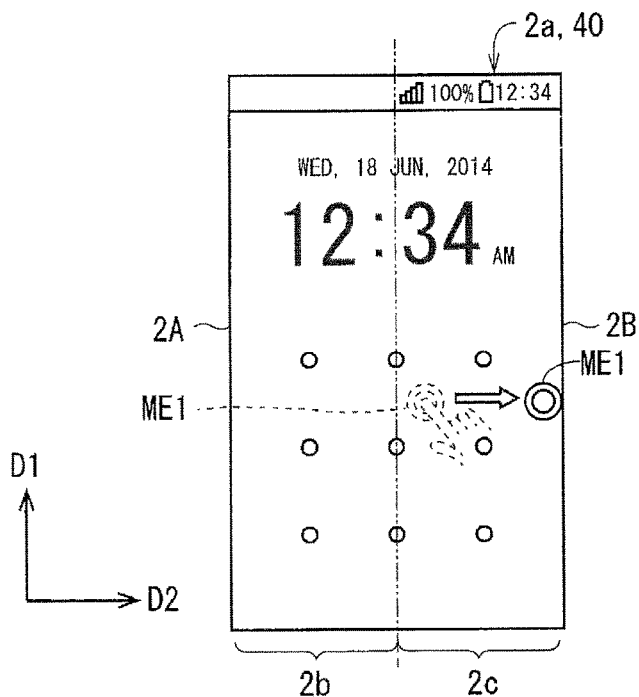
FIG. 14 schematically illustrates an example of the state in which the position of the mode change element is set.

Then, the user ends the drag operation in the first area 2b (see FIG. 13 as well). The user ends the drag operation by moving the operating finger away from the display area 2a. That is to say, the user releases the operating finger from the first area 2b and moves the finger away from the display area 2a. In the illustration of FIG. 13, broken lines indicate the mode change element ME1 and the operating finger at the instant preceding the end of the drag operation. The position in which the drag operation has been ended is detected by the touch panel 52 and then is output to the GUI setting unit 12. Here, since the endpoint of the drag operation is located in the first area 2b, the GUI setting unit 12 sets the display position of the mode change element ME1 to the edge 2A. The GUI controller 11 accordingly displays the mode change element ME1, which is located adjacent to the edge 2A. In the illustration of FIG. 13, a block arrow indicates that the mode change element ME1 has moved toward the edge 2A in response to the end of the drag operation.

When the drag operation on the mode change element ME1 is ended in the second area 2c (see FIG. 14), the GUI setting unit 12 sets the display position of the mode change element ME1 to the edge 2B. Similarly to the above, in the illustration of FIG. 14, broken lines indicate the mode change element ME1 and the operating finger at the instant preceding the end of the drag operation and a block arrow indicates that the mode change element ME1 has moved toward the edge 2B in response to the end of the drag operation. The GUI controller 11 accordingly displays the mode change element ME1, which is located adjacent to the edge 2B.

Figure 15:
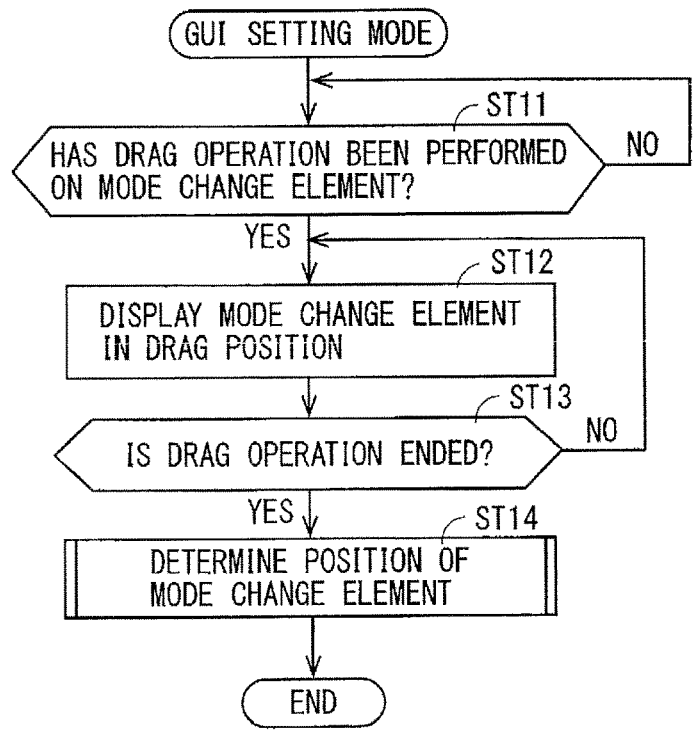
FIG. 15 illustrates a flowchart showing an example of a specific action of a GUI setting unit.

FIG. 15 illustrates a flowchart showing an example of the above-mentioned action of the GUI setting unit 12. Note that a "GUI setting mode", which is included in FIG. 15, will be described later. Firstly, in Step ST11, the GUI setting unit 12 determines whether a drag operation has been performed on the mode change element ME1. If determining that no drag operation has been performed, the GUI setting unit 12 executes Step ST11 again. If determining that a drag operation has been performed, in Step ST12, the GUI setting unit 12 displays the mode change element ME1 in such a manner that the mode change element ME1 follows the operating finger. Then, in Step ST13, the GUI setting unit 12 determines whether the drag operation is ended. If determining that the drag operation is not ended, the GUI setting unit 12 executes Step ST12 again.

Figure 16:
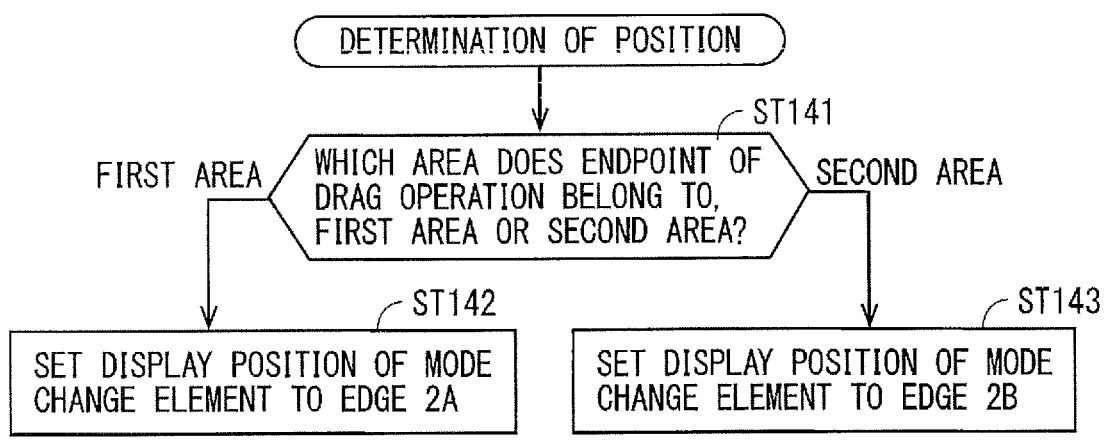
FIG. 16 illustrates a flowchart showing an example of a specific action of the GUI setting unit.

If determining that the drag operation is ended, in Step ST14, the GUI setting unit 12 determines the display position of the mode change element ME1 based on the endpoint of the drag operation. FIG. 16 illustrates a flowchart showing an example of the action in which the display position of the mode change element ME1 is determined based on the endpoint of the drag operation. In Step ST141, the GUI setting unit 12 determines in which of the first area 2b and the second area 2c the drag operation is ended. If determining that the drag operation is ended in the first area 2b, in Step ST142, the GUI setting unit 12 sets the display position of the mode change element ME1 to the edge 2A. That is to say, the mode change element ME1 is set to be displayed adjacent to the edge 2A. If determining that the drag operation is ended in the second area 2c, in Step ST143, the GUI setting unit 12 sets the display position of the mode change element ME1 to the edge 2B.

As described above, the user can set the display position of the mode change element ME1 to the edge 2A or to the edge 2B by performing the second operation (e.g., by ending a drag operation) on the first area 2b adjoined by the edge 2A or the second area 2c adjoined by the edge 2B. In this configuration, the user can intuitively perform an operation to set the display position of the mode change element ME1.

GUI Setting Mode

The mobile electronic apparatus 1 may have a mode (herein referred to as the "GUI setting mode") in which the setting associated with the mode change element ME1 is performed. The GUI setting unit 12 may enable the GUI setting mode when, for example, a third operation performed on the mode change element ME1 is detected. In the GUI setting mode, the GUI setting unit 12 can accept an input for determining which one of the edge 2A and the edge 2B is to be adjacent to the mode change element ME1. Conversely, the GUI setting unit 12 does not accept an operation for setting the display position of the mode change element ME1 while the GUI setting mode is disabled. Examples of the third operation, which is different from the first operation, include an operation (a "long tap operation") of keeping an operator close to the display area 2a for a predetermined period of time and then moving the operator away from the display area 2a. The predetermined period of time is set to be longer than the period of time over which the user performing a tap operation keeps the operator close to the display area 2a. Examples of the third operation also include several iterations of tap operations performed in a short period of time (e.g., a double tap operation).

Figure 17:
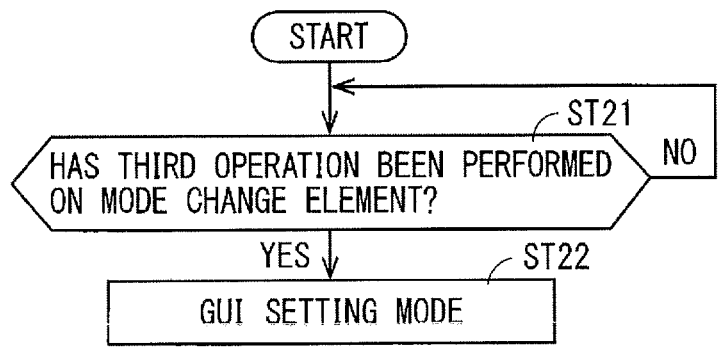
FIG. 17 illustrates a flowchart showing an example of a specific action of the GUI setting unit.

FIG. 17 illustrates an example of the above-mentioned action of the GUI setting unit 21. In Step ST21, the GUI setting unit 12 determines whether the third operation has been performed on the mode change element ME1. If determining that the third operation has not been performed, the GUI setting unit 12 executes Step ST21 again. In Step ST22, the GUI setting unit 12 enables the GUI setting mode. In the GUI setting mode, the GUI setting unit 12 accepts an operation for performing the setting associated with the mode change element ME1 (see, for example, FIGS. 12 to 16).

As described above, the display position of the mode change element ME1 cannot be set unless the GUI setting mode is enabled. In this configuration, the display position of the mode change element ME1 is less likely to be set by mistake in response to an inadvertent operation performed on the mode change element ME1.

The GUI setting mode may be disabled in response to the third operation performed on the mode change element ME1. That is to say, the switching between enabling and disabling the GUI setting mode may be performed in response to the third operation on the mode change element ME1.

In the above-mentioned embodiment, the GUI setting mode is enabled in response to the third operation performed on the mode change element ME1. In some embodiments, an element dedicated to enabling the GUI setting mode may be placed separately from the mode change element ME1. The dedicated element may be displayed on, for example, a setting screen (not shown) on which various types of setting associated with the mobile electronic apparatus 1 can be performed.

In some embodiments, the mode change element ME1 in the normal mode and the mode change element ME1 in the GUI setting mode may be represented by different graphic symbols. At a glance at the mode change element ME1, the user can tell whether the GUI setting mode is enabled.

In some embodiments, the user is allowed to perform, only while the GUI setting mode is enabled, various types of setting associated with the mode change element ME1 and various types of setting associated with the scaled-down screen 40A, which will be described below.

Display Position of Mode Change Element ME1 in Longitudinal Direction D1

Figure 18:
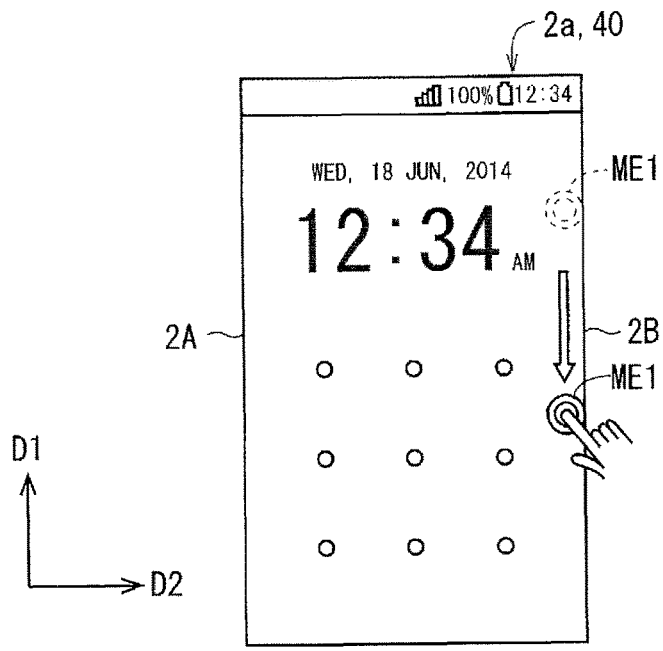
FIG. 18 schematically illustrates an example of the state in which the position of the mode change element is set.
Figure 19:
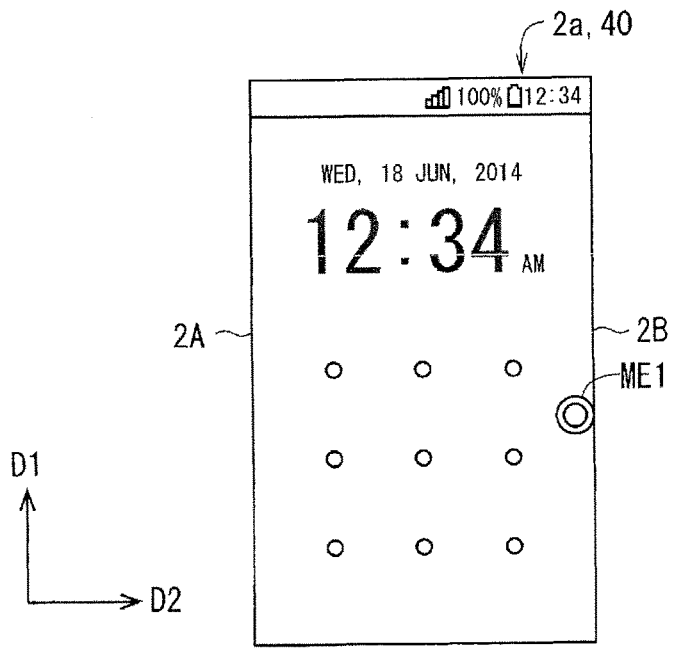
FIG. 19 schematically illustrates an example of the state in which the position of the mode change element is set.

The GUI setting unit 12 may set the display position of the mode change element ME1 in the longitudinal direction D1 in response to a user's input to the input unit 50. FIGS. 18 and 19 schematically illustrate examples of the state in which the display position of the mode change element ME1 in the longitudinal direction D1 is set. As described above, for example, the GUI setting unit 12 displays the mode change element ME1 in a such a manner that the mode change element ME1 follows a drag operation. In the illustration of FIG. 18, broken lines indicate the mode change element ME1 at the instant preceding the drag operation, and a block arrow indicates the direction of the movement of the operator caused by the drag operation. In the illustration of FIG. 18, the user moves the mode change element ME1 downward along the longitudinal direction D1. The user drags the mode change element ME1 to a desired point and then ends the drag operation. In other words, the user moves the operating finger away from the display area 2a. When the drag operation is ended, the GUI setting unit 12 sets the display position of the mode change element ME1 in the longitudinal direction D1. Specifically, the GUI setting unit 12 sets the above-mentioned display position to the position of the operating finger in the longitudinal direction D1 at the end of the drag operation. Then, the GUI controller 11 displays the mode change element ME1 in the set position. When the drag operation is ended at, for example, the point illustrated in FIG. 18, the mode change element ME1 is displayed in the endpoint of the drag operation (see FIG. 19). In this configuration, the user can end a drag operation at a desired point in the longitudinal direction D1, thereby setting the desired position to the display position of the mode change element ME1 in the longitudinal direction D1.

Figure 20:
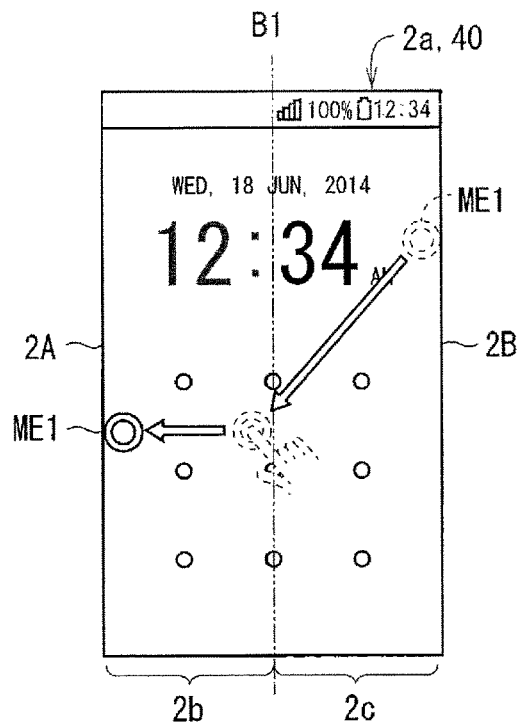
FIG. 20 schematically illustrates an example of the state in which the position of the mode change element is set.

The display position in the transverse direction D2 (the edge 2A or the edge 2B) and the display position in the longitudinal direction D1 may be both set in accordance with a drag operation performed on the mode change element ME1. FIG. 20 schematically illustrates an example of the state in which the display position of the mode change element ME1 is set. As illustrated in, for example, FIG. 20, the user performs a drag operation on the mode change element ME1 in a manner to move the mode change element ME1 in a slanting direction. In the illustration of FIG. 20, the mode change element ME1 displayed adjacent to the edge 2B is moved toward the lower left. Then, the drag operation is ended in the first area 2b. Since the drag operation is ended in the first area 2b, the GUI setting unit 12 sets the display position of the mode change element ME1 to the edge 2A. Also, the GUI setting unit 12 sets the display position of the mode change element ME1 in the longitudinal direction D1 to the endpoint of the drag operation in the longitudinal direction D1.

In this configuration, the display position of the mode change element ME1 in the transverse direction D2 and the display position of the mode change element ME1 in the longitudinal direction D1 can be both set in accordance with a continuous drag operation. This configuration can facilitate the setting.

Figure 21:
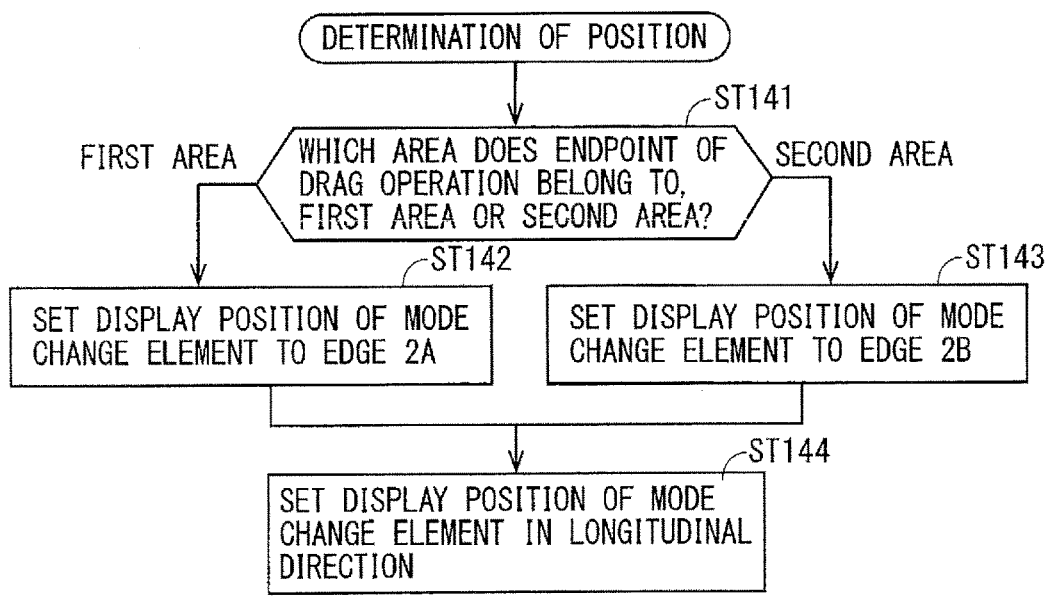
FIG. 21 illustrates a flowchart showing an example of a specific action of the GUI setting unit.

FIG. 21 illustrates a flowchart showing an example of the above-mentioned action of the GUI setting unit 12. In addition to the steps of FIG. 16, FIG. 21 includes Step ST144. Step ST144 is executed subsequently to, for example, Step ST142 or ST143. In Step ST144, the GUI setting unit 12 sets the display position of the mode change element ME1 in the longitudinal direction D1 to the endpoint of the drag operation in the longitudinal direction D1.

In the illustration of FIG. 21, Step ST144 may be executed prior to a set of steps including Steps ST141 to ST143.

No-Display of Mode Change Element

Figure 22:
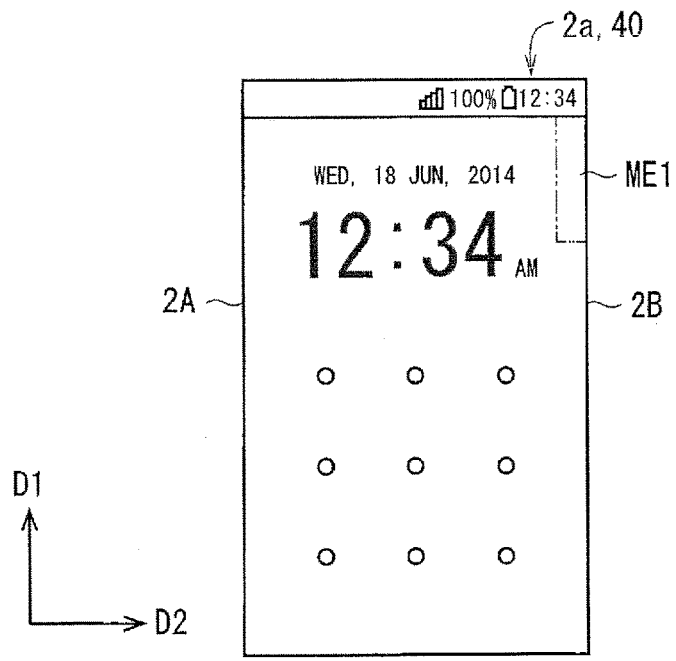
FIG. 22 schematically illustrates an example of the state in which the position of the mode change element is set.

In some embodiments, the GUI controller 11 places the mode change element ME1 on the display area but does not display it: There is no display of the mode change element ME1. FIG. 22 schematically illustrates an example of the display screen 40 in the configuration above. In the illustration of FIG. 22, an alternate long and two short dashes line indicates an imaginary area corresponding to the mode change element ME1. The alternate long and two short dashes line is not displayed on the actual display screen 40. In the illustration of FIG. 22, the area corresponding to the mode change element ME1 has, for example, a rectangular shape and extends along the longitudinal direction D1 so as to adjoin the edge 2B. In response to the first operation on the mode change element ME1, the GUI controller 11 scales down the display screen 40 and then display the resultant display screen 40 as the scaled-down screen 40A. That is to say, the scale-down mode is enabled.

Figure 23:
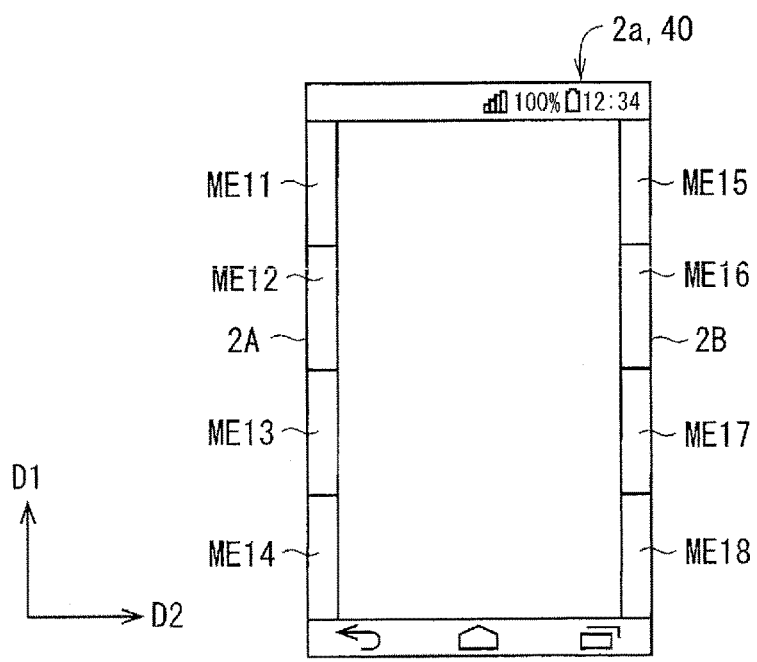
FIG. 23 schematically illustrates an example of the state in which the position of the mode change element is set.

The display position of the mode change element ME1 may be set in the following manner. FIG. 23 schematically illustrates an example of the display screen 40 on which the display position of the mode change element ME1 is to be set. The above-mentioned display screen 40 may be displayed when, for example, the GUI setting mode is enabled. That is to say, the GUI setting unit 12 displays the above-mentioned display screen 40 in response to, for example, the third operation (e.g., a long tap operation or a double tap operation) performed on the mode change element ME1.

As illustrated in FIG. 23, a plurality of candidate positions ME11 to ME18, each of which is a candidate position of the mode change element ME1 adjacent to the edge 2A or the edge 2B, are displayed on the display screen 40. In the illustration of FIG. 23, four candidate positions including the candidate positions ME11 to ME14 are arranged along the edge 2A from top to bottom of the paper plane in the stated order, and four candidate positions including the candidate positions ME15 to ME18 are arranged along the edge 2B from top to bottom of the paper plane in the stated order. The candidate positions ME11 to ME18 each have, for example, a rectangular shape extending along the longitudinal direction D1.

In response to an operation (e.g., a tap operation) on any of the candidate positions ME11 to ME18, the GUI setting unit 12 sets the position of the mode change element ME1 to the candidate position on which the operation is performed. The display position of the mode change element ME1 is set in this manner. In other words, the position of the mode change element is set to one of the plurality of candidate positions that is selected by the user through the use of the input unit 50.

As described above, the display position of the mode change element ME1 is set to one of the predetermined display positions (the candidate positions ME11 to ME18). Although eight candidate positions are displayed in the illustration of FIG. 23, the number of candidate positions may be changed as appropriate.

Figure 24:
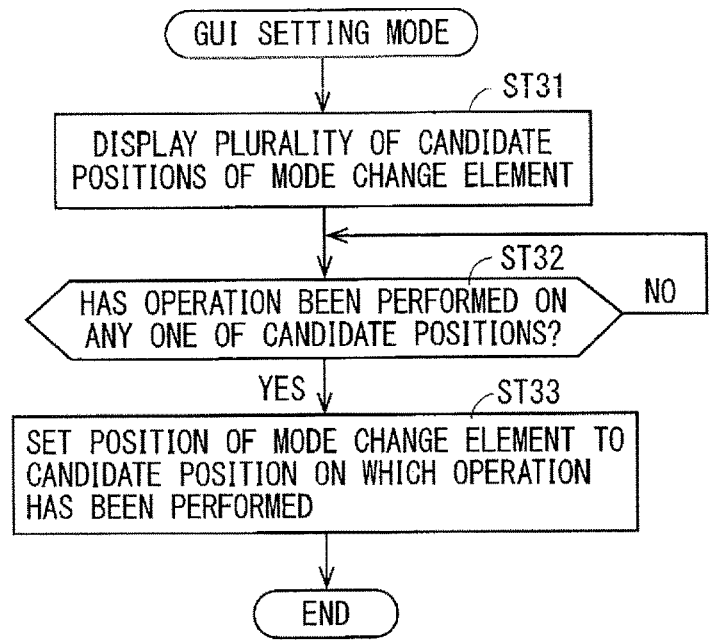
FIG. 24 illustrates a flowchart showing an example of a specific action of the GUI setting unit.

FIG. 24 illustrates a flowchart showing an example of the above-mentioned action of the GUI setting unit 12. In Step ST31, the GUI setting unit 12 displays, on the display area 2a, the plurality of candidate positions ME11 to ME18 of the mode change element ME1. Then, in Step ST32, the GUI setting unit 12 determines whether an operation has been performed on the individual candidate position. If determining that no such operation has been performed, the GUI setting unit 12 executes Step ST32 again. If determining that such an operation has been performed, in Step ST33, the GUI setting unit 12 sets the display position of the mode change element ME1 to the candidate position on which the operation has been performed.

Setting Display Position of Scaled-Down Screen 40A (to Edge 2A or Edge 2B)

The GUI setting unit 12 may set the display position of the scaled-down screen 40A in accordance with a user's input to the input unit 50. For example, the GUI setting unit 12 determines which one of the edge 2A and the edge 2B is to adjoin the scaled-down screen 40A. More specifically, the display position of the scaled-down screen 40A may be set in accordance with the display position of the mode change element ME1. In the case where the display position of the mode change element ME1 is set in response to the second operation (e.g., the end of a drag operation) on the first area 2b or the second area 2c, the display position of the scaled-down screen 40A is also set in response to the second operation on the first area 2b or the second area 2c. Specifically, the scaled-down screen 40A is set to be displayed so as to adjoin the edge 2A in response to the second operation performed on the first area 2b, and the scaled-down screen 40A is set to be displayed so as to adjoin the edge 2B in response to the second operation performed on the second area 2c.

In other words, the GUI controller 11 displays the scaled-down screen 40A adjoined by one of the edges which the mode change element ME1 is adjacent to.

The mode change element ME1 is set to be displayed adjacent to the edge 2A assuming that the user operates the mobile electronic apparatus 1 with the left hand 80. In this case, the scaled-down screen 40A is displayed so as to adjoin the edge 2A accordingly. The user can thus easily operate both the mode change element ME1 and the scaled-down screen 40A with the left hand 80. Similarly, the mode change element ME1 is set to be displayed adjacent to the edge 2B assuming that the user operates the mobile electronic apparatus 1 with the right hand 90. In this case, the scaled-down screen 40A is displayed so as to adjoin the edge 2B accordingly. The user can thus easily operate both the mode change element ME1 and the scaled-down screen 40A with the right hand 90.

Figure 25:
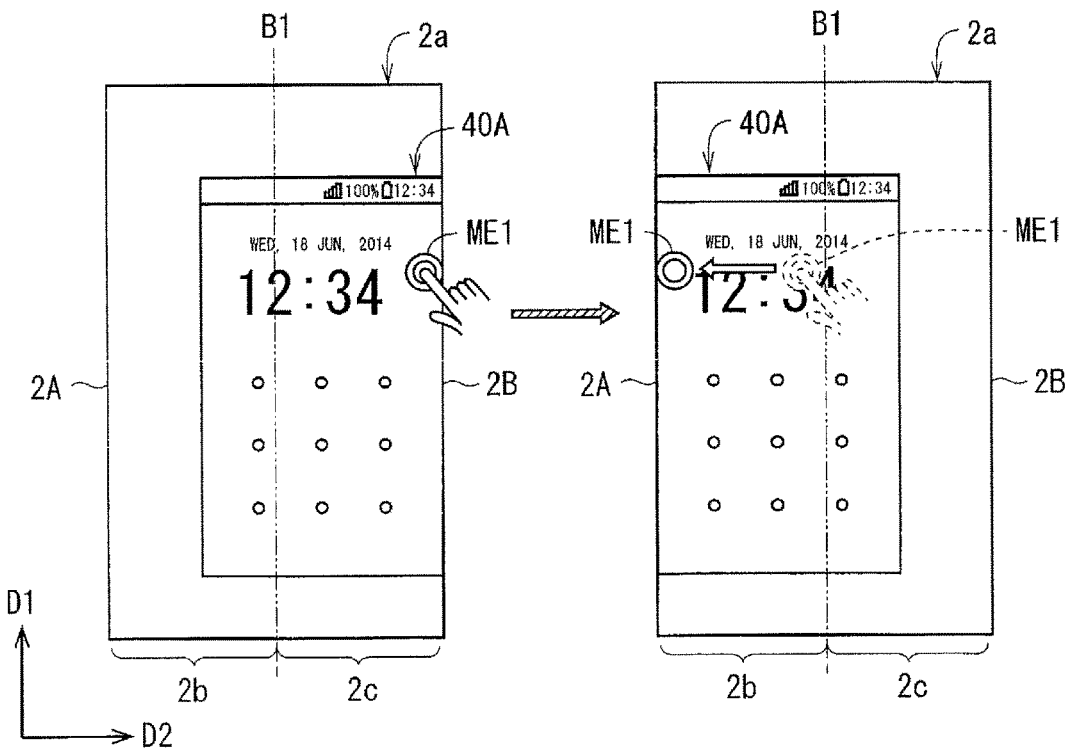
FIG. 25 schematically illustrates an example of the state in which the position of the mode change element and the position of a scaled-down screen are set.

FIG. 25 schematically illustrates an example of the state in which the display position of the scaled-down screen 40A is set (to the edge 2A or the edge 2B). In the illustration of FIG. 25, a hatched block arrow is sandwiched between two display areas 2a. This illustrates the transition of the display area 2a. The same holds true for other drawings.

In the illustration of FIG. 25, in the initial state, the mode change element ME1 is displayed adjacent to the edge 2B and the scaled-down screen 40A is displayed so as to adjoin the edge 2B accordingly (see the display area 2a illustrated on the left side in FIG. 25). Then, a drag operation or the like is performed on the mode change element ME1 displayed adjacent to the edge 2B, so that the mode change element ME1 is moved to the first area 2b. In the display area 2a illustrated on the right side in FIG. 25, broken lines indicate the operating finger and the mode change element ME1 moved to the first area 2b by the drag operation.

The GUI setting unit 12 may change the display position of the scaled-down screen 40A in accordance with the display position of the mode change element ME1 set by the drag operation. Specifically, when the mode change element ME1 is displayed on the first area 2b in response to a drag operation, the scaled-down screen 40A may be displayed so as to adjoin the edge 2A. When the mode change element ME1 is displayed on the second area 2c in response to a drag operation, the scaled-down screen 40A may be displayed so as to adjoin the edge 2B. In the display area 2a illustrated on the right side of the paper plane in FIG. 25, the mode change element ME1 is displayed on the first area 2b. In this case, the GUI setting unit 12 displays the scaled-down screen 40A adjoined by the edge 2A accordingly.

When the drag operation is ended in the first area 2b, the GUI setting unit 12 performs the setting based on the endpoint in such a manner that the mode change element ME1 is displayed adjacent to the edge 2A and the scaled-down screen 40A is displayed so as to adjoin the edge 2A.

Although not shown in the drawing, when the drag operation is ended in the second area 2c, the GUI setting unit 12 performs the setting based on the endpoint in such a manner that the mode change element ME1 is displayed adjacent to the edge 2B and the scaled-down screen 40A is displayed so as to adjoin the edge 2B.

Figure 26:
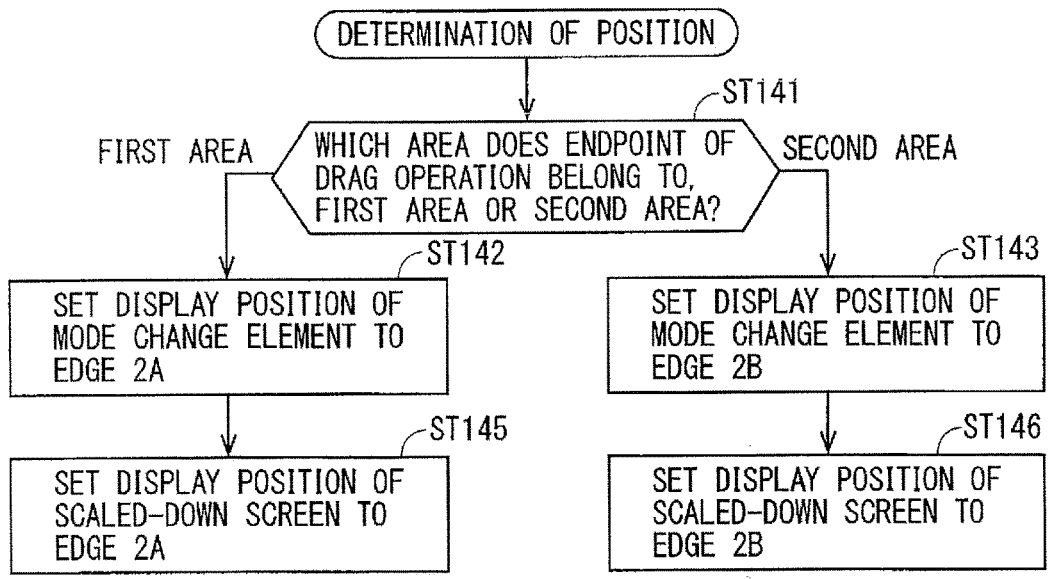
FIG. 26 illustrates a flowchart showing an example of a specific action of the GUI setting unit.

FIG. 26 illustrates a flowchart showing the above-mentioned action of the GUI setting unit 12. In addition to the steps of FIG. 16, FIG. 26 includes Steps ST145 and ST146. Step ST145 is executed subsequently to, for example, Step ST142. In Step ST145, the GUI setting unit 12 performs the setting in such a manner that scaled-down screen 40A is displayed so as to adjoin the edge 2A. Step ST146 is executed subsequently to, for example, Step ST143. In Step ST146, the GUI setting unit 12 performs the setting in such a manner that the scaled-down screen 40A is displayed so as to adjoin the edge 2B.

Steps S142 and ST145 may be executed in reverse order. Also, Steps ST143 and ST146 may be executed in reverse order. The position of the mode change element ME1 and the position of the scaled-down screen 40A, which are set in separate steps in the illustration of FIG. 26, may be set in the same step. In this case, the storage 103 or the like may store setting information with which the mode change element ME1 is displayed adjacent to the edge 2A and the scaled-down screen 40A is displayed so as to adjoin the edge 2A. The storage 103 or the like may also store setting information with which the mode change element ME1 is displayed adjacent to the edge 2B and the scaled-down screen 40A is displayed so as to adjoin the edge 2B.

Setting of Display Position of Scaled-Down Screen 40A in Longitudinal Direction

Figure 27:
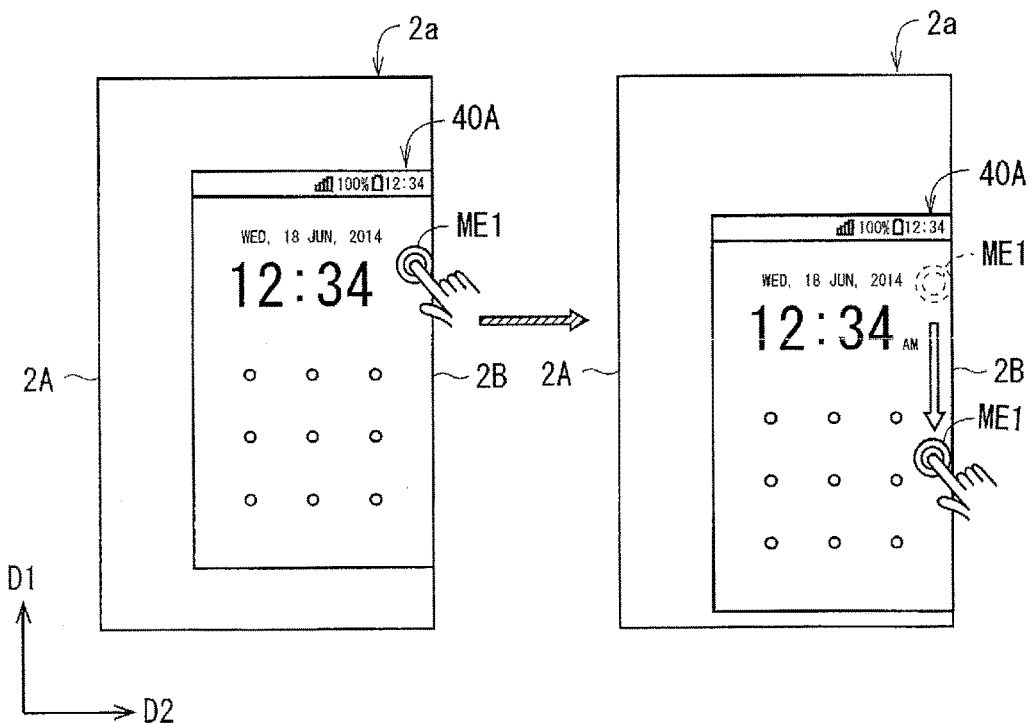
FIG. 27 schematically illustrates an example of the state in which the position of the mode change element and the position of the scale-down screen are set.

The GUI setting unit 12 may set the display position of the scaled-down screen 40A in the longitudinal direction D1 in accordance with the position of the mode change element ME1 in the longitudinal direction D1. FIG. 27 schematically illustrates an example of the state in which the display position of the scaled-down screen 40A in the longitudinal direction D1 is set. The display position of the scaled-down screen 40A in the longitudinal direction D1 may be set in response to, for example, a drag operation performed on the mode change element ME1. This will be described below in detail.

As described above, for example, the GUI setting unit 12 displays the mode change element ME1 in such a manner that the mode change element ME1 follows a drag operation performed on the mode change element ME1. For example, the user performs a drag operation on the mode change element ME1 to move the mode change element ME1 downward. In the display area 2a illustrated on the right side of the paper plane in FIG. 27, broken lines indicate the mode change element ME1 at the instant preceding the drag operation and an outlined block arrow indicates the direction of the movement of the operator caused by the drag operation.

Also, the GUI setting unit 12 displays the scaled-down screen 40A in such a manner that the scaled-down screen 40A moves along the longitudinal direction D1 to follow the movement of the mode change element ME1 in the longitudinal direction D1 caused by the drag operation. Specifically, when the mode change element ME1 is dragged downward along the longitudinal direction D1, the GUI setting unit 12 can accordingly move the scaled-down screen 40A downward. When the mode change element ME1 is dragged upward along the longitudinal direction D1, the GUI setting unit 12 can accordingly move the scaled-down screen 40A upward.

The user moves the mode change element ME1 and the scaled-down screen 40A to the desired position and then ends the drag operation. In other words, the user moves the operating finger away from the display area 2a. When the drag operation is ended, the GUI setting unit 12 sets the display position of the mode change element ME1 in the longitudinal direction D1 and also sets the display position of the scaled-down screen 40A in the longitudinal direction D1. Specifically, the display position of the scaled-down screen 40A in the longitudinal direction D1 is set to the position in which the scaled-down screen 40A is displayed at the end of the drag operation. As described above, the user can set the display position of the mode change element ME1 in the longitudinal direction D1 and the display position of the scaled-down screen 40A in the longitudinal direction D1 by ending a drag operation on the mode change element ME1 at a desired position. In this configuration, the display position of the mode change element ME1 in the longitudinal direction D1 and the display position of the scaled-down screen 40A in the longitudinal direction D1 can be set in conjunction with each other.

When the display position of the mode change element ME1 is set to the lower side of the display area 2a, it is conceivable that the lower side of the display area 2a is easier for the user to operate. Together with the display position of the mode change element ME1, the display position of the scaled-down screen 40A is set to the lower side accordingly. The user can thus cause not only the mode change element ME1 but also the scaled-down screen 40A to be displayed in a position which is easier to operate. Similarly, when the upper side of the display area 2a is easier for the user to operate, the user sets the display position of the mode change element ME1 to the upper side. Together with the display position of the mode change element ME1, the display position of the scaled-down screen 40A is set to the upper side accordingly. The user can thus cause not only the mode change element ME1 but also the scaled-down screen 40A to be displayed in the position which is easier to operate.

Figure 28:
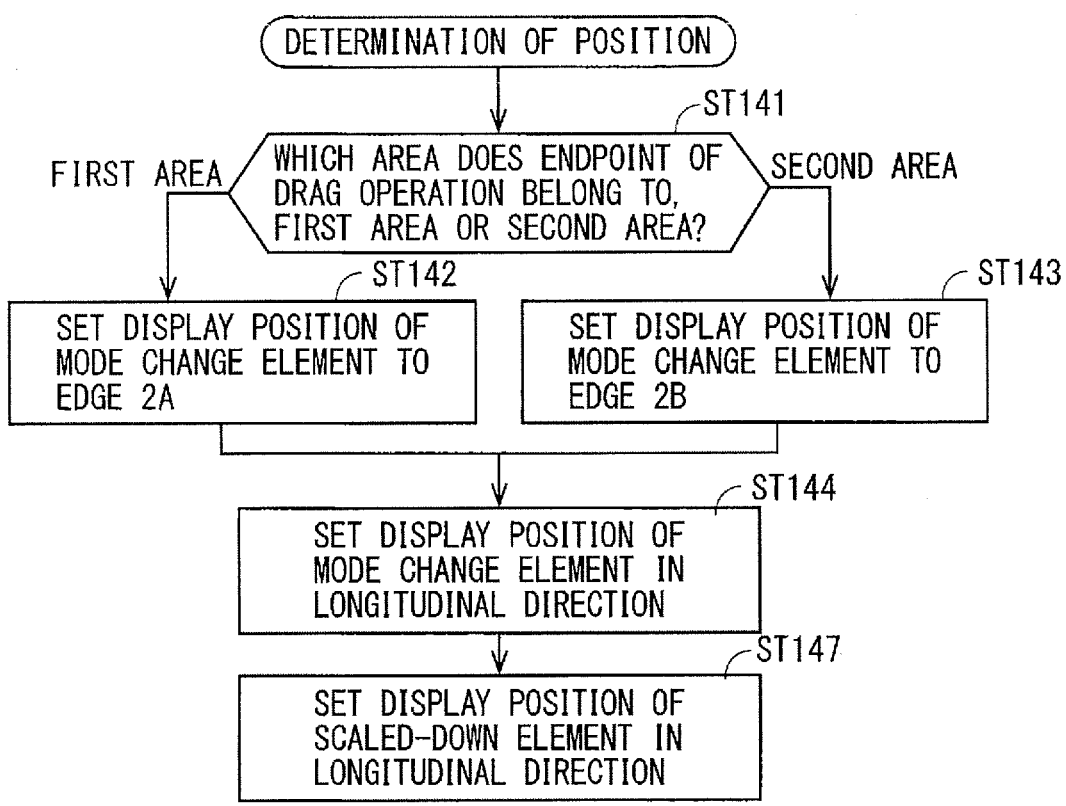
FIG. 28 illustrates a flowchart showing an example of a specific action of the GUI setting unit.

FIG. 28 illustrates a flowchart showing an example of the above-mentioned action of the GUI setting unit 12. In addition to the steps of FIG. 21, FIG. 28 includes Step ST147. Step ST147 is executed subsequently to, for example, Step ST144. In Step ST147, the GUI setting unit 12 sets the display position of the scaled-down screen 40A in the longitudinal direction D1 in the above-described manner based on the endpoint of the drag operation performed on the mode change element ME1.

The order of Step ST144, Step ST147, and a set of steps including ST141 to ST143 is not limited to the order of FIG. 28 and may be changed as appropriate.

The display position of the mode change element ME1 in the longitudinal direction D1 and the display position of the scaled-down screen 40A in the longitudinal direction D1 may be set in the following manner. For example, with reference to FIG. 29, an imaginary reference line Pmin is located closer to a lower edge 2C of display area 2a than an upper edge 2D of the display area 2a. The reference line Pmin is an imaginary line extending along the transverse direction D2. When the mode change element ME1 is located on the upper edge 2D side with respect to the reference line Pmin, the display position of the scaled-down screen 40A is set in accordance with the display position of the mode change element ME1 as described above. Specifically, the scaled-down screen 40A is moved closer to the lower side as the mode change element ME1 is moved closer to the lower side. When the mode change element ME1 is located on the reference line Pmin, the scaled-down screen 40A is located on the lowermost part of the display area 2a (see the display area 2a illustrated on the left side of the paper plane in FIG. 29.)

Figure 29:
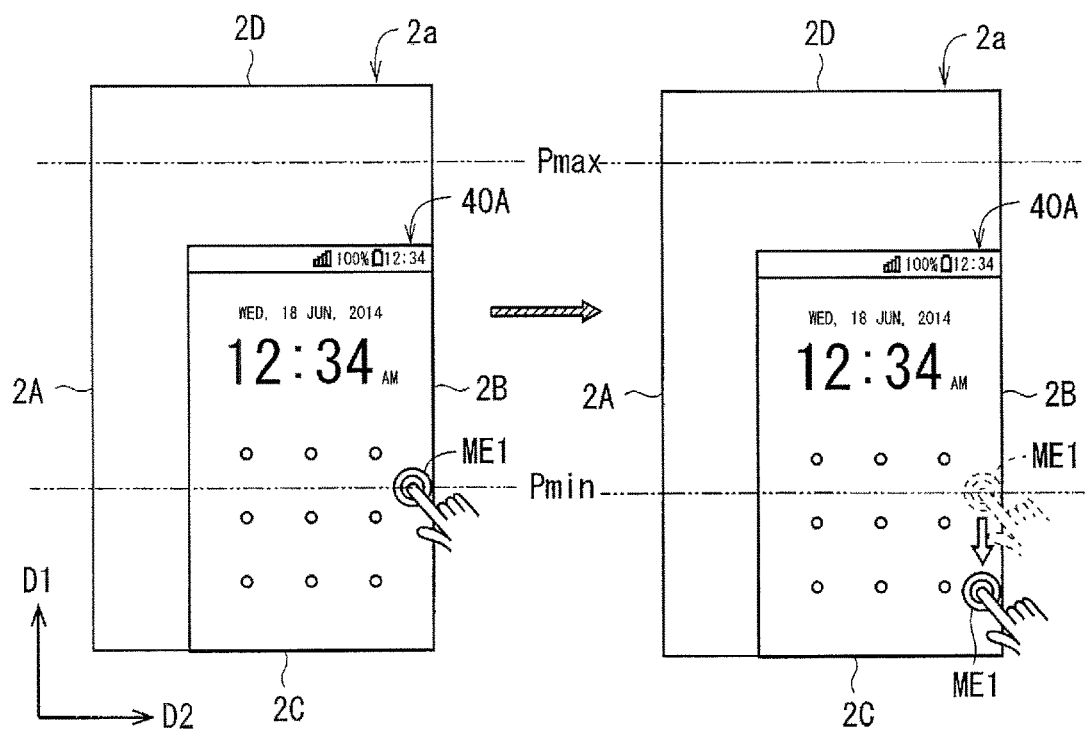
FIG. 29 schematically illustrates an example of the state in which the position of the mode change element and the position of the scaled-down screen are set.

When the mode change element ME1 is located on the lower edge 2C side with respect to the reference line Pmin (see the display area 2a illustrated on the right side of the paper plane in FIG. 29), the scaled-down screen 40A is located on a part of the display area 2a that is closest to the lower edge 2C, regardless of the position of the mode change element ME1. That is to say, when the mode change element ME1 is located above the reference line Pmin, the scaled-down screen 40A is moved downward in a manner to follow a downward movement of the mode change element ME1 caused by a drag operation. Once the mode change element ME1 is moved to the reference line Pmin such that the scaled-down screen 40A is located on the lowermost part, the scaled-down screen 40A is not moved downward any further when the mode change element ME1 is moved downward beyond the reference line Pmin.

An imaginary reference line Pmax may be located closer to the upper edge 2D of the display area 2a than the lower edge 2C of the display area 2a. When the mode change element ME1 is located below the reference line Pmax, the scaled-down screen 40A, the scaled-down screen 40A is moved upward in a manner to follow an upward movement of the mode change element ME1 caused by a drag operation. Once the mode change element ME1 is moved to the reference line Pmax such that the scaled-down screen 40A is located on the uppermost part, the scaled-down screen 40A is not moved upward any further when the mode change element ME1 is moved upward beyond the reference line Pmax.

Setting of Size of Scaled-Down Screen

Figure 30:
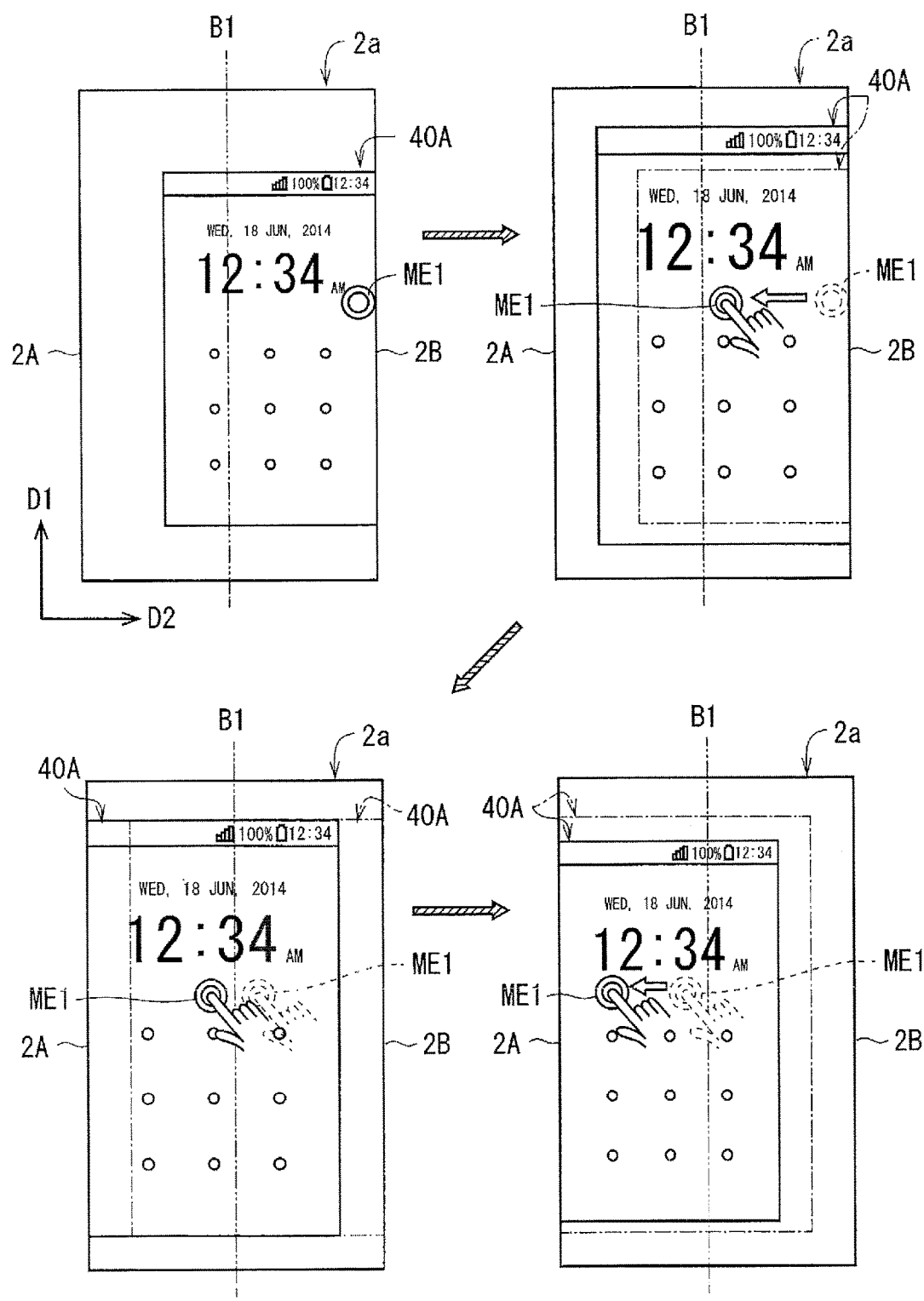
FIG. 30 schematically illustrates an example of the state in which the position of the mode change element, the position of the scaled-down screen, and the size of the scaled-down screen are set.

The GUI setting unit 12 may set the size of the scaled-down screen 40A in response to an input to the input unit 50. FIG. 30 schematically illustrates an example of the state in which the size of the scaled-down screen 40A is set. The size of the scaled-down screen 40A may be set in response to, for example, a drag operation performed on the mode change element ME1. This will be described below in detail.

As described above, for example, the GUI setting unit 12 displays the mode change element ME1 in a such manner that the mode change element ME1 follows a drag operation performed on the mode change element ME1. Also, the GUI setting unit 12 displays the scaled-down screen 40A in such a manner that the size of the scaled-down screen 40A is increased or reduced in accordance with the amount of movement of the mode change element ME1 in the transverse direction D2 caused by a drag operation. Specifically, the scaled-down screen 40A is displayed in increased size as the mode change element ME1 is moved closer to the reference line B1 along the transverse direction D2 in response to the drag operation. In the illustration of FIG. 30, as shown in the display area 2a on the upper left of the paper plane, the mode change element ME1 is initially displayed adjacent to the edge 2B. Then, as illustrated in the display area 2a of the upper right of the paper plane in FIG. 30, the mode change element ME1 is dragged toward the reference line B1. The GUI setting unit 12 displays the scaled-down screen 40A in increased size as the amount of the movement of the mode change element ME1 along the transverse direction D2 increases. In the display area 2a shown on the upper right of the paper plane in FIG. 30, an alternate long and short dash line indicates the outline of the scaled-down screen 40A in the original size.

When the mode change element ME1 is dragged toward the edge 2A beyond the reference line B1, the GUI setting unit 12 accordingly displays the scaled-down screen 40A adjoined by the edge 2A (see the display area 2a illustrated on the lower left of the paper plane in FIG. 30). That is to say, when a drag operation is performed in the first area 2b, the scaled-down screen 40A is displayed so as to adjoin the edge 2A. When a drag operation is performed in the second area 2c, the scaled-down screen 40A is displayed so as to adjoin the edge 2B. In the display area 2a illustrated on the lower left of the paper plane in FIG. 30, an alternate long and short dash line indicates the outline of the scaled-down screen 40A illustrated on the upper right of the paper plane in FIG. 30.

In this case as well, the size of the scaled-down screen 40A is increased as the mode change element ME1 is moved closer to the reference line B1. Conversely, the size of the scaled-down screen 40A is reduced as the mode change element ME1 is moved closer to the edge 2A in the first area 2b. In the display area 2a illustrated on the lower right of the paper plane in FIG. 30, an alternate long and short dash line indicates the outline of the scaled-down screen 40A illustrated on the lower left of the paper plane.

As described above, in response to a drag operation in the first area 2b, the size of the scaled-down screen 40A is changed while the scaled-down screen 40A is displayed so as to adjoin the edge 2A. In response to a drag operation in the second area 2c, the size of the scaled-down screen 40A is changed while the scaled-down screen 40A is displayed so as to adjoin the edge 2B.

When the user ends a drag operation, the GUI setting unit 12 sets the display position of the scaled-down screen 40A (to the edge 2A or the edge 2B) and sets the size of the scaled-down screen 40A based on the endpoint of the drag operation. Specifically, when the endpoint belongs to the first area 2b, the scaled-down screen 40A is displayed so as to adjoin the edge 2A. When the endpoint belongs to the second area 2c, the scaled-down screen 40A is displayed so as to adjoin the edge 2B. The size of the scaled-down screen 40A is set in such a manner that the size increases with decreasing distance between the endpoint and the reference line B1.

In this configuration, the display position of the scaled-down screen 40A (the edge 2A or the edge 2B) and the size of the scaled-down screen 40A can be set at the same time in response to a continuous drag operation.

According to the above-mentioned setting method, when the mode change element ME1 is located on the reference line B1, the size of the scaled-down screen 40A is maximized. When the mode change element ME1 is located adjacent to the edge 2A or the edge 2B, the size of the scaled-down screen 40A is minimized. For example, the maximum value and the minimum value of the size of the scaled-down screen 40A may be set in advance.

The size of the scaled-down screen 40A may be increased or reduced, in such a manner that the ratio between the length in the longitudinal direction D1 and the length in the transverse direction D2 (the aspect ratio of the scaled-down screen 40A) is changed accordingly. Alternatively, the aspect ratio may be fixed. For example, the size of the scaled-down screen 40A in the scale-down mode may be increased or reduced in such a manner that the aspect ratio of the display screen 40 in the normal mode (FIGS. 7 to 9) is maintained.

The scaled-down screen 40A may be resized in such a manner that the barycenter of the scaled-down screen 40A in the longitudinal direction D1 remains unchanged. When the scaled-down screen 40A is located on the lower part of the display area 2a, the scaled-down screen 40A may be resized to a larger extent toward the upper side and may be resized to a lesser extent toward the lower side.

Figure 31:
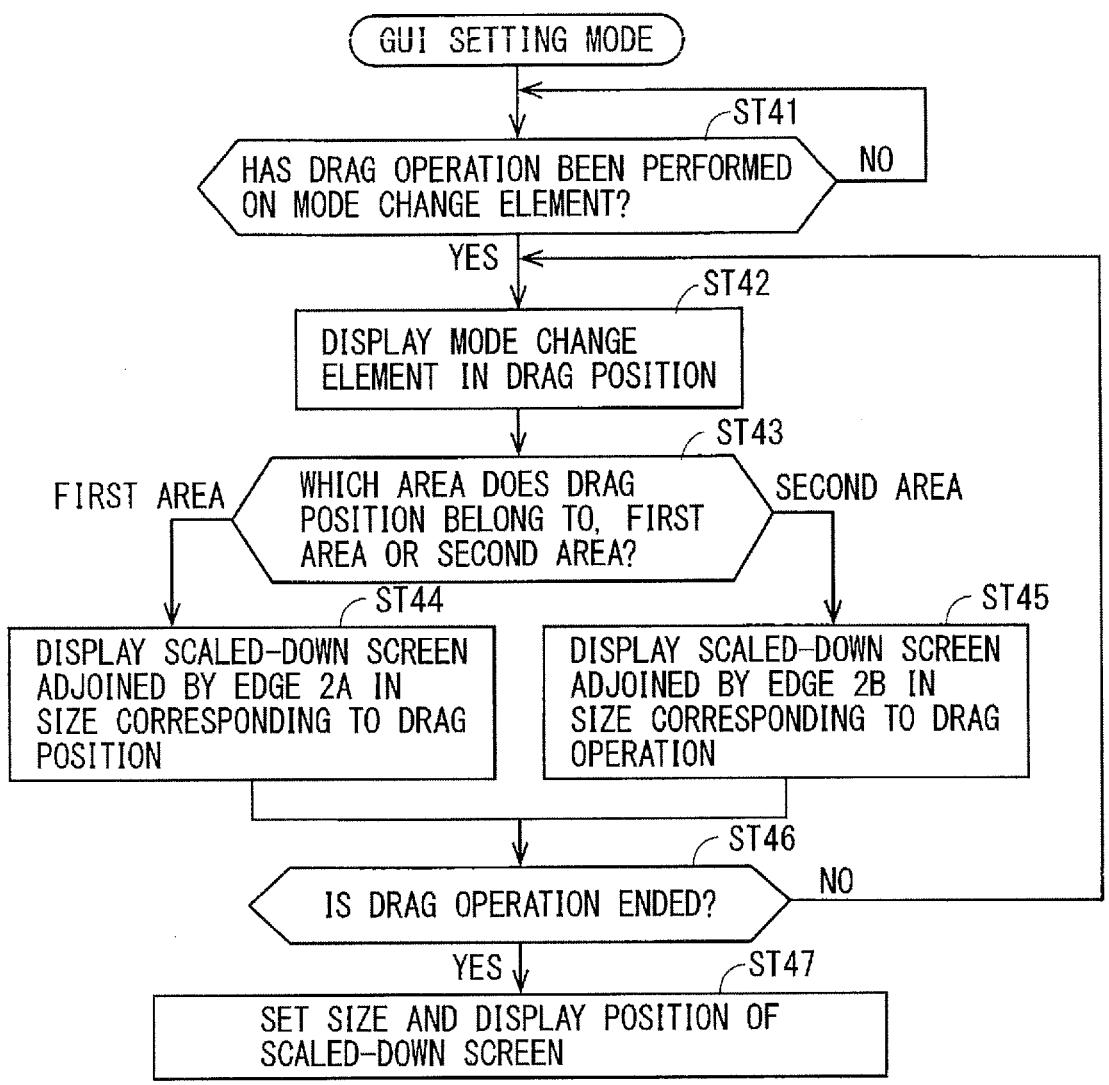
FIG. 31 illustrates a flowchart showing an example of a specific action of the GUI setting unit.

FIG. 31 illustrates a flowchart showing an example of the above-mentioned action of the GUI setting unit 12. In Step ST41, the GUI setting unit 12 determines whether a drag operation has been performed on the mode change element ME1. If determining that no drag operation has been performed, the GUI setting unit 12 executes Step ST41 again. If determining that a drag operation has been performed, in Step ST42, the GUI setting unit 12 displays the mode change element ME1 in such a manner that the mode change element ME1 follows the operating finger. Then, in Step ST43, the GUI setting unit 12 determines which one of the first area 2b and the second area 2c the position (hereinafter referred to as a drag operation position) of the operating finger, with which the drag operation is performed, belongs to. When the drag position belongs to the first area 2b, in Step ST44, the GUI setting unit 12 displays the scaled-down screen 40A adjoined by the edge 2A in the size corresponding to the drag position. The size of the scaled-down screen 40A increases with decreasing distance between the drag position and the reference line B1.

When the drag position belongs to the second area 2c, in Step ST45, the GUI setting unit 12 displays the scaled-down screen 40A adjoined by the edge 2B in the size corresponding to the drag position. The size of the scaled-down screen 40A increases with decreasing distance between the drag position and the reference line B1.

Subsequently to Step ST44 or ST45, the GUI setting unit 12 determines in Step ST46 whether the drag operation is ended. If determining that the drag operation is not ended, the GUI setting unit 12 executes Step ST42 again.

If determining in Step ST46 that the drag operation is ended, in Step ST47, the GUI setting unit 12 sets the size and the display position of the scaled-down screen 40A in accordance with the endpoint of the drag operation in the above-described manner.

When the mode change element ME1 is also moved in the longitudinal direction D1 in response to the drag operation, that is, when the mode change element ME1 is also moved in a slanting direction, the setting associated with the mode change element ME1 and the setting associated with the scaled-down screen 40A may be performed in the following manner. As described above, in accordance with the drag position in the transverse direction D2, the display position of the mode change element ME1 may be set (to the edge 2A or the edge 2B). Additionally, the display position of the scaled-down screen 40A may be set (to the edge 2A or the edge 2B) and the size of the scaled-down screen 40A may be set. Also, in accordance with the drag position in the longitudinal direction D1, the display position of the mode change element ME1 in the longitudinal direction D1 may be set and the display position of the scaled-down screen 40A in the longitudinal direction D1 may be set. For example, the display position of the mode change element ME1 and the display position of the scaled-down screen 40A may be moved downward as the drag position in the longitudinal direction D1 moved downward.

Second Embodiment

According to the description of the first embodiment, the display position of the mode change element ME1 is set in conjunction with the display position and/or the size of the scaled-down screen 40A in response to an operation performed on the mode change element ME1. Alternatively, when an operation is performed on the mode change element ME1, it may not be required that the display position of the mode change element ME1 be set in conjunction with the display position and/or the size of the scaled-down screen 40A.

The mobile electronic apparatus 1 may have, for example, an element setting mode in which the setting associated with the mode change element ME1 can be performed and a screen setting mode in which the setting associated with the scaled-down screen 40A can be performed. For example, the GUI setting unit 12 enables the element setting mode in response to a predetermined operation (e.g., a long tap operation) performed on the mode change element ME1 and enables the screen setting mode in response to another operation (e.g., a double tap operation) performed on the mode change element ME1. The operations on the mode change element ME1 for enabling the scale-down mode, the element setting mode, and the screen setting mode are different from one another. The following will describe the setting associated with the scaled-down screen 40A for the case where the screen setting mode is enabled.

In the illustration of, for example, FIG. 25, the display position of the scaled-down screen 40A in the transverse direction D2 is set (to the edge 2A or the edge 2B) in response to a drag operation performed on the mode change element ME1 as in the first embodiment. Note that, in the screen setting mode, the display position of the mode change element ME1 is not set. Assume that the drag operation is ended in the first area 2b as indicated by the broken lines in the display area 2a illustrated on the right side of the paper plane in FIG. 25. In contrast to FIG. 25, the mode change element ME1 is displayed in the position in which the mode change element ME1 was displayed just before the drag operation (here, the mode change element ME1 is displayed adjacent to the edge 2B).

In the illustration of, for example, FIG. 27, the display position of the scaled-down screen 40A in the longitudinal direction D1 is set in response to a drag operation performed on the mode change element ME1 as in the first embodiment. Note that, in the screen setting mode, the display position of the mode change element ME1 is not set. When the drag operation is ended, the mode change element ME1 is displayed in the position in which the mode change element ME1 was displayed just before the drag operation.

In the illustration of, for example, FIG. 30, the GUI setting unit 12 sets the size of the scaled-down screen 40A and sets the display position of the scaled-down screen 40A in the transverse direction D2 (to the edge 2A or the edge 2B) in response to a drag operation performed on the mode change element ME1 as in the first embodiment. Note that, in the screen setting mode, the display position of the mode change element ME1 is not set (to the edge 2A nor the edge 2B). Similarly to the above, when the drag operation in ended, the mode change element ME1 is displayed in the position in which the mode change element ME1 was displayed just before the drag operation.

Figure 32:
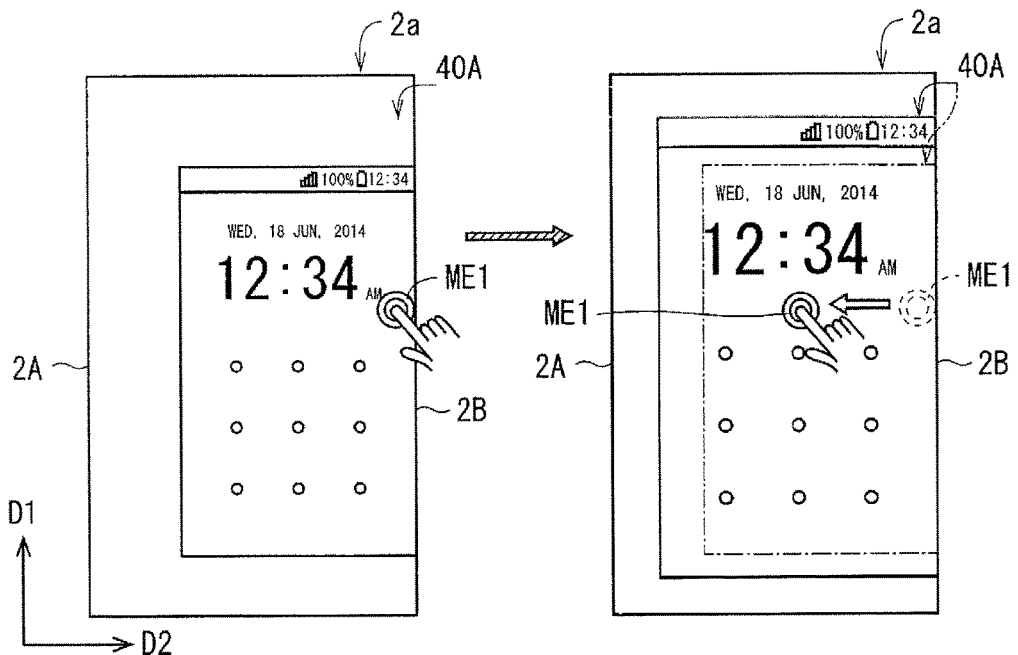
FIG. 32 schematically illustrates an example of the state in which the size of the scaled-down screen is set.

The size of the scaled-down screen 40A alone may be set in response to a drag operation performed on the mode change element ME1. FIG. 32 schematically illustrates an example of the state in which the size of the scaled-down screen 40A is set. The GUI setting unit 12 displays the scaled-down screen 40A in increased size or in reduced size corresponding to the amount of the movement of the mode change element ME1 in the transverse direction D2 caused by the drag operation. Specifically, the scaled-down screen 40A is displayed in increased size as the mode change element ME1 is dragged further along the transverse direction D2. In the illustration of FIG. 32, as shown in the display area 2a on the left side of the paper plane, the mode change element ME1 is initially displayed adjacent to the edge 2B. Then, as illustrated in the display area 2a on the right side of the paper plane, the mode change element ME1 is moved toward the edge 2A. The GUI setting unit 12 displays the scaled-down screen 40A in increased size corresponding to the amount of the movement of the mode change element ME1 along the transverse direction D2. In the illustration of FIG. 32, an alternate long and short dash line indicates the outline of the scaled-down screen 40A in the original size.

When obtaining the scaled-down screen 40A in the desired size, the user ends the drag operation. In other words, the user moves the operating finger away from the display area 2a. When the drag operation is ended, the GUI setting unit 12 sets the size of the scaled-down screen 40A. Specifically, the size of the scaled-down screen 40A is set to the size of the scaled-down screen 40A displayed at the end of the drag operation.

Third Embodiment

In the first and second embodiments, at least one of the display position and the size of the scaled-down screen 40A is set in response to an operation performed on the mode change element ME1. In one embodiment, at least one of the display position and the size of the scaled-down screen 40A is set in response to an operation different from the operation mentioned above.

Setting of Size of Scaled-Down Screen 40A

The GUI setting unit 12 may resize the scaled-down screen 40A in response to a fourth operation performed on a corner of the outline of the scaled-down screen 40A, which has a rectangular shape. Examples of the fourth operation include a drag operation. The GUI setting unit 12 may set the size of the scaled-down screen 40A based on the endpoint of the drag operation performed on the corner.

Figure 33:
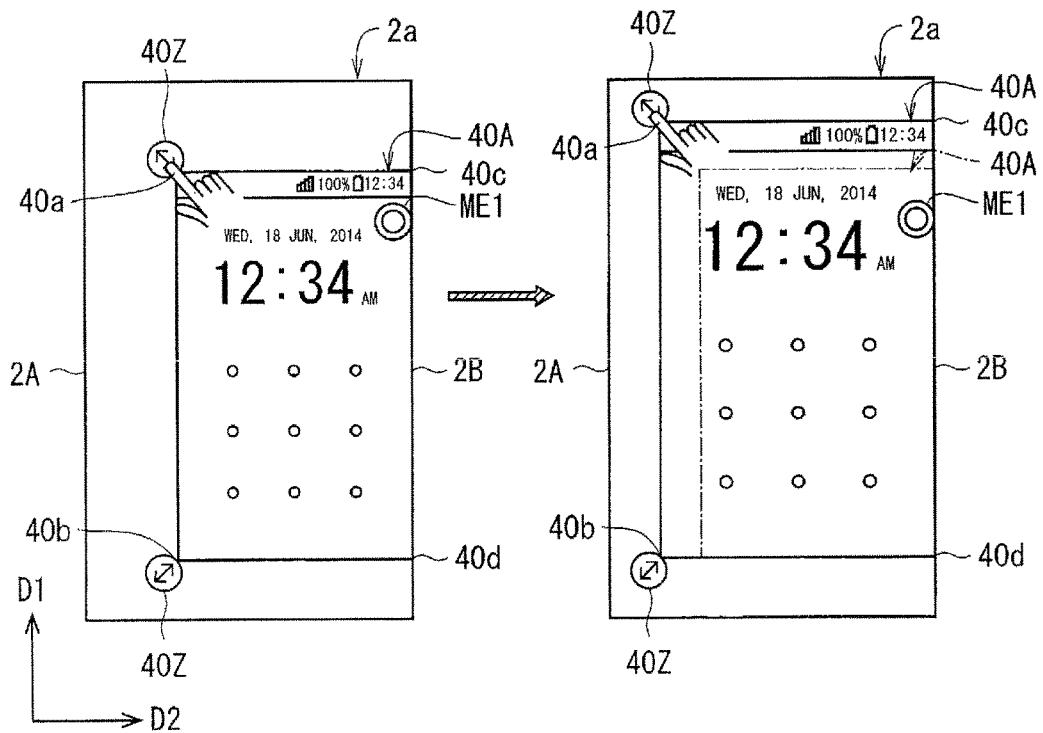
FIG. 33 schematically illustrates an example of the state in which the size of the scaled-down screen is set.

FIG. 33 schematically illustrates an example of the state in which the size of the scaled-down screen 40A is set. In the illustration of FIG. 33, a corner of the scaled-down screen 40A, such as a corner 40a on the upper left of the paper plane (see the display area 2a on the left side of the paper plane), is dragged toward the upper left direction (see the display area 2a illustrated on the right side of the paper plane). In accordance with this movement, the GUI setting unit 12 resizes and displays the scaled-down screen 40A in such a manner that the corner 40a coincides with the drag position. In the display area 2a illustrated on the right side of the paper plane in FIG. 33, an alternate long and short dash line indicates the outline of the scaled-down screen 40A displayed just before the drag operation.

When the drag operation is ended, the GUI setting unit 12 sets the size of the scaled-down screen 40A based on the endpoint. Specifically, the scaled-down screen 40A is resized in such a manner that the corner 40a coincides with the endpoint.

The target for a drag operation may include the corners of the scaled-down screen 40A, namely, the corner 40a, a corner 40b, a corner 40c, and a corner 40d. The target for such a drag operation may include the corners adjoining neither the edge 2A nor the edge 2B. In the illustration of FIG. 33, the scaled-down screen 40A adjoins the edge 2B. In this case, the target for such an operation may include the corner 40a on the upper left of the paper plane and the corner 40b on the lower left of the paper plane. It may not be required that the target for such an operation include the corner 40c on the upper right of the paper plane and the corner 40d on the lower right of the paper plane. In the case where the scaled-down screen 40A adjoins the edge 2A, the target for such an operation may include the corner 40c on the upper right of the paper plane or the corner 40d on the lower right of the paper plane, and it may not be required that the target for such an operation include the corner 40a on the upper left of the paper plane and the corner 40b on the lower left of the paper plane.

As illustrated in FIG. 33, the GUI setting unit 12 may display graphic symbols 40Z on the corners 40a and 40b of the scaled-down screen 40A. For example, each graphic symbol 40Z is displayed when the user performs an operation on the individual corner. In response to an operation performed on the corner by the user, the GUI setting unit 12 displays the graphic symbol 40Z. The graphic symbol 40Z is, for example, the symbol for indicating that the fourth operation is performed on the corner in an appropriate manner.

In the illustration of FIG. 33, the graphic symbol 40Z includes a double-headed arrow extending in a slanting direction. The double-headed arrow extends approximately along the diagonal line of the scaled-down screen 40A. The user can intuitively learn that the scaled-down screen 40A can be resized in response to a drag operation on the corner.

Figure 34:
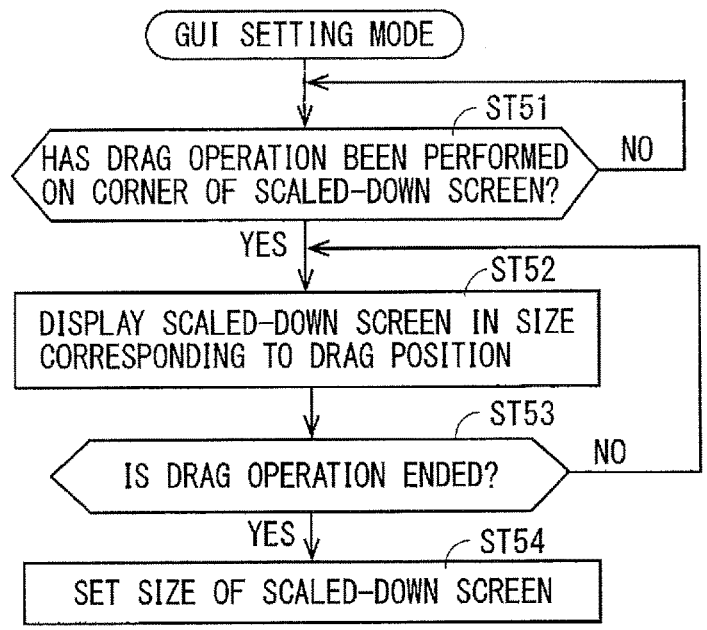
FIG. 34 illustrates a flowchart showing an example of a specific action of the GUI setting unit.

FIG. 34 illustrates a flowchart showing an example of the above-mentioned action of the GUI setting unit 12. In Step ST51, the GUI setting unit 12 determines whether a drag operation has been performed on the individual corner of the scaled-down screen 40A. If determining that no drag operation has been performed, the GUI setting unit 12 executes Step ST51 again. If determining that a drag operation has been performed, in Step ST52, the GUI setting unit 12 displays the scaled-down screen 40A in the size corresponding to the drag position. That is to say, the scaled-down screen 40A is resized and displayed in such a manner that the corner of the scaled-down screen 40A coincides with the drag position.

Then, in Step ST53, the GUI setting unit 12 determines whether the drag operation is ended. If determining that the drag operation is not ended, the GUI setting unit 12 executes Step ST52 again. If determining that the drag operation is ended, the GUI setting unit 12 sets the size of the scaled-down screen 40A in accordance with the endpoint of the drag operation. That is to say, the scaled-down screen 40A is resized in such a manner that the corner of the scaled-down screen 40A coincides with the endpoint.

Position of Scaled-Down Screen 40A in Longitudinal Direction

The GUI setting unit 12 may change the display position of the scaled-down screen 40A in response to a fifth operation performed on any one of the sides that define the outline of the scaled-down screen 40A. Examples of the fifth operation include a drag operation. For example, the GUI setting unit 12 sets the position of the scaled-down screen 40A in the longitudinal direction D1 based on the endpoint of a drag operation performed on the side.

Figure 35:
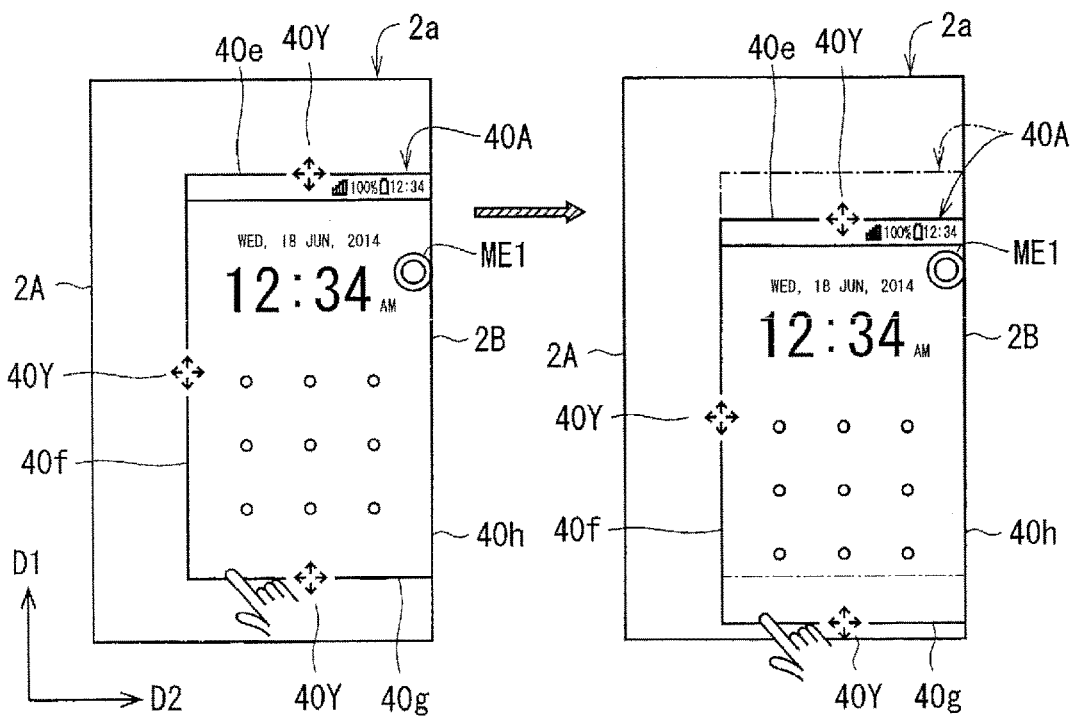
FIG. 35 schematically illustrates an example of the state in which the position of the scaled-down screen is set.

FIG. 35 schematically illustrates an example of the state in which the display position of the scaled-down screen 40A is set. In the illustration of FIG. 35, one of the sides of the scaled-down screen 40A, such as a side 40g on the lower side of the paper plane (see the display area 2a on the left side of the paper plane), is dragged. When the user moves the operating finger downward, the GUI setting unit 12 moves the scaled-down screen 40A downward over the distance corresponding to the amount of the movement of the operating finger and displays the resultant screen 40A (see the display area 2a illustrated on the right side of the paper plane). For example, the scaled-down screen 40A is displayed in such a manner that the side 40g passes through the drag position. In the display area 2a illustrated on the right side of the paper plane in FIG. 35, an alternate long and short dash line indicates the outline of the scaled-down screen 40A displayed just before the drag operation.

When the drag operation is ended, the GUI setting unit 12 sets the display position of the scaled-down screen 40A in the longitudinal direction D1 based on the endpoint of the drag operation. Specifically, the display position of the scaled-down screen 40A is set in such a manner that the side 40g passes through the endpoint.

The target for such a drag operation may include the sides of the scaled-down screen 40A, namely, a side 40e, a side 40f, the side 40g, and a side 40h. The target for such a drag operation may include the sides adjoining neither the edge 2A nor the edge 2B. In the illustration of FIG. 35, the scaled-down screen 40A adjoins the edge 2B. In this case, the target for such an operation may include the side 40e on the upper side of the paper plane, the side 40f on the left side of the paper plane, and the side 40g on the lower side of the paper plane. It may not be required that the target for such an operation include the side 40h on the right side of the paper plane. In the case where the scaled-down screen 40A adjoins the edge 2A, the target for such an operation may include the side 40e on the upper side of the paper plane, the side 40h on the right side of the paper plane, and the side 40g on the lower side of the paper plane. It may not be required that the target for such an operation include the side 40f on the left side of the paper plane.

Also, the GUI setting unit 12 may set the display position of the scaled-down screen 40A in the transverse direction D2 (to the edge 2A or the edge 2B) in accordance with an operation performed on the individual side of the scaled-down screen 40A. For example, the GUI setting unit 12 moves the scaled-down screen 40A along the transverse direction D2 in accordance with the movement of the operator in the transverse direction D2 caused by the drag operation. For example, when a drag operation is performed to move the operator toward the left side of the paper plane, the scaled-down screen 40A is moved toward the left side of the paper plane accordingly.

When the center of the scaled-down screen 40A displayed at the end of the drag operation is located on the edge 2A side with respect to the reference line B1, the display position of the scaled-down screen 40A may be set to the edge 2A. When the center is located on the edge 2B side with respect to the reference line B1, the display position of the scaled-down screen 40A may be set to the edge 2B.

In this configuration, in response to the fifth operation performed on the individual side of the scaled-down screen 40A, the display position of the scaled-down screen 40A in the longitudinal direction D1 can be set and the display position of the scaled-down screen 40A in the transverse direction D2 can be set (to the edge 2A or the edge 2B).

As illustrated in FIG. 35, the GUI setting unit 12 may display a graphic symbol 40Y on each of the sides 40e, 40f, and 40g of the scaled-down screen 40A. For example, each graphic symbol 40Y is displayed when the user performs an operation on the individual side. In response to an operation performed on the side by the user, the GUI setting unit 12 displays the graphic symbol 40Y. The graphic symbol 40Y is, for example, the symbol for indicating that the fifth operation is performed on the side in an appropriate manner.

In the illustration of FIG. 35, the graphic symbol 40Y includes arrows radially extending toward the upper side, the lower side, the right side, and the left side of the paper plane. The user can intuitively lean that the display position of the scaled-down screen 40A can be changed in response to a drag operation performed on the side.

Figure 36:
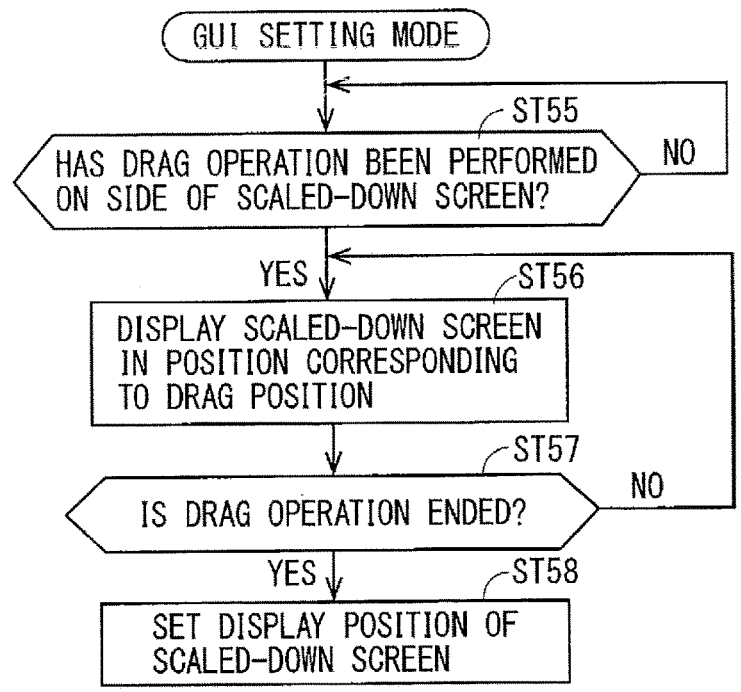
FIG. 36 illustrates a flowchart showing an example of a specific action of the GUI setting unit.

FIG. 36 illustrates a flowchart showing an example of the above-mentioned action of the GUI setting unit 12. In Step ST55, the GUI setting unit 12 determines whether a drag operation has been performed on the individual side of the scaled-down screen 40A. If determining that no drag operation has been performed, the GUI setting unit 12 executes Step ST55 again. If determining that a drag operation has been performed, in Step ST56, the GUI setting unit 12 displays the scaled-down screen 40A in the position corresponding to the drag position. That is to say, the scaled-down screen 40A is displayed so as to follow the operating finger moved along the longitudinal direction D1 over a distance corresponding to the amount of the movement of the operating finger.

Then, in Step ST57, the GUI setting unit 12 determines whether the drag operation is ended. If determining that the drag operation is not ended, the GUI setting unit 12 executes Step ST56 again. If determining that the drag operation is ended, the GUI setting unit 12 sets the display position of the scaled-down screen 40A in accordance with the endpoint of the drag operation.

Figure 37:
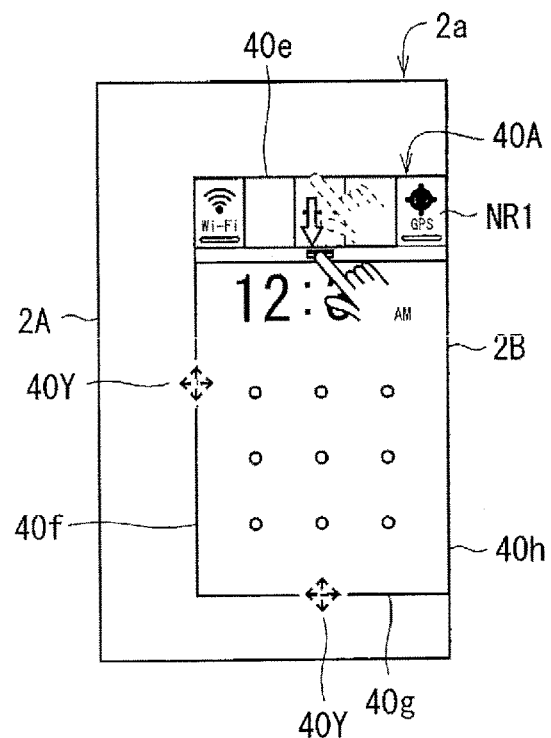
FIG. 37 schematically illustrates an example of the state in which a notification screen is displayed.

In a case where the processing to be performed in response to an operation on the individual side of the scaled-down screen 40A is different from the setting associated with the scaled-down screen 40A, it may not be required that the relevant side be the target for the above-mentioned operation of moving the scaled-down screen 40A. For example, as illustrated in FIG. 37, the side 40e of the scaled-down screen 40A on the upper side of the paper plane is assigned the processing of displaying a notification screen in response to a predetermined operation. In response to a downward slide operation performed by the user from above the side 40e, the processor 13 displays a notification screen NR1. For example, during the movement of the operator caused by the slide operation, the notification screen NR1 is displayed so as to extend from the top of the scaled-down screen 40A to the position of the operator (see FIG. 37). In the illustration of FIG. 37, a block arrow indicates the direction in which the operating finger is slid. When the slide operation is performed toward the lower side of the scaled-down screen 40A and then is ended, the notification screen NR1 is displayed all over the scaled-down screen 40A (not shown). The notification screen NR1 includes information of which the user should be notified, such as various types of setting information or incoming call information.

As described above, in the case where the side 40e is assigned the processing other than the processing of setting the display position of the scaled-down screen 40A, it may not be required that the side 40e be the target for the operation of performing the setting. This configuration can eliminate or reduce unintended operations. In the case where the side 40e is not the target for the operation of performing the setting, it may not be required that the graphic symbol 40Y be displayed on the side 40e.

To sum up, in the case where it is indicated that the individual side of the scaled-down screen 40A is assigned the processing other than the setting associated with the scaled-down screen 40A, the relevant side may not be the target for the operation of setting the display position of the scaled-down screen 40A.

The graphic symbols 40Y and 40Z may be displayed all the time, regardless of whether an operation is performed by the user. In the case where the GUI setting mode is available, the graphic symbols 40Y and 40Z may be displayed in response to an operation of enabling the GUI setting mode. In response to a user's operation on the individual corner, the graphic symbol 40Y may disappear and the graphic symbol 40Z may be kept displayed. In response to a user's operation on the individual side, the graphic symbol 40Z may disappear and the graphic symbol 40Y may be kept displayed.

The user can intuitively learn how to change the size or how to change the position from glancing at the graphic symbols 40Y or 40Z that are displayed in advance before the user performs an operation on the individual corner or the individual side.

When the GUI setting mode is enabled, the outline of the scaled-down screen 40A may be displayed in a predetermined color (e.g., blue) so as to indicate that the GUI setting mode is enabled. Thus, the user can easily recognize that the setting associated with the scaled-down screen 40A can be changed.

Fourth Embodiment

Similarly to the above, a fourth embodiment is aimed to set the display position and/or the size of the scaled-down screen 40A. In the fourth embodiment, the GUI setting unit 12 displays, on the display area 2a, setting elements that function as setting buttons. Specifically, the GUI setting unit 12 displays, on the display area 2a, at least one of the setting element for determining which one of the edge 2A and the edge 2B is to adjoin the scaled-down screen 40A, the setting element for setting the display position of the scaled-down screen 40A in the longitudinal direction D1, and the setting element for setting the size of the scaled-down screen 40A. The following will describe specific examples.

Display Position of Scaled-Down Screen in Transverse Direction (Edge 2A or Edge 2B)

Figure 38:
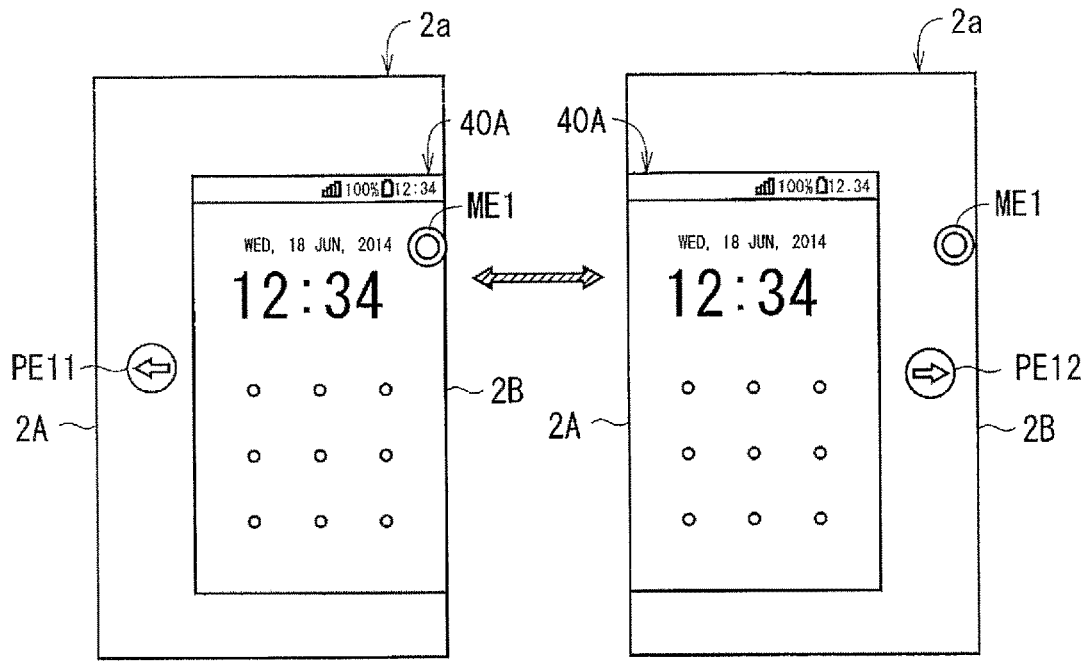
FIG. 38 schematically illustrates an example of the state in which the position of the mode change element is changed.

For example, FIG. 38 schematically illustrates an example of the state in which the display position of the scaled-down screen 40A is set. As illustrated in FIG. 38, the GUI setting unit 12 displays a setting element PE11 on the display area 2a. The setting element PE11 may be displayed in, for example, part of the display area 2a that is not occupied by the scaled-down screen 40A. That is to say, the setting element PE11 may be displayed when the scale-down mode or the GUI setting mode is enabled. In this configuration, the setting element PE11 does not interfere with the display contents on the scaled-down screen 40A.

In the display area 2a illustrated on the left side of the paper plane in FIG. 38, the scaled-down screen 40A is displayed so as to adjoin the edge 2B and the setting element PE11 is located on the edge 2A side with respect to the scaled-down screen 40A. The setting element PE11 is the element for changing the display position of the scaled-down screen 40A from the edge 2B to the edge 2A. As illustrated in the display area 2a on the right side of the paper plane in FIG. 38, in response to an operation (e.g., a tap operation) on the setting element PE11, the GUI setting unit 12 sets the display position of the scaled-down screen 40A to the edge 2A. Concurrently, the GUI setting unit 12 displays a setting element PE12. In the illustration of FIG. 38, the setting element PE12 is located on the edge 2B side with respect to the scaled-down screen 40A. The setting element PE12 is the element for changing the display position of the scaled-down screen 40A from the edge 2A to the edge 2B. In response to an operation (e.g., a tap operation) on the setting element PE12, the GUI setting unit 12 sets the display position of the scaled-down screen 40A to the edge 2B. That is to say, in response to tap operations on the setting elements PE11 and PE12, the display position of the scaled-down screen 40A is switched (between the edge 2A and the edge 2B) as illustrated in FIG. 38.

The setting elements PE11 and PE12 may be graphic symbols that indicate the respective functions to the user. For example, in the illustration of FIG. 38, the graphic symbol serving as the setting element PE11 include an arrow pointing toward the edge 2A and the graphic symbol serving as the setting element PE12 includes an arrow pointing toward the edge 2B.

In the illustration of FIG. 38, the display position of the mode change element ME1 is affected by neither the operation on the setting element PE11 nor the operation on the setting element PE12. Alternatively, the display position of the mode change element ME1 may, be set as with the display position of the scaled-down screen 40A.

Figure 39:
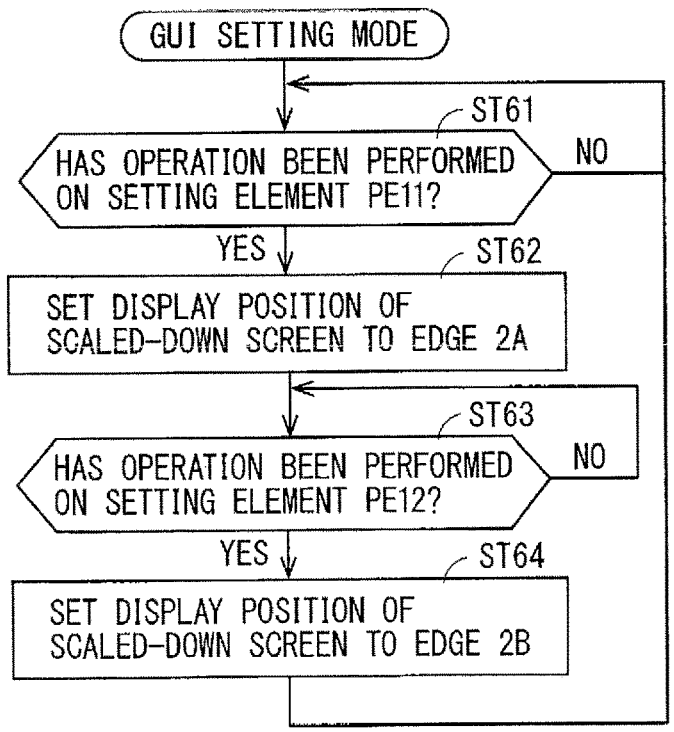
FIG. 39 illustrates a flowchart showing an example of a specific action of the GUI setting unit.

FIG. 39 illustrates a flowchart showing an example of the above-mentioned action of the GUI setting unit 12. In Step ST61, the GUI setting unit 12 determines whether an operation has been performed on the setting element PE11. If determining that no such operation has been performed, the GUI setting unit 12 executes Step ST61 again. If determining that such an operation has been performed, in Step ST62, the GUI setting unit 12 sets the display position of the scaled-down screen 40A to the edge 2A. Concurrently, the GUI setting unit 12 displays the setting element PE12 on the display area 2a.

Then, in Step ST63, the GUI setting unit 12 determines whether an operation has been performed on the setting element PE12. If determining that no such operation has been performed, the GUI setting unit 12 executes Step ST63 again. If determining that such an operation has been performed, in Step ST64, the GUI setting unit 12 sets the display position of the scaled-down screen 40A to the edge 2B. Concurrently, the GUI setting unit 12 displays the setting element PE11 on the display area 2a. Then, the GUI setting unit executes Step ST61.

In the case where the setting element PE11 or PE12 is displayed on the area that is not occupied by the scaled-down screen 40A (FIG. 38), the upper limit of the size of the scaled-down screen 40A may be set in advance such that the scaled-down screen 40A overlaps neither the setting element PE11 nor the setting element PE12.

Size of Scaled-Down Screen

Figure 40:
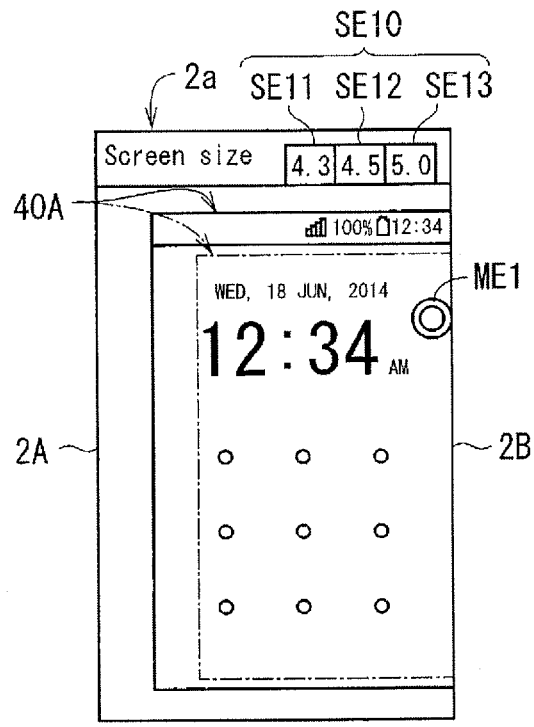
FIG. 40 schematically illustrates an example of the state in which the size of the scaled-down screen is set.

FIG. 40 schematically illustrates an example of the state in which the scaled-down screen 40A is resized. As illustrated in FIG. 40, on the display area 2a, a setting element SE10 is displayed which functions as the button for specifying the size of the scaled-down screen 40A. The setting element SE10 includes, for example, a plurality of setting elements, namely, setting elements SE11 to SE13. The setting elements SE11 to SE13 function as buttons for specifying the respective sizes, which are different from one another.

In response to an operation (e.g., a tap) on, for example, the setting element SE11, the GUI setting unit 12 sets the size of the scaled-down screen 40A to the size specified by the setting element SE11. The GUI controller 11 accordingly displays the scaled-down screen 40A in the specified size. Similarly, in response to an operation on the setting element SE12 or SE13, the size of the scaled-down screen 40A is set to the size specified by the setting element SE12 or SE13. The sizes respectively assigned to the setting element SE11 to SE13 may be, for example, set in advance and stored in the storage 103 or the like. The scaled-down screen 40A is displayed in, for example, the size specified by the setting element SE12. In the illustration of FIG. 40, an alternate long and short dash line indicates the size of the scaled-down screen 40A specified by, for example, the setting element SE11.

Figure 41:
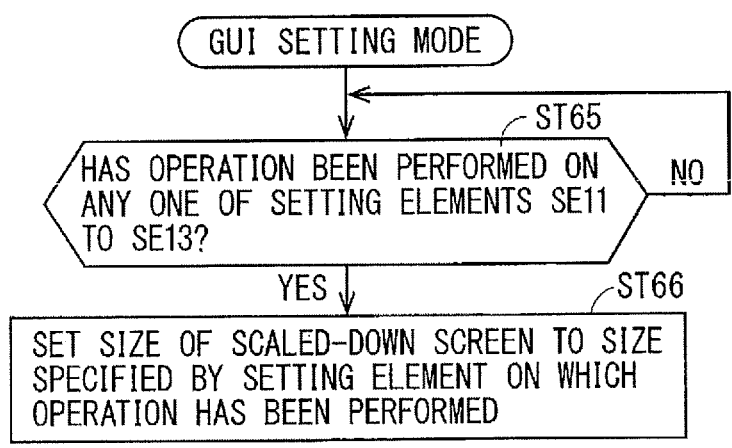
FIG. 41 illustrates a flowchart showing an example of a specific action of the GUI setting unit.

FIG. 41 illustrates a flowchart showing an example of the above-mentioned action of the GUI setting unit 12. In Step ST65, the GUI setting unit 12 determines whether an operation has been performed on any one of the setting elements SE11 to SE13. If determining that no operation has been performed on the setting elements SE11 to SE13, the GUI setting unit 12 executes Step ST65 again. If determining that an operation has been performed on any one of the setting elements SE11 to SE13, in Step ST66, the GUI setting unit 12 sets the size of the scaled-down screen 40A to the size specified by the setting element on which the operation has been performed.

Display Position and Size of Scaled-Down Screen

Figure 42:
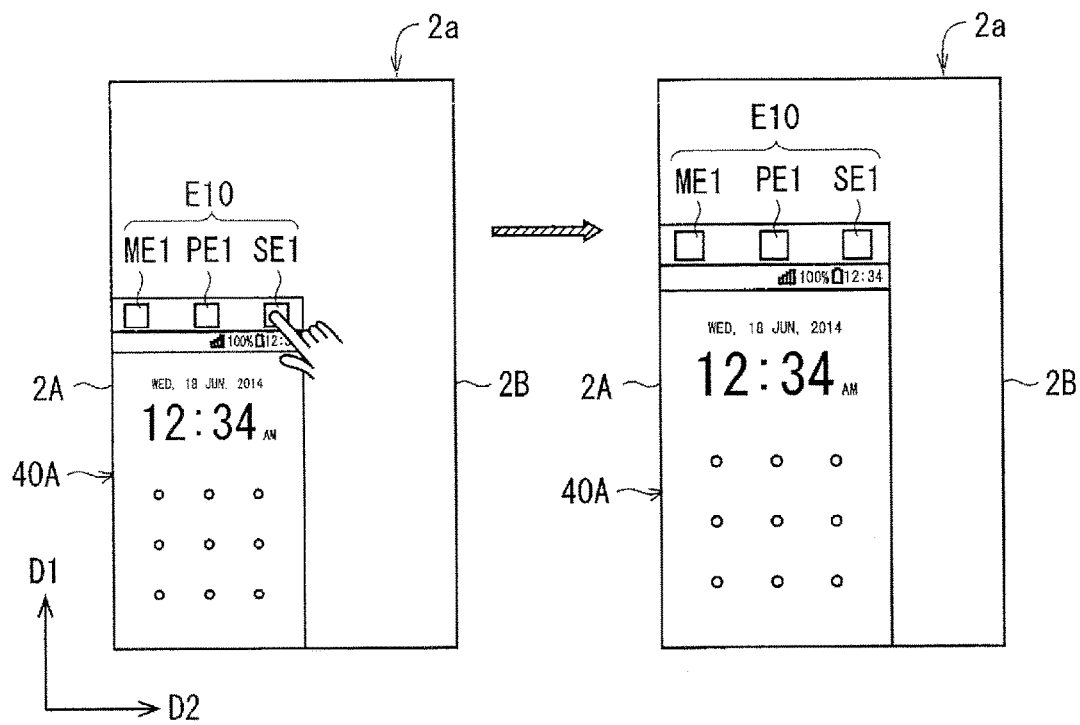
FIG. 42 schematically illustrates an example of the state in which the size of the scaled-down screen is set.

FIG. 42 schematically illustrates an example of the state in which the size of the scaled-down screen 40A is set. In the illustration of FIG. 42, a setting element group E10 is displayed on the display area 2a so as to be adjacent to the scaled-down screen 40A. For example, the setting element group E10 is located above the scaled-down screen 40A. The setting element group E10 includes, for example, the mode change element ME1, a position setting element PE1, and a size setting element SE1. In the illustration of FIG. 42, these elements are arranged side by side along the transverse direction D2. The position setting element PE1 functions as the button for setting the display position of the scaled-down screen 40A. The size setting element SE1 functions as the button for setting the size of the scaled-down screen 40A.

In response to an operation on the size setting element SE1, the GUI setting unit 12 resizes the scaled-down screen 40A. For example, in response to a drag operation on the size setting element SE1, the scaled-down 40A is resized as with the case in which a drag operation is performed on one of the corners of the scaled-down screen 40A. For example, in response to a drag operation on the size setting element SE1 in the display area 2a illustrated on the left side of the paper plane in FIG. 42, the size of the scaled-down screen 40A is increased as shown in the display area 2a illustrated on the right side of the paper plane.

Alternatively, the size of the scaled-down screen 40A may be changed to a predetermined value in response to an operation on the size setting element SE1. The predetermined value may be provided in advance and may be stored in the storage 103 or the like. A plurality of predetermined values may be provided. Every time an operation is performed on the size setting element SE1, one of the plurality of predetermined values may be selected in sequence. Assuming that N (N being an integer greater than or equal to 2) pieces of predetermined values are stored in the storage 103 or the like, every time an operation is performed on the size setting element SE1, the size may be switched from the k-th predetermined value (k being a natural number smaller than N) to the (k+1)th predetermined value. The size set to the Nth predetermined value may be switched to the first predetermined value in response to such an operation.

The setting element group E10 may be resized in accordance with the size of the scaled-down screen 40A. That is to say, the size of the setting element group E10 may increase with increasing size of the scaled-down screen 40A. The scaled-down screen 40A is resized in a manner to enhance its operability, and the size of the setting element group E10 is set accordingly. Consequently, the setting element group E10 is also resized in a manner to enhance its operability.

Figure 43:
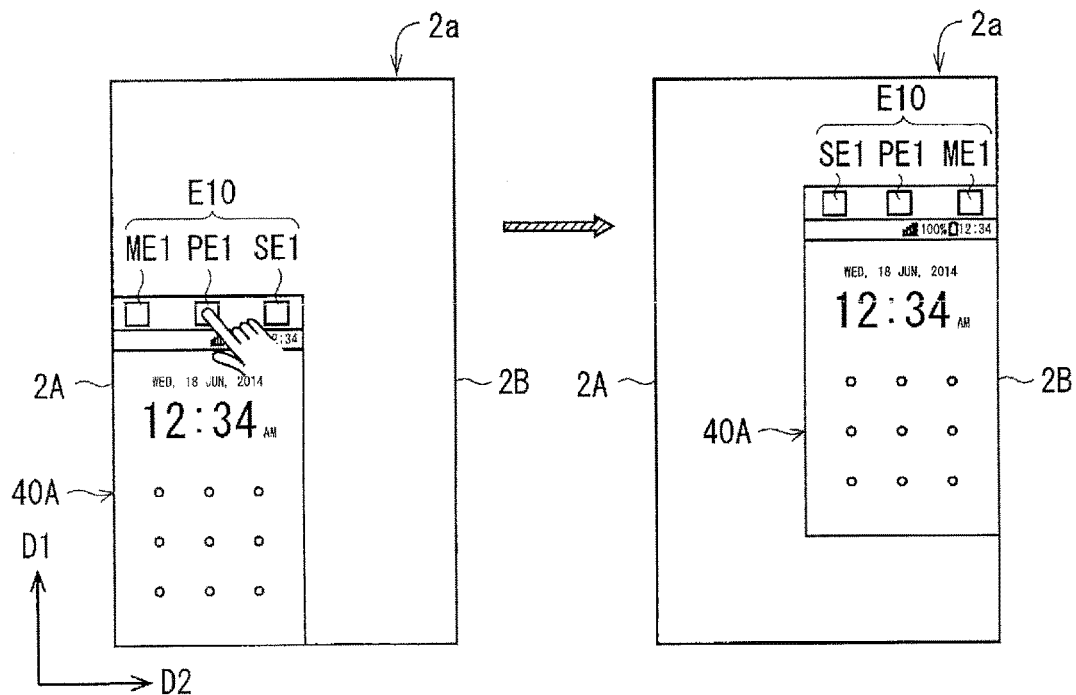
FIG. 43 schematically illustrates an example of the state in which the position of the scaled-down screen is set.

In response to an operation on the position setting element PE1, the GUI setting unit 12 changes the display position of the scaled-down screen 40A. For example, in response to a drag operation on the position setting element PE1, the display position of the scaled-down screen 40A is changed as with the case in which a drag operation is performed on one of the sides of the scaled-down screen 40A. FIG. 43 schematically illustrates an example of the state in which the display position of the scaled-down screen 40A is set. For example, when a drag operation is performed on the position setting element PE1 in the display area 2a illustrated on the left side of the paper plane in FIG. 43, the display position of the scaled-down screen 40A is changed as shown in the display area 2a illustrated on the right side of the paper plane.

Alternatively, the GUI setting unit 12 may set the display position of the scaled-down screen 40A to a predetermined position in response to an operation performed on the position setting element PE1. The predetermined position may be provided in advance and stored in the storage 103 or the like. A plurality of predetermined positions may be provided. Assuming that N pieces of predetermined positions are stored in the storage 103 or the like, every time an operation is performed on the position setting element PEI, the display position may be switched from the k-th predetermined position to the (k+1)th predetermined position. The display position set to the Nth predetermined may be switched to the first predetermined position in response to such an operation.

The mode change element ME1, the position setting element PE1, and the size setting element SE1 that are included in the setting element group E10 may be arranged in a different order suitable for the display position of the scaled-down screen 40A in the transverse direction D2. In the illustration of FIG. 43, when the scaled-down screen 40A is displayed so as to adjoin the edge 2A, the mode change element ME1 is closest to the edge 2A and the size setting element SE1 is closest to the edge 2B, with the position setting element PE1 in between. As illustrated in FIG. 43, when the scaled-down screen 40A is displayed so as to adjoin the edge 2B, meanwhile, the mode change element ME1 is closest to the edge 2B and the size setting element SE1 is closest to the edge 2A, with the position setting element PE1 in between.

In this arrangement, the mode change element ME1, which is most frequently operated, is adjacent to the side adjoined by the scaled-down screen 40A, so that the mode change element ME1 is located close to the operating finger (the thumb). Thus, the mode change element ME1 can be easily operated.

The size of the scaled-down screen 40A is usually set corresponding to the size of the hand of the user. Consequently, the scaled-down screen 40A is less likely to be resized. The size setting element SE1 is thus located apart from the operating finger (the thumb).

Meanwhile, the position of the scaled-down screen 40A in the longitudinal direction is adjusted depending on in which hand the user holds the mobile electronic apparatus 1 and which part of the mobile electronic apparatus 1 the user holds. When the user holds the mobile electronic apparatus 1 in the left hand 80, the scaled-down screen 40A is displayed so as to adjoin the edge 2A. When the user holds the mobile electronic apparatus 1 in the right hand 90, the scaled-down screen 40A is displayed so as to adjoin the edge 2B. When the user holds the lower part of the mobile electronic apparatus 1, the scaled-down screen 40A is displayed on the lower side. When the user holds the upper part of the mobile electronic apparatus 1, the scaled-down screen 40A is displayed on the upper side. The user may hold the mobile electronic apparatus 1 in different hands at different times and may hold different parts of the mobile electronic apparatus 1 at different times. The display position of the scaled-down screen 40A is more likely to be changed than the size of the scaled-down screen 40A is.

Thus, the position setting element PE1 is located closer to the operating finger (the thumb) than the size setting element SE1 is.

Figure 44:
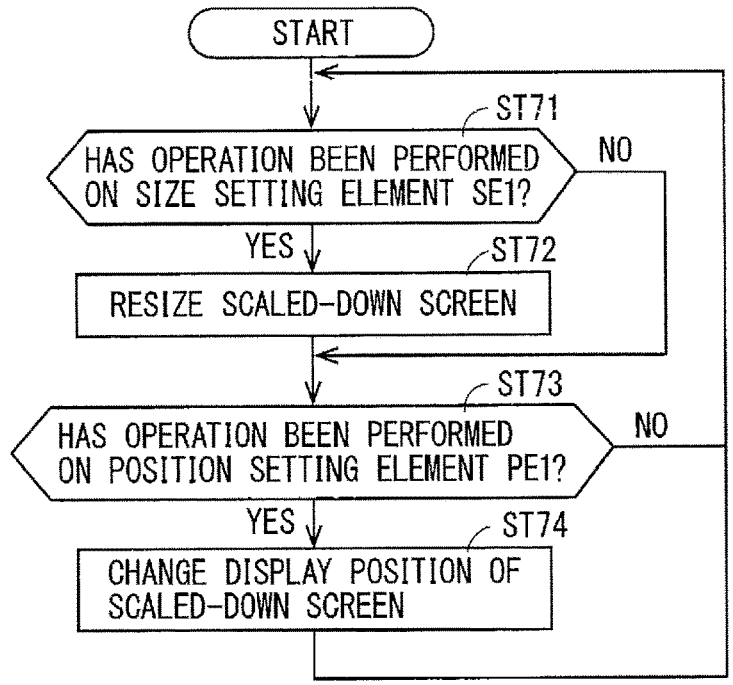
FIG. 44 illustrates a flowchart showing an example of a specific action of the SUI setting unit.

FIG. 44 illustrates a flowchart showing an example of the above-mentioned action of the GUI setting unit 12. In Step ST71, the GUI setting unit 12 determines whether an operation has been performed on the size setting element SE1. If determining that such an operation has been performed, in Step ST72, the GUI setting unit 12 resizes the scaled-down screen 40A.

Subsequently to Step ST72 or when the GUI setting unit 12 determines in Step ST71 that no such operation has been performed, in Step ST73, the GUI setting unit 12 determines whether an operation has been performed on the position setting element PE1. If determining that such an operation has been performed, in Step ST74, the GUI setting unit 12 switches the display position of the scaled-down screen 40A to the predetermined position.

Subsequently to Step ST74 or when the GUI setting unit 12 determines in Step ST73 that no such operation has been performed, the GUI setting unit 12 executes Step ST71 again.

Figure 45:
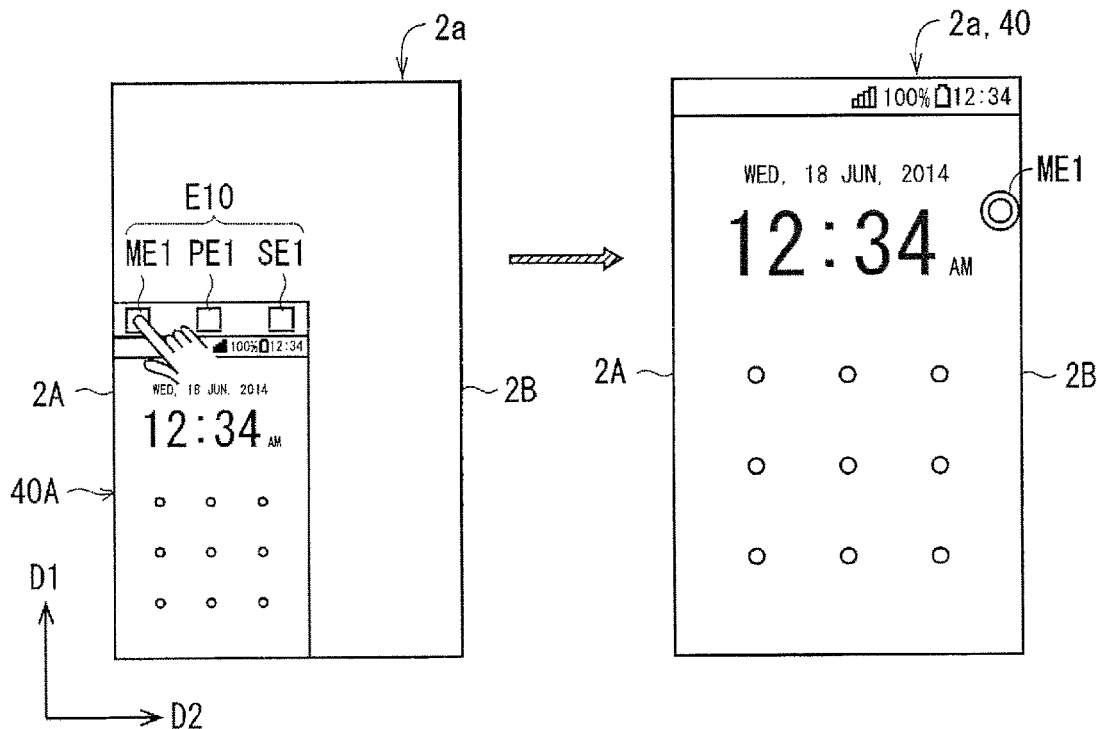
FIG. 45 schematically illustrates an example of the state in which a normal mode is enabled.

FIG. 45 schematically illustrates an example of the state in which an operation has been performed on the mode change element ME1. In response to an operation (e.g., a tap operation) on the mode change element ME1, the GUI controller 11 scales up the scaled-down screen 40A, thereby displaying the display screen 40, for example, all over the display area 2a. In other words, the normal mode is enabled.

Fifth Embodiment

In a fifth embodiment, a trigger for enabling the scale-down mode will be described.

First Operation on Mode Change Element ME1

Figure 46:
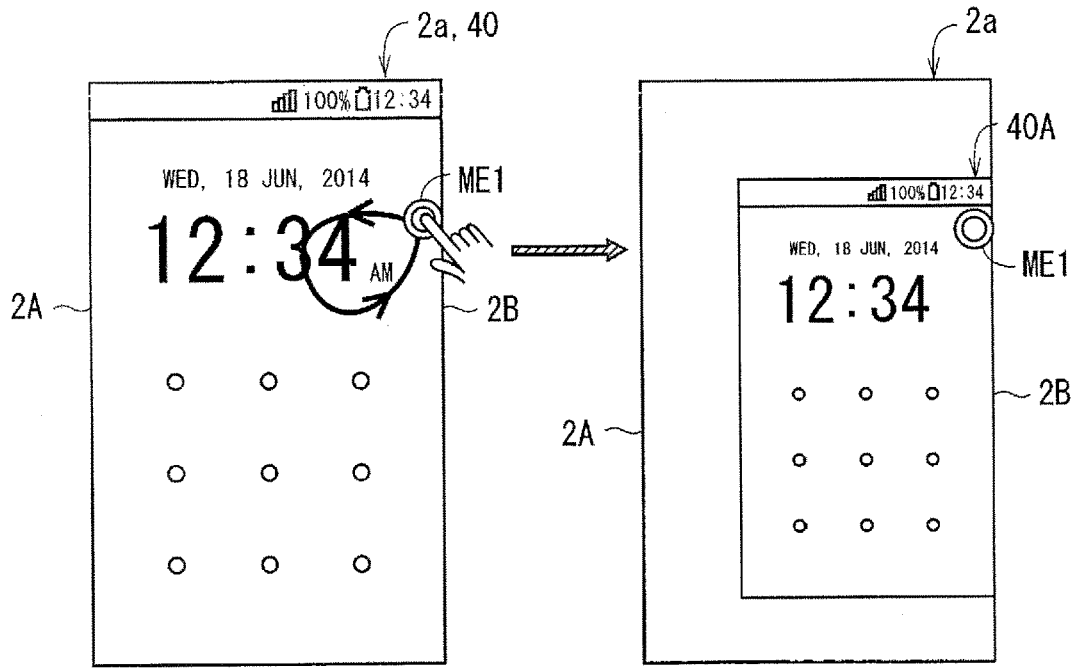
FIG. 46 schematically illustrates an example of the state in which a scale-down mode is enabled.

In the first embodiment, a tap operation has been given as an example of the first operation on the mode change element ME1. Here, the first operation is an operation of brining the operator close to the mode change element ME1 and then moving the operator along a predetermined course. FIG. 46 schematically illustrates an example of the state in which the first operation is performed. Although the predetermined course may be any course, the predetermined course in one example is approximately circular and extends counterclockwise. In the illustration of FIG. 46, the relevant course is indicated by a thick arrow. In this configuration, the first operation on the mode change element ME1 is distinctive and thus is less likely to be confused with other operations. The relevant course may be determined in advance and stored in the storage 103 or the like.

Also, the operation of moving the operator close to the mode change element ME1 and then moving the operator along the predetermined course may be used as a trigger for switching from the scale-down mode to the normal mode. The predetermined course may coincide with or differ from the course of the first operation in enabling the scale-down mode.

The course of the first operation on the mode change element ME1 located adjacent to the edge 2A and the course of the first operation on the mode change element ME1 located adjacent to the edge 2B may be mirror images of each other. For example, in the illustration of FIG. 46, the operating finger is moved counterclockwise from the position of the mode change element ME1 displayed adjacent to the edge 2B. When the mode change element ME1 is displayed adjacent to the edge 2A, the operating finger may be moved clockwise from the position of the mode change element ME1.

Figure 47:
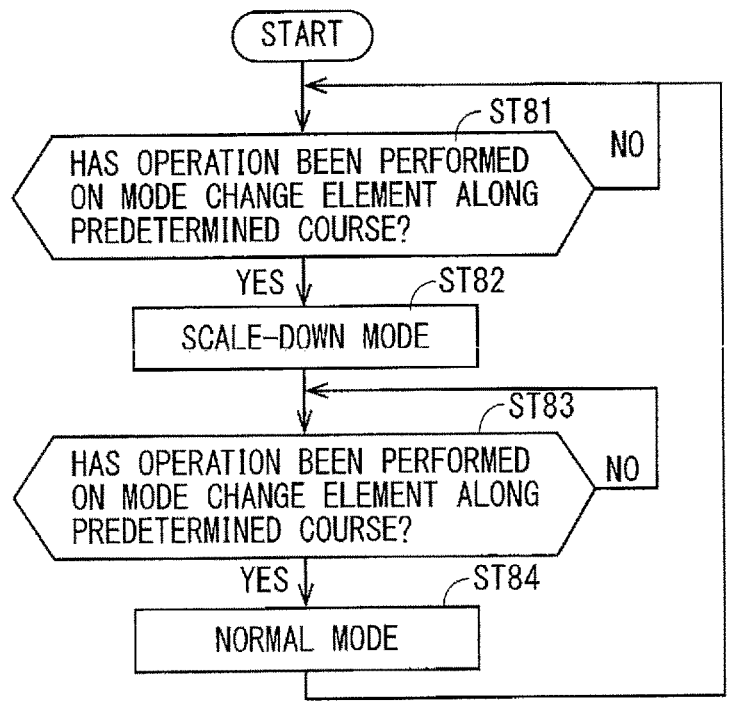
FIG. 47 illustrates a flowchart showing an example of a specific action of the GUI setting unit.

FIG. 47 schematically illustrates a flowchart showing an example of the above-mentioned action of the GUI controller 11. In Step ST81, the GUI controller 11 determines whether an operation has been performed from the position of the mode change element ME1 along the predetermined course. If determining that no such operation has been performed, the GUI controller 11 executes Step ST81 again. If determining that such an operation has been performed, in Step ST82, the GUI controller 11 scales down the display screen 40 and then displays the resultant display screen 40 as the scaled-down screen 40A. In other words, the scale-down mode is enabled. Then, in Step ST83 the GUI controller 11 determines whether an operation has been performed from the position of the mode change element ME1 along the predetermined course. If determining that no such operation has been performed, the GUI controller 11 executes Step ST83 again. If determining that such an operation has been performed, in Step ST84, the GUI controller 11 scales up the scaled-down screen 40A and then displays the resultant screen as the display screen 40. In other words, the normal mode is enabled.

Slide Operation From Lower Side of Display Area 2a

Figure 48:
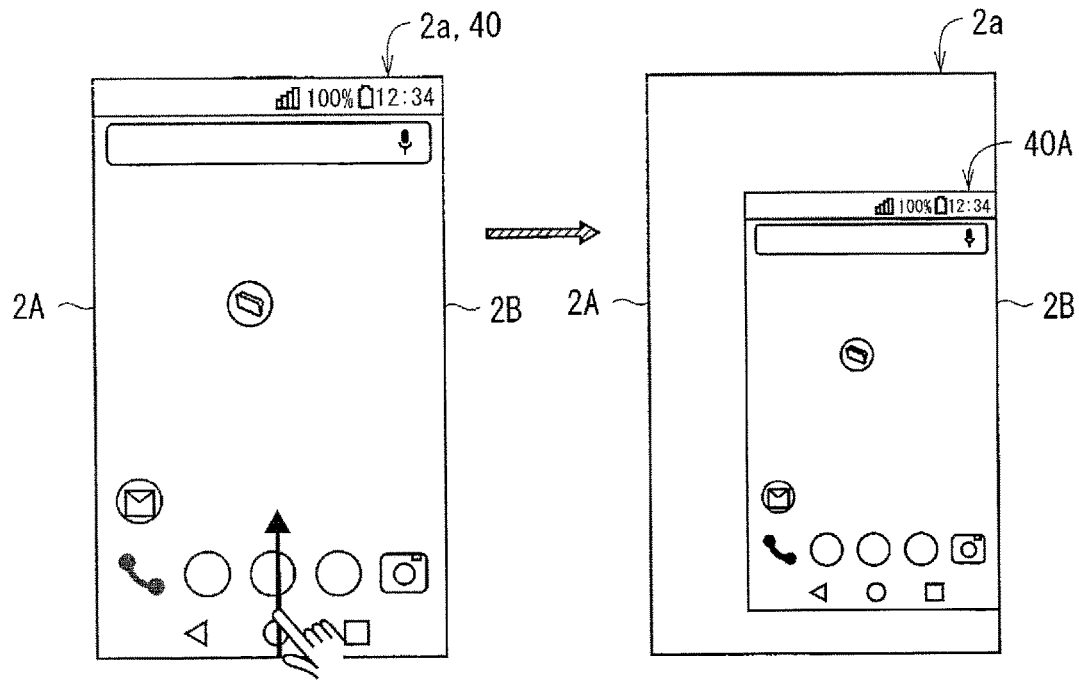
FIG. 48 schematically illustrates an example of the state in which the scale-down mode is enabled.

In one example, no mode change element ME1 is used. FIG. 48 schematically illustrates an example of the operation of enabling the scale-down mode. The GUI controller 11 enables the scale-down mode in response to the following operation performed by the user. As illustrated on the left side of the paper plane in FIG. 48, in response to a user's slide operation performed from the lower edge of the display area 2a, the GUI controller 11 enables the scale-down mode (see the right side of the paper plane in FIG. 48). In the illustration of FIG. 48, a thick arrow indicates the direction of the movement of the operating finger caused by the slide operation. Similarly, such thick arrows in other drawings each indicate, as appropriate, the direction of the slide operation.

Figure 49:
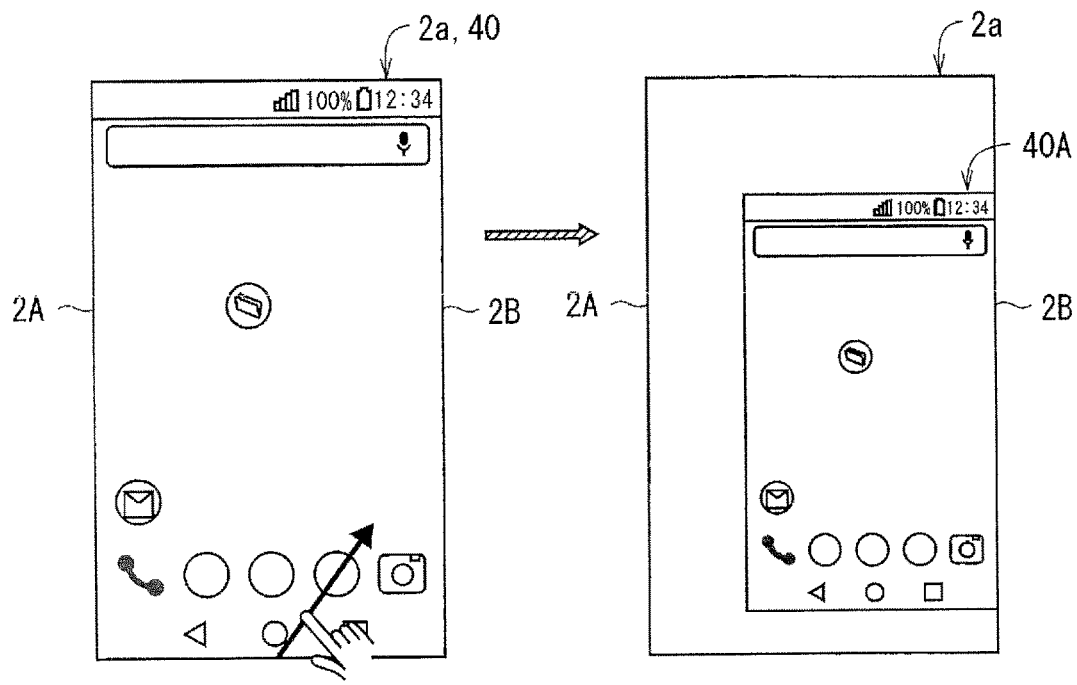
FIG. 49 schematically illustrates an example of the state in which the scale-down mode is enabled.

Depending on the direction of the slide operation, the scaled-down screen 40A may be determined to be displayed so as to adjoin the edge 2A or may be determined to be displayed so as to adjoin the edge 2B. FIG. 49 schematically illustrates an example of the operation of enabling the scale-down mode. For example, the user performs a slide operation in such a manner that the operating finger approaches the edge 2B as it moves upward from the lower edge of the display area 2a. In response to the slide operation, the GUI controller 11 displays the scaled-down screen 40A adjoined by the edge 2B. That is to say, in response to a slide operation toward the edge 2B, the scaled-down screen 40A is displayed so as to adjoin the edge 2B.

Figure 50:
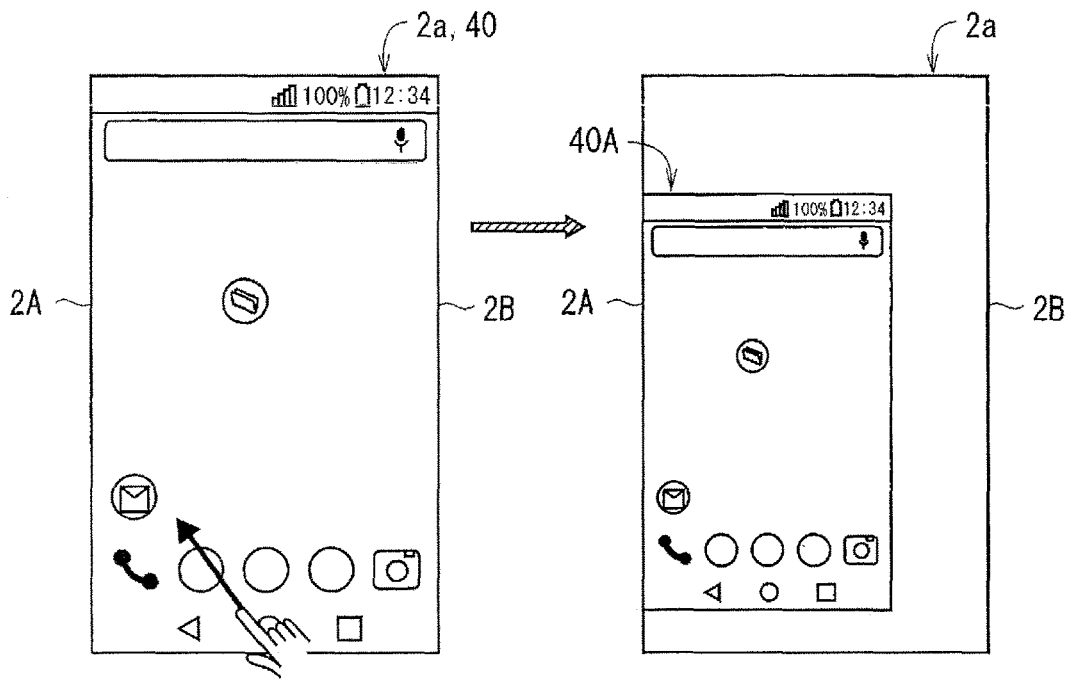
FIG. 50 schematically illustrates an example of the state in which the scale-down mode is enabled.

Also, the user may perform a slide operation in such a manner that the operating finger approaches the edge 2A as it moves upward from the lower edge of the display area 2a. FIG. 50 schematically illustrates an example of the operation of enabling the scale-down mode. In response to the slide operation, the GUI controller 11 displays the scaled-down screen 40A adjoined by the edge 2A.

As described above, the display position of the scaled-down screen 40A (the edge 2A or the edge 2B) may be determined depending on the direction of the slide operation. Moreover, the user can easily move the thumb along an arc of a circle with the center at the base of the thumb (see FIGS. 4 and 5). Thus, the user can easily perform a slide operation from the lower edge of the display area 2a toward the edge 2B with the thumb 91 of the right hand 90. When the user performs a simple slide operation with the right hand 90, the scaled-down screen 40A is displayed so as to adjoin the edge 2B. The scaled-down screen 40A displayed so as to adjoin the edge 2B enhances the usability for the user who performs an operation with the right hand 90. Similarly, when the user performs a simple slide operation with the left hand 80, the scaled-down screen 40A is displayed so as to adjoin the edge 2A.

Figure 51:
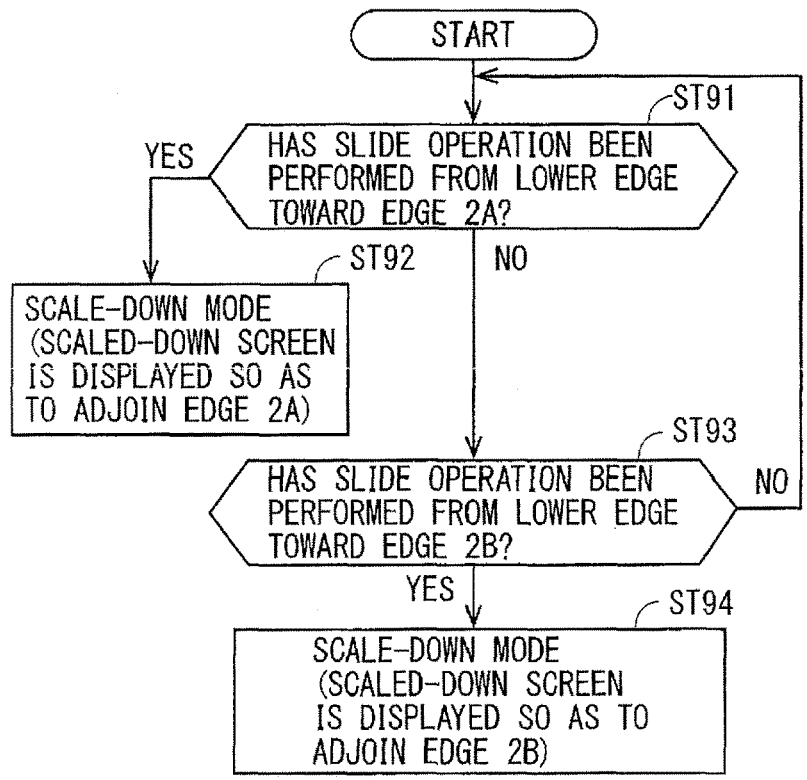
FIG. 51 illustrates a flowchart showing an example of a specific action of the GUI controller.

FIG. 51 illustrates a flowchart showing an example of the above-mentioned action of the GUI controller 11. In Step ST91, the GUI controller 11 determines whether a slide operation has been performed from the lower edge of the display area 2a toward the edge 2A. If determining that such a slide operation has been performed, in Step ST92, the GUI controller 11 scales down the display screen 40 and then displays, as the scaled-down screen 40A, the resultant screen adjoined by the edge 2A. If determining in Step ST91 that no such slide operation has been performed, in Step ST93, the GUI controller 11 determines whether a slide operation has been performed from the lower edge of the display area 2a toward the edge 2B. If determining that such a slide operation has been performed, in Step ST94, the GUI controller 11 scales down the display screen 40 and then displays, as the scaled-down screen 40A, the resultant screen adjoined by the edge 2B. If determining in Step ST93 that no such slide operation has been performed, the GUI controller 11 executes Step ST91 again.

A set of steps including Steps ST91 and ST92 and a set of steps including Steps ST93 and ST94 may be executed in reverse order.

Figure 52:
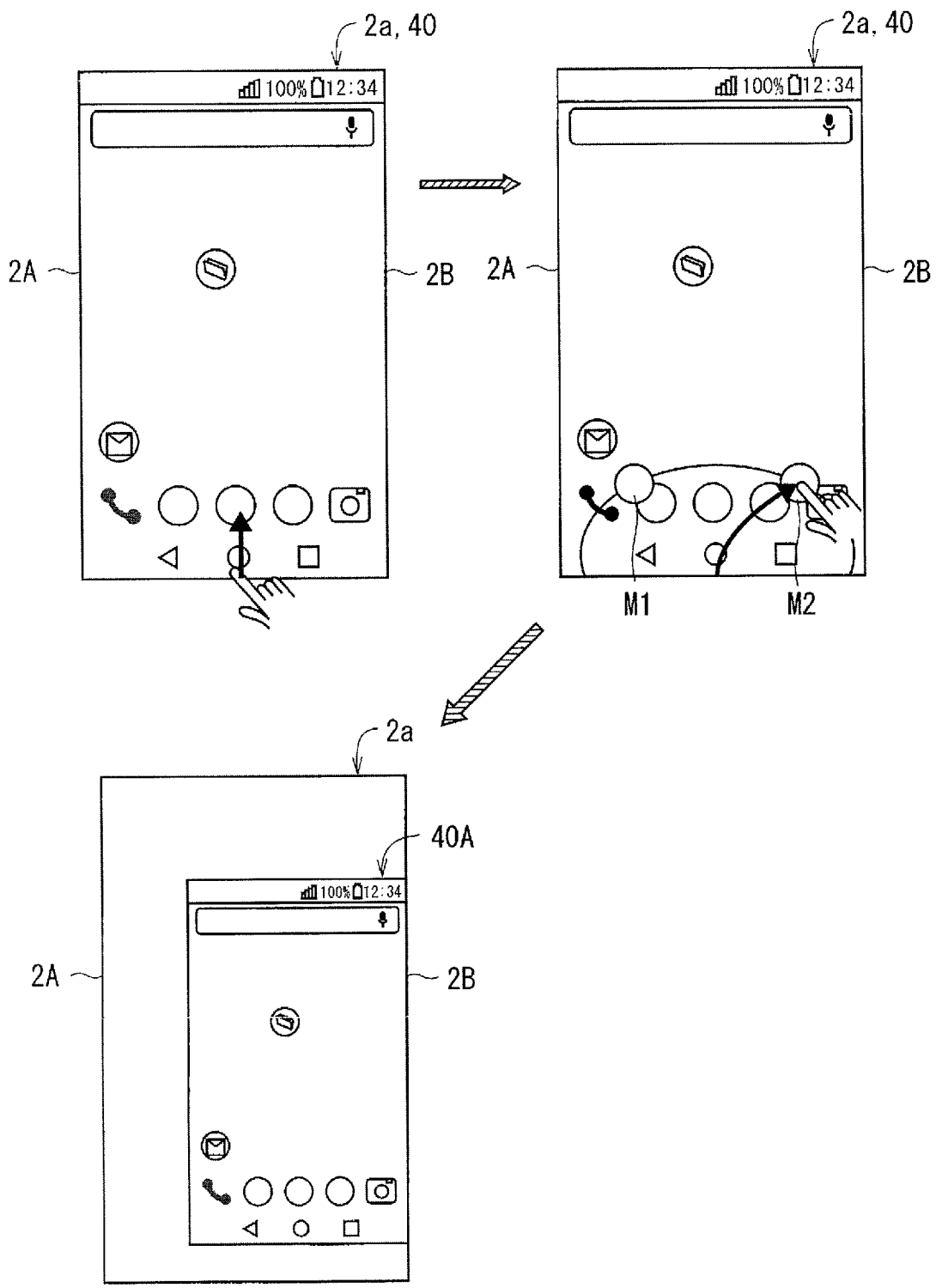
FIG. 52 schematically illustrates an example of the state in which the scale-down mode is enabled.

FIG. 52 schematically illustrates another example of the operation of enabling the scale-down mode. In response to an upward slide operation performed by the user from the lower edge of the display area 2a (see the display area 2a illustrated in the upper left of the paper plane), the GUI controller 11 displays mode change elements M1 and M2 (see the display area 2a in the upper right of the paper plane). The mode change elements M1 and M2 are located on the display area 2a below its center. For example, the mode change element M1 is located close to the edge 2A and the mode change element M2 is located close to the edge 2B. From the viewpoint of design, a partial ellipse may be displayed in response to the above-mentioned slide operation, and the mode change elements M1 and M2 may be superimposed on the circumference of the ellipse.

When the operator is slid to reach, for example, the mode change element M2 (see the display area 2a illustrated in the upper right of the paper plane), the GUI controller 11 displays the scaled-down screen 40A adjoined by the edge 2B (see the display area 2a in the lower left of the paper plane). That is to say, the scaled-down screen 40A can be displayed so as to adjoin the edge 2B when a slide operation is performed to the mode change element M2, which is located close to the edge 2B.

Conversely, when the operator is slid to reach the mode change element Ml, the GUI controller 11 displays the scaled-down screen 40A adjoined by the edge 2A (not shown).

As described above, when a slide operation is performed from the lower edge of the display area 2a, the mode change elements M1 and M2 are displayed. This can readily prompt the user to operate the mode change element M1 or the mode change element M2. In other words, the user can easily learn how to enable the scale-down mode.

Figure 53:
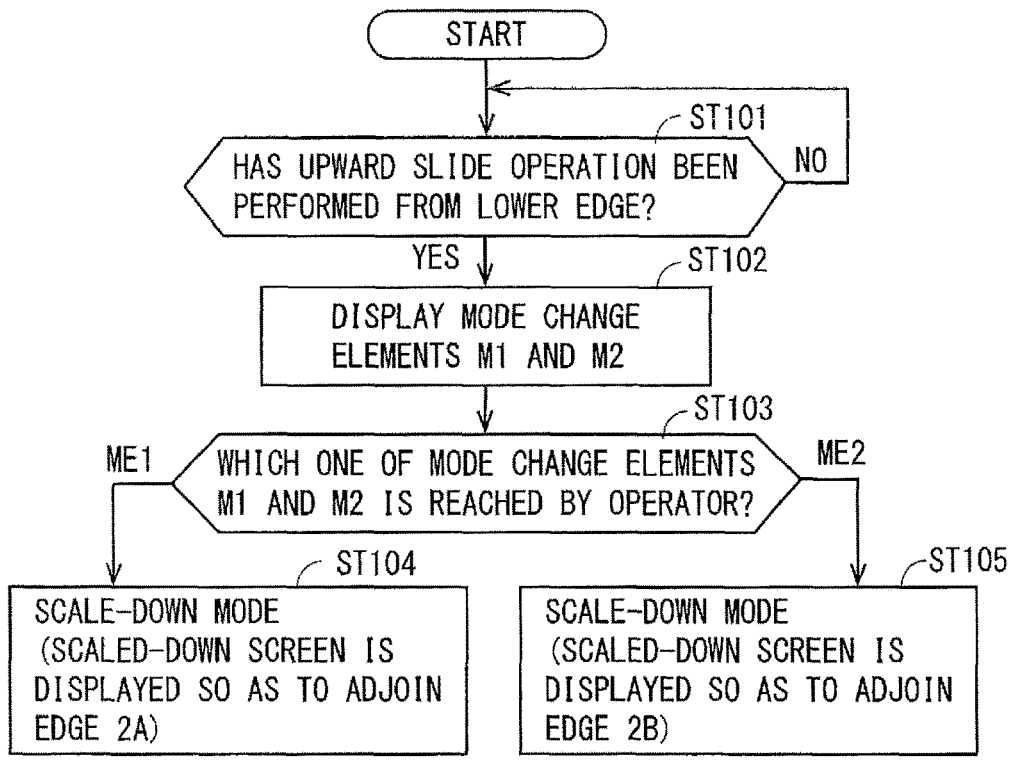
FIG. 53 illustrates a flowchart showing an example of a specific action of the GUI controller.

FIG. 53 is a flowchart showing an example of the above-mentioned action of the GUI controller 11. Firstly, in Step ST101, the GUI controller 11 determines whether an upward slide operation has been performed from the lower edge of the display area 2a. If determining that no such operation has been performed, the GUI controller 11 executes Step ST101 again. If determining that such an operation has been performed, in Step ST102, the GUI controller 11 displays the mode change elements M1 and M2 on the display area 2a. Then, in Step ST013, the GUI controller 11 determines which one of the mode change elements M1 and M2 is reached by the operator. If determining that the mode change element M1 is reached by the operator, in Step ST104, the GUI controller 11 scales down the display screen 40 and then displays, as the scaled-down screen 40A, the resultant screen adjoined by the edge 2A. If determining that the mode change element M2 is reached by the operator, in Step ST105, the GUI controller 11 scales down the display screen 40 and then displays, as the scaled-down screen 40A, the resultant screen adjoined by the edge 2B.

Sixth Embodiment

Figure 54:
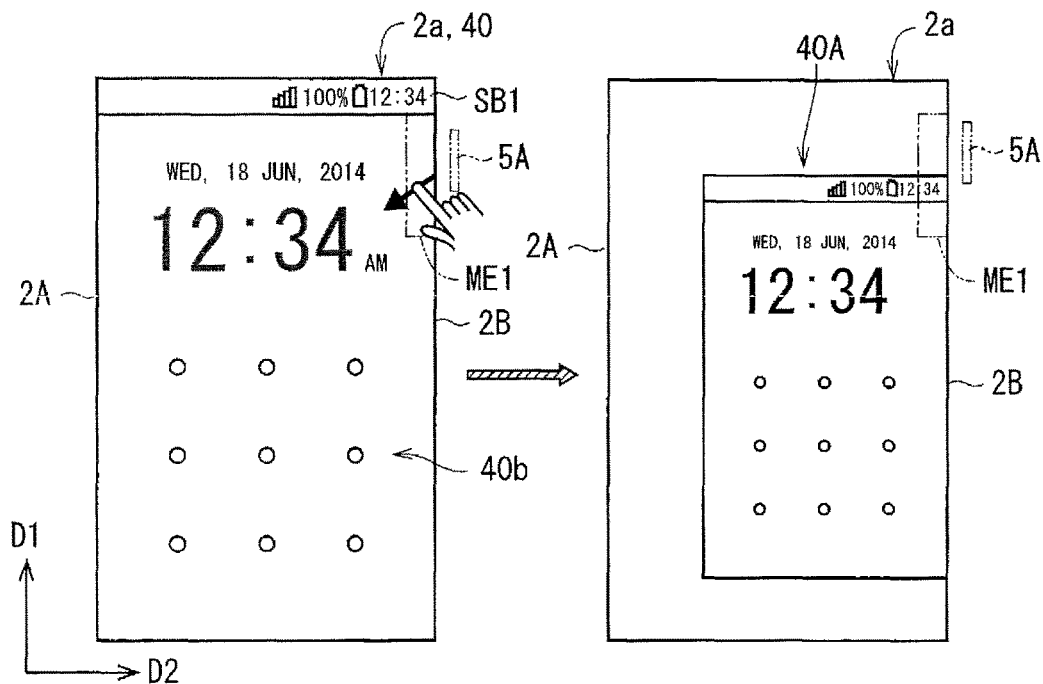
FIG. 54 schematically illustrates an example of the state in which the scale-down mode is enabled.

FIG. 54 schematically illustrates an example of the state in which the scale-down mode is enabled. In the illustration of FIG. 54, the mode change element ME1 is not displayed and is located close to the power key 5A. To be more specific, the mode change element ME1, which is adjacent to the edge 2B close to the power key 5A, is opposed to the power key 5A.

The user is more likely to hold the mobile electronic apparatus 1 in a manner to easily operate the power key 5A. Thus, it is easier for the user to operate the mode change element ME1 located close to the power key 5A.

In the illustration of FIG. 54, the first operation to be performed on the mode change element ME1 is, for example, a slide operation. As illustrated in FIG. 54, a slide operation is performed on the mode change element ME1 from the outer edge of the display area 2a toward the inner side thereof. In response to the slide operation, the GUI controller 11 scales down the display screen 40 and then displays the resultant screen as the scaled-down screen 40A.

Figure 55:
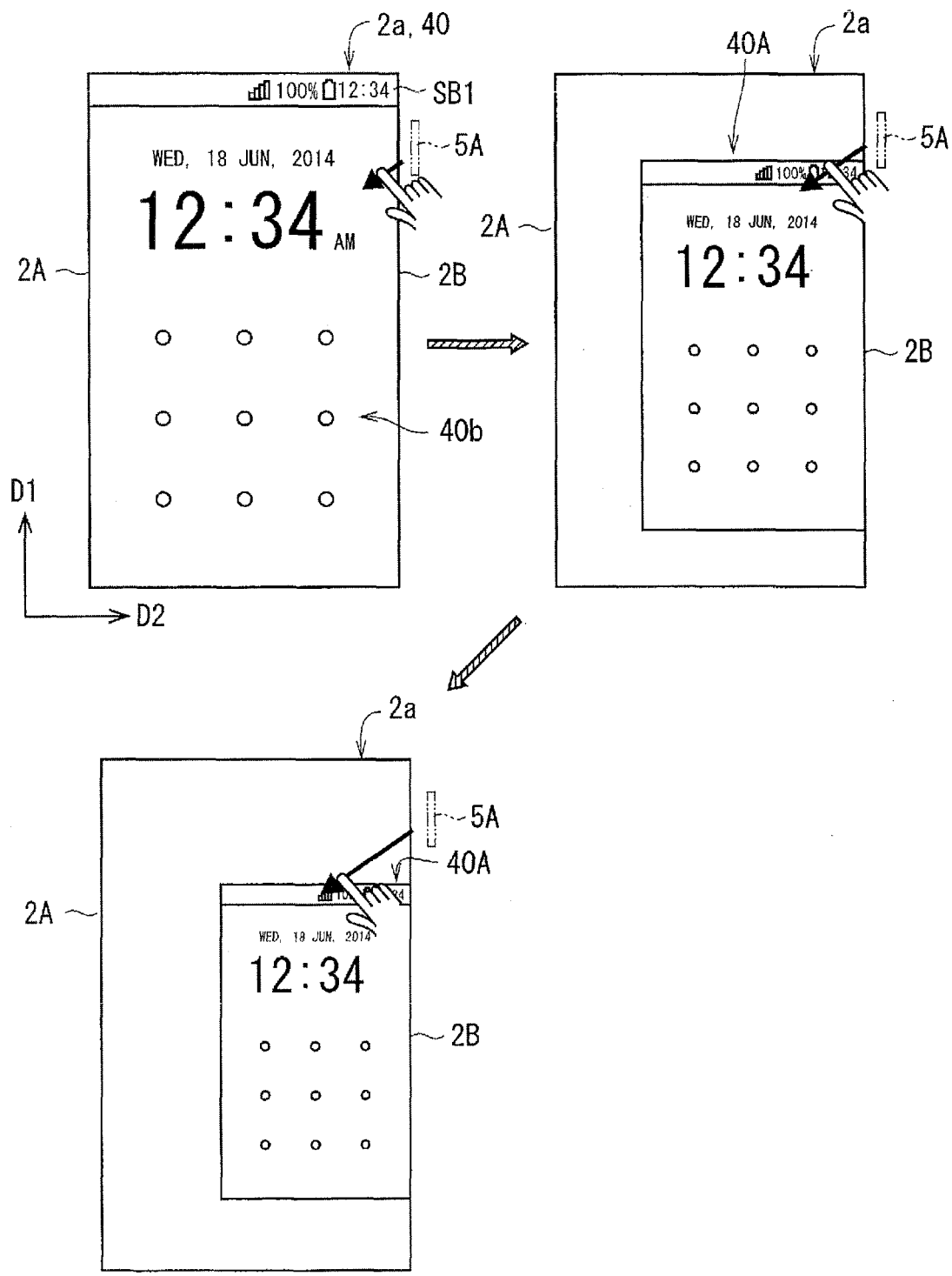
FIG. 55 schematically illustrates an example of the state in which the scale-down mode is enabled.

The GUI controller 11 may display the scaled-down screen 40A in the size corresponding to the amount of slide caused by the slide operation. The GUI controller displays the scaled-down screen 40A, whose size is reduced as the amount of slide increases. In the illustration of FIG. 55, when the operator in the upper right of the paper plane is slid even further, the size of the scaled-down screen 40A is reduced as illustrated in the lower left of the paper plane.

When the slide operation is ended, the GUI controller 11 displays the scaled-down screen 40A in the size corresponding to the point in time at which the slide operation is ended.

Figure 56:
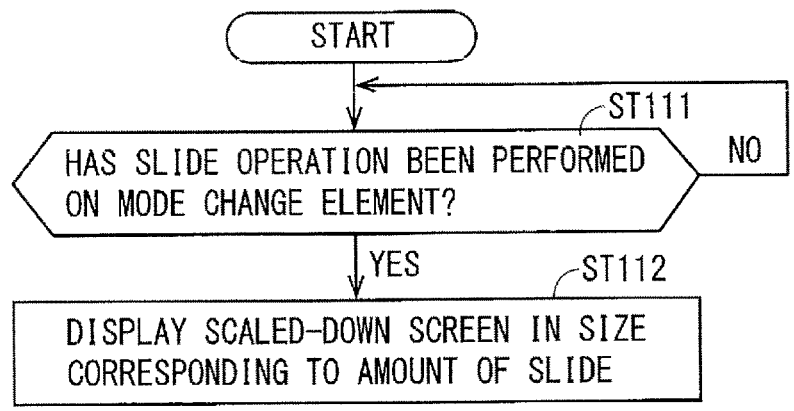
FIG. 56 illustrates a flowchart showing an example of a specific action of the GUI controller.

FIG. 56 illustrates a flowchart showing an example of the above-mentioned action of the GUI controller 11. In Step ST111, the GUI controller 11 determines whether a slide operation has been performed on the mode change element ME1. If determining that no such slide operation has been performed, the GUI controller 11 executes Step ST111 again. If determining that such a slide operation has been performed, in Step ST112, the GUI controller 11 displays the scaled-down screen 40A in the size corresponding to the amount of slide caused by the slide operation.

In this configuration, the scale-down mode can be enabled and the size of the scaled-down screen 40A can be determined in accordance with a continuous slide operation.

The first operation may be a tap operation and the size of the scaled-down screen 40A may be determined in accordance with the number of tap operations performed. For example, in response to a tap operation on the mode change element ME1, the GUI controller 11 may display the scaled-down screen 40A. Then, every time an additional tap operation is performed on the mode change element ME1, the GUI controller 11 may reduce the size of the scaled-down screen 40A and display the resultant screen.

Standby Mode

The controller 10 can enable a standby mode. The standby mode refers to the mode in which the supply of electricity to the individual constituent elements of the mobile electronic apparatus 1 is interrupted as appropriate to reduce power consumption. For example, the display 41 does not perform display in the standby mode. The standby mode may be enabled when no operation has been detected for a predetermined period of time. The standby mode may be enabled or disabled every time the power key 5A is pressed down. When the power key 5A is pressed down in the standby mode, the standby mode is disabled. When the power key 5A is pressed down with the standby mode disabled, the standby mode is enabled.

In the case where the standby mode is disabled in response to a press down operation performed on the power key 5A, the GUI controller 11 may place the mode change element ME1 adjacent to the edge 2B, which is closer to the power key 5A. The power key 5A is located closer to the edge 2B than the edge 2A and is opposed to a part of the edge 2B. The mode change element ME1 is placed adjacent to the relevant part of the edge 2B. In this configuration, the user can readily operate the mode change element ME1 immediately after operating the power key 5A.

Then, when a predetermined period of time has elapsed since the standby mode was disabled, the GUI controller 11 may display the mode change element ME1 in the set display position. Alternatively, the GUI controller 11 may display the mode change element ME1. in the set display position when the first operation is performed on the mode change element ME1.

Figure 57:
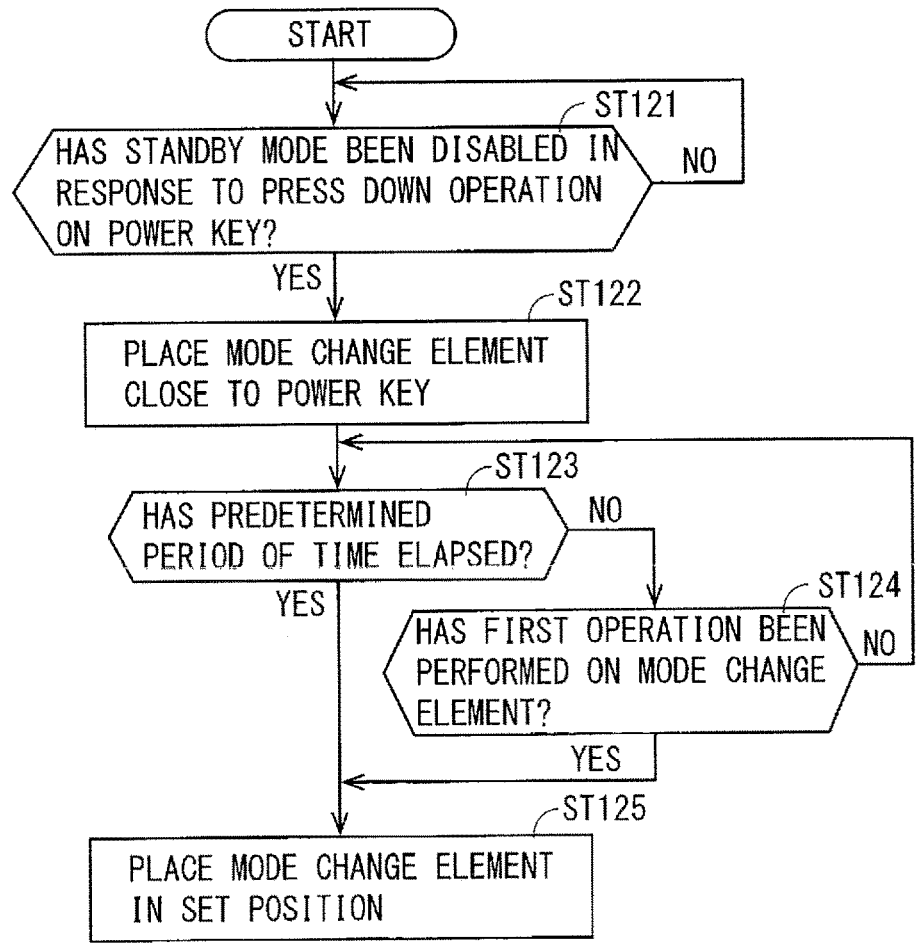
FIG. 57 illustrates a flowchart showing an example of a specific action of the GUI controller.

FIG. 57 illustrates a flowchart showing an example of the above-mentioned action of the GUI controller 11. In Step ST121, the GUI controller 11 determines whether the standby mode has been disabled in response to a press down operation performed on the power key 5A. For example, when the power key 5A is pressed down in the standby mode, the GUI controller 11 makes an affirmative determination. When the GUI controller 11 determines in Step ST121 that the standby mode has not been disabled, the GUI controller 11 executes Step 121 again. If determining that standby mode has been disabled, in Step ST122, the GUI controller 11 places the mode change element ME1 close to the power key 5A.

Then, in Step ST123, the GUI controller 11 determines whether the predetermined period of time has elapsed since Step ST121 was executed. If determining that the predetermined period of time has not elapsed, in Step ST124, the GUI controller determines whether the first operation has been performed on the mode change element ME1. If determining in Step ST124 that the first operation has not been performed, the GUI controller 11 executes Step ST123 again.

Upon an affirmative determination in Step ST123 or Step ST124, in Step ST125, the GUI controller 11 places the mode change element ME1 in the set position.

Seventh Embodiment

Orientation of Mobile Electronic Apparatus Held by User

Figure 58:
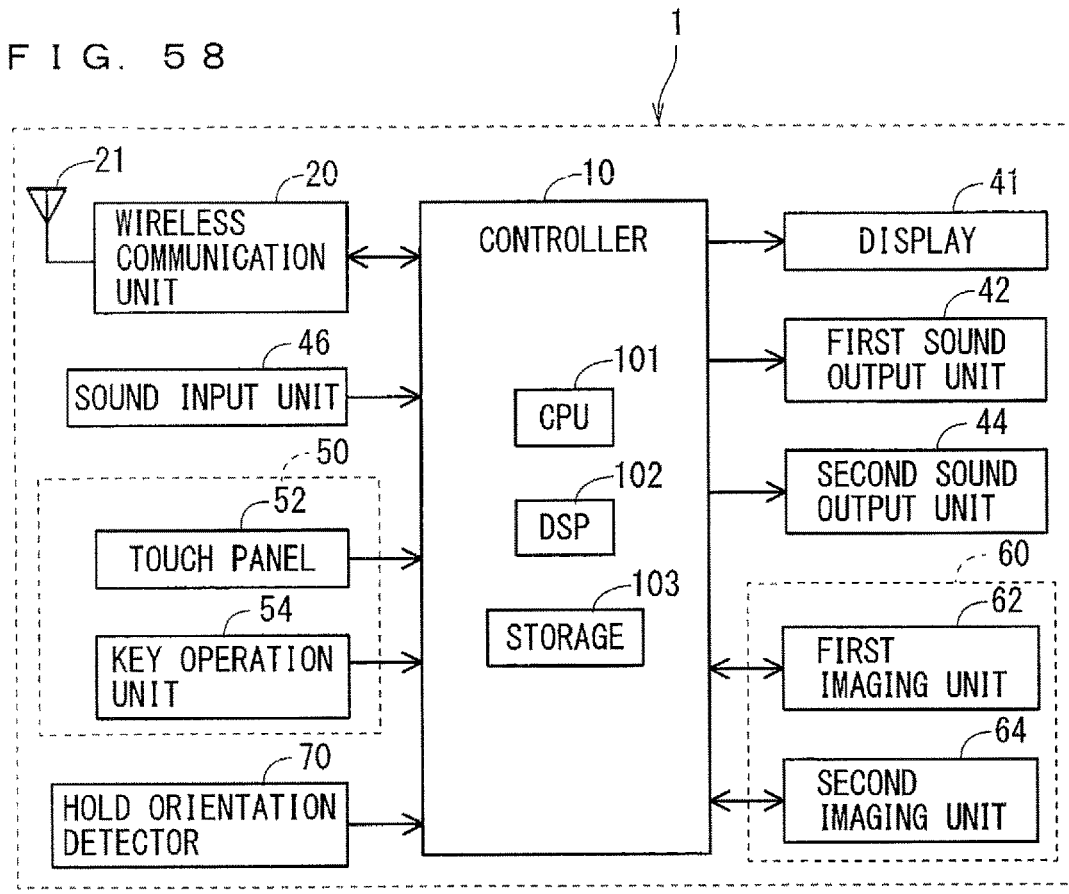
FIG. 58 schematically illustrates an example of the electrical configuration of the mobile electronic apparatus.
Figure 59:
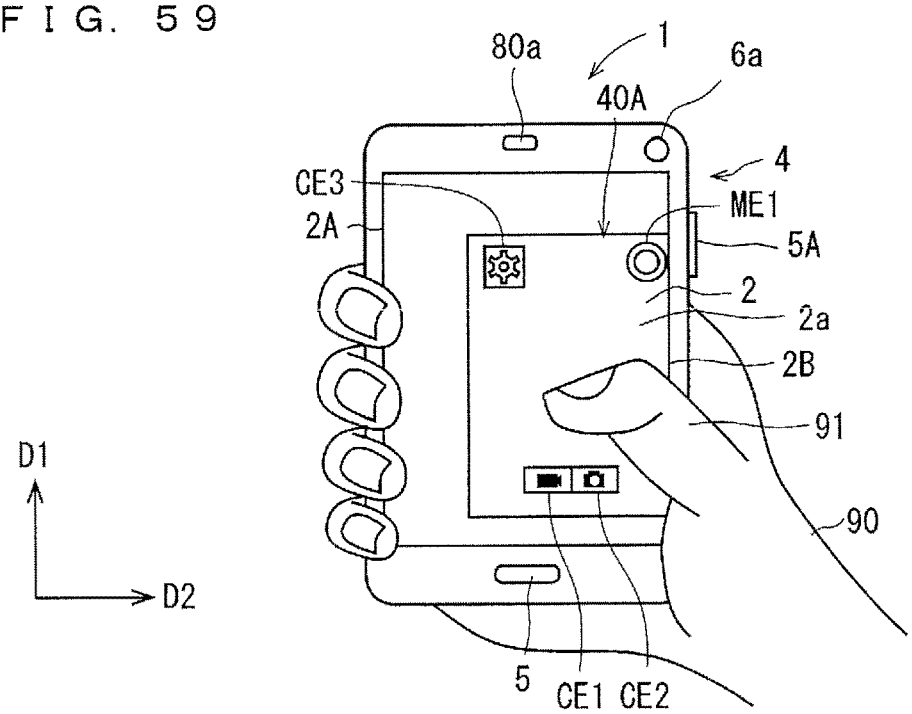
FIG. 59 schematically illustrates an example of the state in which the mobile electronic apparatus is held in portrait orientation.
Figure 60:
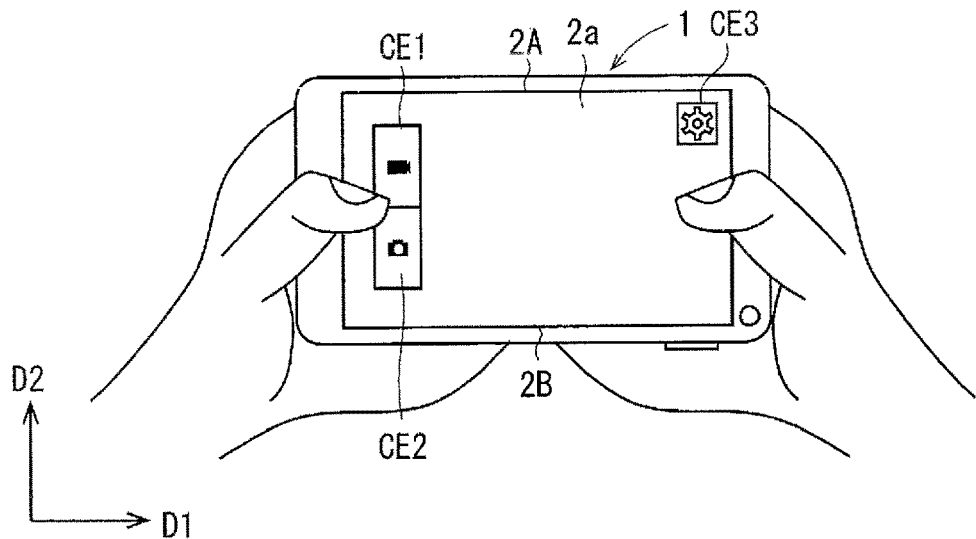
FIG. 60 schematically illustrates an example of the state in which the mobile electronic apparatus is held in landscape orientation.

FIG. 58 illustrates an example of the electrical configuration of the mobile electronic apparatus 1 according to a seventh embodiment. In addition to the constituent elements of the mobile electronic apparatus 1 illustrated in FIG. 3, the mobile electronic apparatus 1 illustrated in FIG. 58 includes a hold orientation detector 70. The mobile electronic apparatus 1 can be held by the user in different orientations at different times. FIGS. 59 and 60 schematically illustrate examples in which the mobile electronic apparatus 1 is held by the user. The mobile electronic apparatus 1 is sometimes held in such a manner that the longitudinal direction D1 of the mobile electronic apparatus 1 is vertical (the mobile electronic apparatus 1 is held in portrait orientation) (see FIG. 59). Also, the mobile electronic apparatus 1 is sometimes held in such a manner that the longitudinal direction D1 of the mobile electronic apparatus 1 is horizontal to the user (the mobile electronic apparatus 1 is held in landscape orientation) (see FIG. 60). The hold orientation detector 70 can detect the orientation of the mobile electronic apparatus 1 held by the user.

The hold orientation detector 70 includes, for example, an accelerometer to measure the acceleration of the mobile electronic apparatus 1. To be more specific, the accelerometer obtains acceleration components in three orthogonal directions. The gravitational acceleration is included in the acceleration. Thus, the orientation of the mobile electronic apparatus 1 relative to the ground can be detected based on the measured acceleration.

In the illustration of FIG. 59, the user holds the mobile electronic apparatus 1 in portrait orientation and the scaled-down screen 40A is displayed on the display area 2a. In the illustration of FIG. 59, the mobile electronic apparatus 1 is held in the right hand 90 and the scaled-down screen 40A is displayed so as to adjoin the edge 2B. Thus, the user can easily operate the scaled-down screen 40A.

For example, an imaging screen is displayed on the scaled-down screen 40A. The processor 13 displays the imaging screen when the processor 13 captures an image using the imaging unit 60. On the imaging screen, elements such as a recording element CE1, an imaging element CE2, a setting element CE3 are superimposed. The recording element CE1 functions as the button for capturing video. The imaging element CE2 functions as the button for capturing a still image. The setting element CE3 functions as the button for performing various types of setting associated with the camera function. In the illustration of FIG. 59, the recording element CE1 and the imaging element CE2 are located on the scaled-down screen 40A on the lower side of the paper plane and are arranged side by side along the transverse direction D2. The setting element CE3 is located on the upper left of the scaled-down screen 40A. Although not shown in FIG. 59, an image captured by the imaging unit 60 is also displayed on the imaging screen.

Meanwhile, as illustrated in FIG. 60, the mobile electronic apparatus 1 in landscape orientation can be held in, for example, both hands of the user. In this case, the user is more likely to operate the mobile electronic apparatus 1 with both hands. Unlike the case in which the user holds the mobile electronic apparatus 1 in one hand and operates the mobile electronic apparatus 1 with the hand (see FIG. 59), the user can easily operate every part of the display area 2a.

When the GUI controller 11 detects that the mobile electronic apparatus 1 operating in the scale-down mode is held in landscape orientation, the GUI controller 11 may disable the scale-down mode and enable the normal mode. In other words, when the mobile electronic apparatus 1 operating in the scale-down mode is held in such a manner that the longitudinal direction D1 of the mobile electronic apparatus 1 is nearly horizontal rather than vertical, the scaled-down screen 40A may be scaled up and then the resultant screen may be displayed as the display screen 40 on the display area 2a. When the mobile electronic apparatus 1 is held in landscape orientation, the normal mode is enabled on the basis of the prediction that the user neither holds the mobile electronic apparatus 1 in one hand nor operates it with the hand. Thus, the user can enable the normal mode by holding the mobile electronic apparatus 1 in landscape orientation, without the need to operate the mode change element ME1. This configuration can eliminate the need for the operation of enabling the normal mode. This enhances the convenience of the user.

In the illustration of FIG. 60, when it is detected that the mobile electronic apparatus 1 is held in landscape orientation, the processor 13 changes the placement of the recording element CE1, the imaging element CE2, and the setting element CE3. For example, the recording element CE1 and the imaging element CE2 are located on display screen 40 as shown on the left side of the paper plane and are arranged side by side along the transverse direction D2. The setting element CE3 is located on the display screen 40 on the upper right of the paper plane.

When it is detected that the mobile electronic apparatus 1 is held in landscape orientation, the GUI controller 11 may inhibit the scale-down mode from being enabled. For example, the GUI controller 11 does not place the mode change element ME1 on the display area 2a. In this configuration, the scale-down mode cannot be enabled while the mobile electronic apparatus 1 is held in landscape orientation. This can avoid enabling the scale-down mode in response to an inadvertent operation.

The hold orientation detector 70 may detect the orientation of the mobile electronic apparatus 1 held by the user based on the image captured by the first imaging unit 62. Specifically, in a case where the both eyes of the user are shown in the captured image, the orientation is detected based on the position of the eyes. For example, when it is determined that the straight line joining both eyes of the user is approximately orthogonal to the longitudinal direction D1 of the mobile electronic apparatus 1, the hold orientation detector 70 may detect that the mobile electronic apparatus 1 is held in portrait orientation. When it is determined that the straight line is parallel with the longitudinal direction D1 of the mobile electronic apparatus 1, the hold orientation detector 70 may detect that the mobile electronic apparatus 1 is held in landscape orientation. In this configuration, when the user, who is lying down, holds the mobile electronic apparatus 1 in portrait orientation, the hold orientation detector 70 can correctly detect that the mobile electronic apparatus 1 is in portrait orientation.

Figure 61:
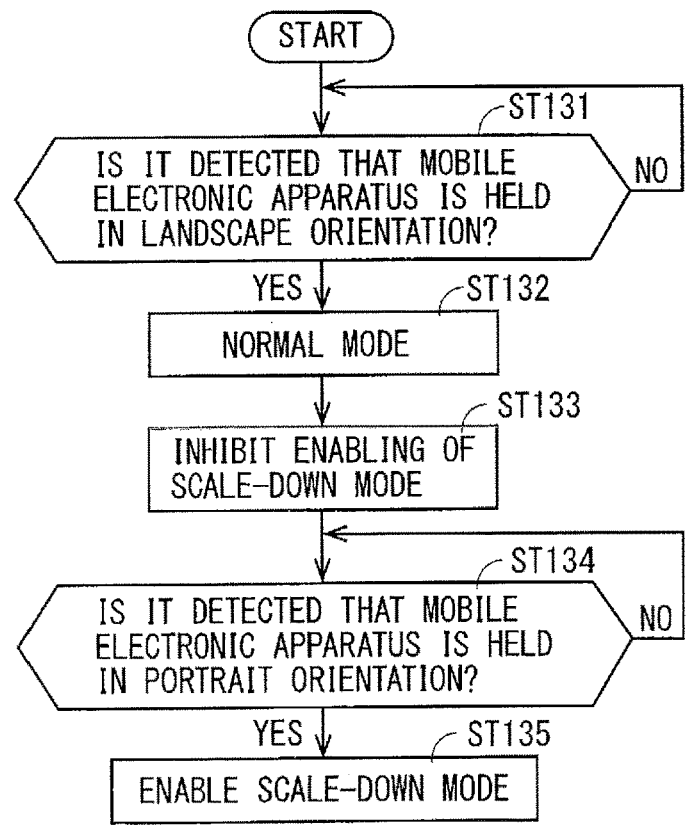
FIG. 61 illustrates a flowchart showing an example of a specific action of the GUI controller.

FIG. 61 illustrates a flowchart showing an example of the above-mentioned action of the GUI controller 11. In Step ST131, the GUI controller 11 determines whether the hold orientation detector 70 detects that the mobile electronic apparatus 1 is held in landscape orientation. When the hold orientation detector 70 fails to detect the mobile electronic apparatus 1 held in landscape orientation, the GUI controller 11 executes Step ST131 again.

When the hold orientation detector 70 detects that the mobile electronic apparatus 1 is held in landscape orientation, in step ST132, the GUI controller 11 enables the normal mode in which the display screen 40 is displayed on the display area 2a. Assuming that the mobile electronic apparatus 1 operates in the scale-down mode in Step ST131, the scale-down mode is disabled and the normal mode is enabled. Assuming that the mobile electronic apparatus 1 operates in the normal mode in Step ST131, the operation in the normal mode is continued.

Subsequently to Step ST132, in Step ST133, the GUI controller 11 may inhibit the scale-down mode from being enabled. When the first operation is performed on the mode change element ME1 of the mobile electronic apparatus 1 held in such a manner that the longitudinal direction D1 is nearly horizontal rather than vertical (the mobile electronic apparatus 1 is held in landscape orientation), the scaled-down screen 40A is not displayed. Subsequently to Step ST133, in Step ST134, the GUI controller 11 in the above-mentioned configuration determines whether the hold orientation detector 70 detects that the mobile electronic apparatus 1 is held in portrait orientation. When the GUI controller 11 determines that the hold orientation detector 70 fails to detect the mobile electronic apparatus 1 held in portrait orientation, the GUI controller 11 executes Step ST134 again. When the GUI controller 11 determines that the hold orientation detector 70 detects the mobile electronic apparatus 1 held in portrait orientation, in Step ST135, the GUI controller 11 enables the scale-down mode. Specifically, the GUI controller 11 places the mode change element ME1.

In a case where the mobile electronic apparatus 1 was operating in the scale-down mode immediately before being rotated from portrait to landscape orientation, when the mobile electronic apparatus 1 is then rotated from landscape to portrait orientation, the GUI controller 11 may restore the mobile electronic apparatus 1 to the scale-down mode. This configuration allows the user to readily operate the scaled-down screen 40A with one hand. As a matter of course, in a case where the mobile electronic apparatus 1 was operating in the normal mode before being rotated from portrait to landscape orientation, when the mobile electronic apparatus 1 is then rotated from landscape to portrait orientation, the operation in the normal mode may be continued.

The controller 10 may rotate the display contents on the display area 2a depending on the orientation of the mobile electronic apparatus 1, which may be held in portrait orientation or landscape orientation. The display contents of the mobile electronic apparatus 1 held in landscape orientation may be obtained by rotating, through 90 degrees, the display contents of the mobile electronic apparatus 1 held in portrait orientation. This function can be enabled and disabled. For example, the user enables or disables the function by performing input through the input unit 50. When the function is disabled, the GUI controller 11 may put the mobile electronic apparatus 1 held in landscape orientation into the scale-down mode.

The GUI controller 11 may cause the storage 103 or the like to store the mode (the normal mode or the scale-down mode) in which the mobile electronic apparatus 1 was operating just before the detection of its rotation to landscape orientation. When it is detected that the mobile electronic apparatus 1 is held in portrait orientation, the GUI controller 11 may enable the stored mode. Specifically, when the mobile electronic apparatus 1 operating in the scale-down mode is held in landscape orientation and then when it is rotated from landscape to portrait orientation, it may be placed in the scale-down mode. Similarly, when the mobile electronic apparatus 1 operating in the normal mode is held in landscape orientation and then when it is rotated from landscape to portrait orientation, it is placed in the normal mode.

In some embodiments, the mobile electronic apparatus 1 may be placed in the normal mode whenever it is rotated from landscape to portrait orientation.

Mobile Electronic Apparatus 1 being Laid Stationary

In a case where the mobile electronic apparatus 1 is horizontal to the ground, the GUI controller 11 may enable the normal mode. When the mobile electronic apparatus 1 is laid stationary, it is conceivable that the mobile electronic apparatus 1 is not being operated with one hand of the user and the GUI controller 11 accordingly enables the normal mode. When the mobile electronic apparatus 1 operating in the scale-down mode is placed in a horizontal position, the normal mode is enabled. When the mobile electronic apparatus 1 is picked up by the user in a manner to incline toward the ground, the GUI controller 11 enables the mode in which the mobile electronic apparatus 1 was placed before being laid stationary.

Standby Mode

The GUI controller 11 may cause the storage 103 or the like to store the mode (the normal mode or the scale-down mode) in which the mobile electronic apparatus 1 was placed immediately before being placed in the standby mode. The GUI controller 11 may enable the stored mode when the standby mode is disabled at the press of the power key 5A. In a case where the mobile electronic apparatus 1 operating in the scale-down mode is placed in the standby mode, when the standby mode is then disabled at the press of the power key 5A, the mobile electronic apparatus 1 is placed in the scale-down mode.

Incoming Call

Figure 62:
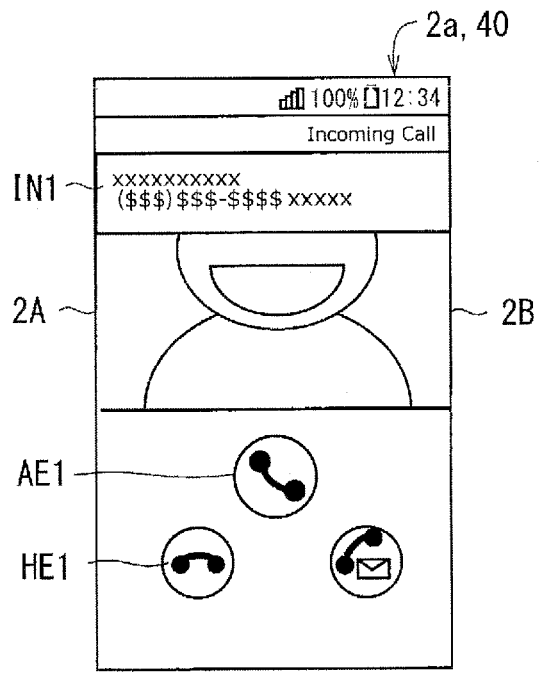
FIG. 62 schematically illustrates an example of an incoming call screen.

The processor 13 can perform a voice call function. When the processor 13 receives, through the wireless communication unit 20, an incoming call signal for voice call communication from another communication apparatus, the processor 13 displays an incoming call screen on the display area 2a. FIG. 62 schematically illustrates an example of the display area 2a on which the incoming call screen is displayed. In the illustration of FIG. 62, the normal mode is enabled. The incoming call screen shows information IN1 on a calling party as well as elements AE1 and HE1 respectively function as a button for taking the incoming call and a button for blocking the incoming call. The information IN1 on the calling party includes, for example, the telephone number or the name of the calling party. The processor 13 starts a voice call in response to an operation (e.g., a tap operation) performed on the element AE1 and interrupts the communication with the calling party in response to an operation (e.g., a tap operation) on the element HE1.

The information IN1 on the calling party is preferably displayed in close-up on the incoming call screen. This makes it easier for the user to obtain information IN1 on the calling party. When an incoming call signal is received by the mobile electronic apparatus 1 operating in the scale-down mode, the GUI controller 11 preferably enables the normal mode before the processor 13 displays the incoming call screen.

Figure 63:
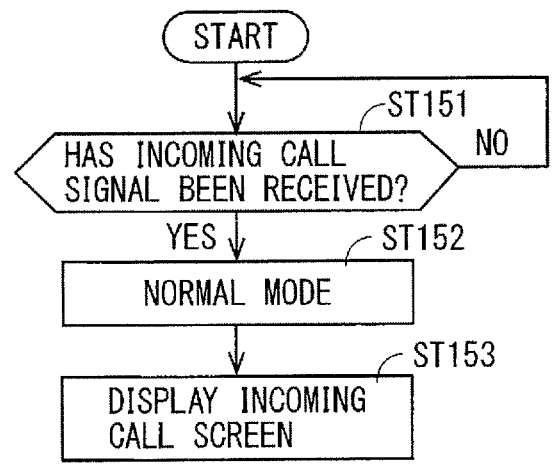
FIG. 63 illustrates a flowchart showing an example of a specific action of the GUI controller.

FIG. 63 illustrates a flowchart showing an example of the above-mentioned action of the GUI controller 11. In Step ST151, the GUI controller 11 determines whether an incoming call signal has been received. If determining that no incoming call signal has been received, the GUI controller 11 executes Step ST151 again. If determining that an incoming call has been received, in Step ST152, the GUI controller 11 enables the normal mode. That is to say, in response to an incoming call signal received during the operation in the scale-down mode, the scale-down mode is disabled and the normal mode is enabled. When an incoming call signal is received during the operation in the normal mode, the operation in the normal mode is continued. Then, in Step ST153, the processor 13 displays the incoming call screen on the display area 2a.

When an incoming call signal is received during the operation in the standby mode, the controller 10 disables the standby mode. In this case as well, the GUI controller 11 may enable the normal mode. That is to say, when an incoming call signal is received, the GUT controller 11 enables the normal mode, regardless of whether the mobile electronic apparatus 1 has been operating in the standby mode. This can provide an easy-to-see incoming call screen, from which the user can readily obtain the information IN1 on the calling party.

Eighth Embodiment

In an eighth embodiment, the display area 2a during the operation in the scale-down mode will be described.

Status Notification Area

With reference to FIGS. 7 to 9, the display screen 40 includes a status notification area SB1. For example, the processor 13 displays the status notification area SB1 adjoined by the upper edge of the display screen 40. The status notification area SB1 has, for example, a rectangular shape extending along dig transverse direction D2. The status notification area SB1 shows information which the user is to be notified of, such as the radio wave reception condition in wireless communication, the remaining battery life, and the current time. The radio wave reception condition in wireless communication can be determined based on, for example, the strength of a reception signal received through the wireless communication unit 20. The individual constituent elements of the mobile electronic apparatus 1 receive electric supply from a battery (not shown). The processor 13 can measure the remaining battery life. The processor 13 measures the remaining battery life based on, for example, the voltage across the battery. The current time can be acquired by a predetermined clock circuit (e.g., a timer circuit).

Figure 64:
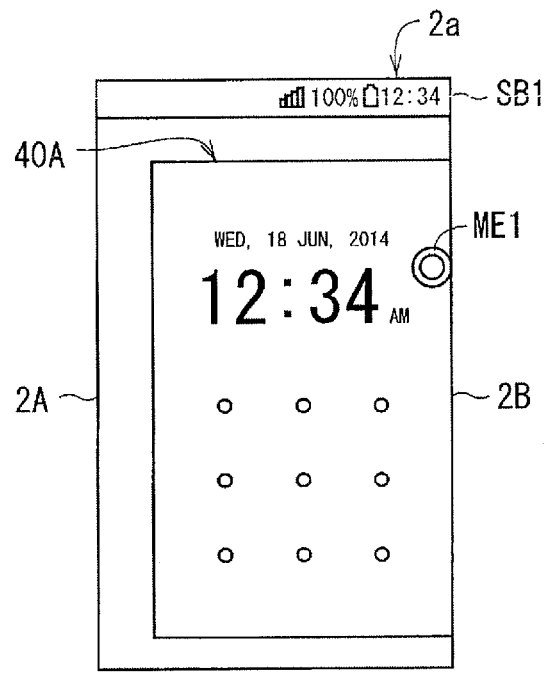
FIG. 64 schematically illustrates an example of the display area in the scale-down mode.

As illustrated in FIG. 11, in the scale-down mode, the GUI controller 11 may scale down the status notification area SB1. That is to say, the status notification area SB1 may be displayed so as to adjoin, for example, the upper edge of the scaled-down screen 40A. This configuration is not an absolute must. As illustrated in FIG. 64, in the scale-down mode, the GUI controller 11 may display the status notification area SB1 in the original size and in the original position.

In this configuration, the status notification area SB1 is easy to see during the operation in the scale-down mode.

When no element that functions as a button is displayed on the status notification area SB1, scaling down the status notification area SB1 does not contributed to enhanced operability. For the sake of the foremost readability of the display contents on the status notification area SB1, the status notification area SB1 is displayed in the original size during the operation in the scale-down mode.

Notification Screen

In the scale-down mode, the notification screen NR1 may be displayed in response to an operation (e.g., a downward slide operation) performed on, for example, the upper edge of the scaled-down screen 40A (see FIG. 37 as well). In response to such an operation, the notification screen NR1 may be displayed on the scaled-down screen 40A.

Figure 65:
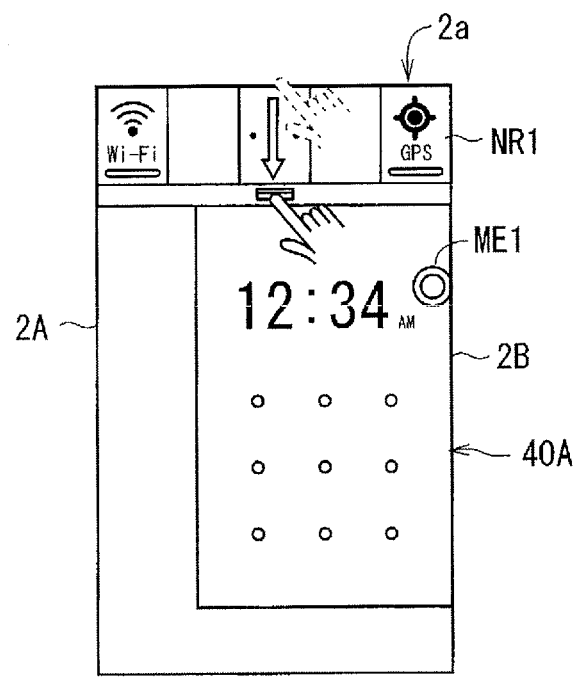
FIG. 65 schematically illustrates an example of the state in which a notification screen is displayed.

Alternatively, in the scale-down mode, the notification screen NR1 may be displayed in response to an operation (e.g., a downward slide operation) performed on the upper edge of the display area 2a. FIG. 65 schematically illustrates an example of the state in which the notification screen NR1 is displayed. When the user slides the operator from the upper edge of the display area 2a in a downward direction, the notification screen NR1 is displayed. FIG. 65 shows the display area 2a during the slide operation, where only part of the notification screen NR1 is displayed. When the user slides the operator further in a downward direction, the notification screen NR1 is displayed all over the display area 2a.

Even if the mobile electronic apparatus 1 is operating in the scale-down mode, the notification screen is displayed in a larger size. The user can easily obtain the notification information included in the notification screen.

Background Area (Notification Information)

On a portion (hereinafter referred to as a background area 2d) of the display area 2a that is not occupied by the scaled-down screen 40A, no image may be displayed or a background image may be displayed.

Figure 66:
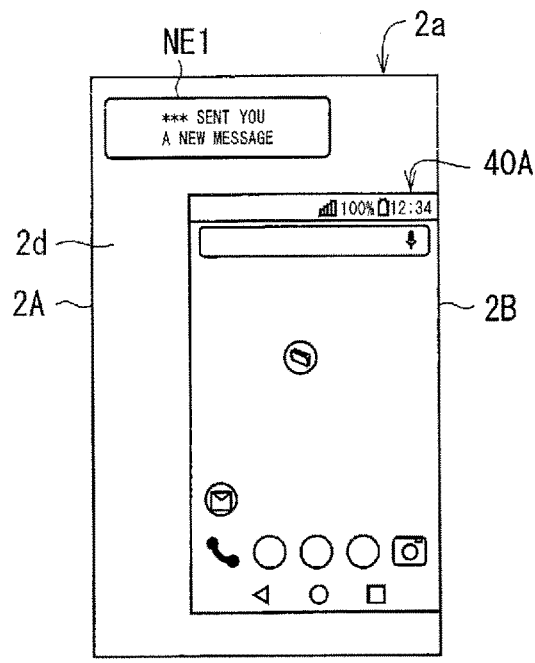
FIG. 66 schematically illustrates an example of the display area in the scale-down mode.

On the background area 2d, predetermined notification information may be displayed. The processor 13 has, for example, an email function. Upon receipt of an email, the processor 13 may display, on the background area 2d, notification of the receipt of the email and information on the sender of the email. FIG. 66 schematically illustrates an example of the display area 2a. As illustrated in FIG. 66, the background area 2d includes a notification area NE1. For example, in the notification area NE1, notification of the receipt of an email and the sender of the email are displayed.

The notification information is not necessarily associated with an email. Notification information of any type may be displayed.

Background Area (Dual Screen)

Figure 67:
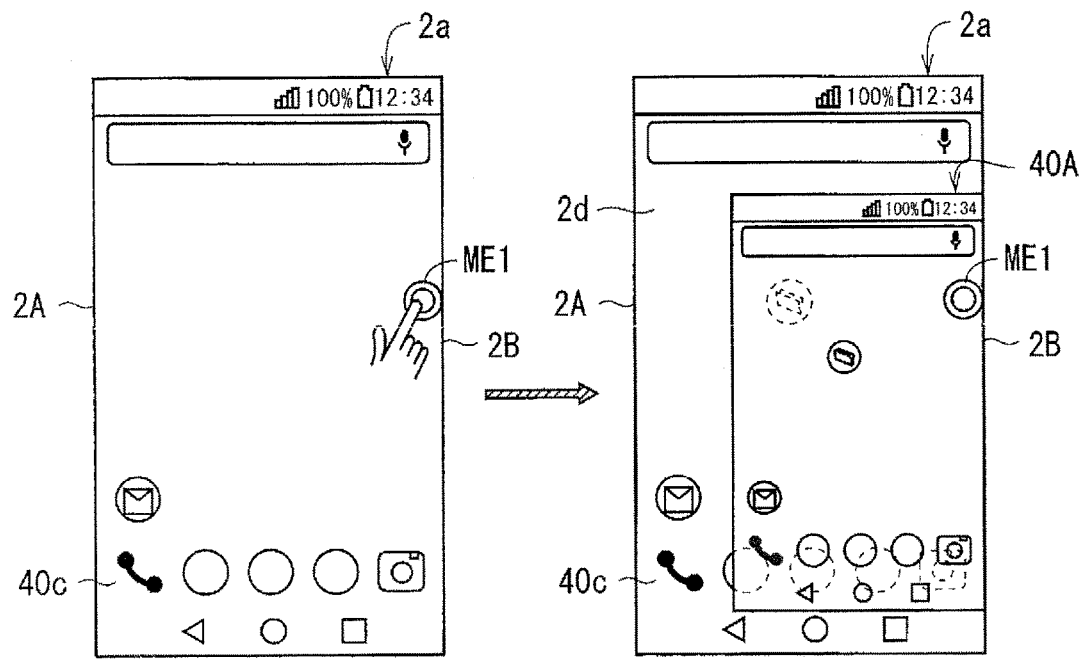
FIG. 67 schematically illustrates an example of the state in which the scale-down mode is enabled.

The display screen 40 displayed just before the switch to the scale-down mode may be displayed on the background area 2d. FIG. 67 schematically illustrates an example of the state in which the scale-down mode is enabled. In response to an operation performed on, for example, the mode change element ME1, the scaled-down screen 40A is displayed. In the illustration of FIG. 67, the display screen 40 displayed just before the switch to the scale-down mode is displayed on the background area 2d. As illustrated in FIG. 67, the display screen 40 may be displayed all over the display area 2a and the scaled-down screen 40A may be displayed in a translucent manner so as to be superimposed on the display screen 40.

The processor 13 may determine the validity of an operation performed on the background area 2d. In other words, the processor 13 may accept an operation performed on the background area 2d. In the area on which the scaled-down screen 40A is displayed, it is only required that the processor 13 accept operations associated with the scaled-down screen 40A. In the case where the display contents displayed on the background area 2d are displayed all over the display area 2a, when an operation associated with the display contents displayed all over the display area 2a is performed on the area on which the scaled-down screen 40A is displayed, the processor 13 does not need to accept the operation. The user can thus easily perform an operation associated with the scaled-down screen 40A.

Figure 68:
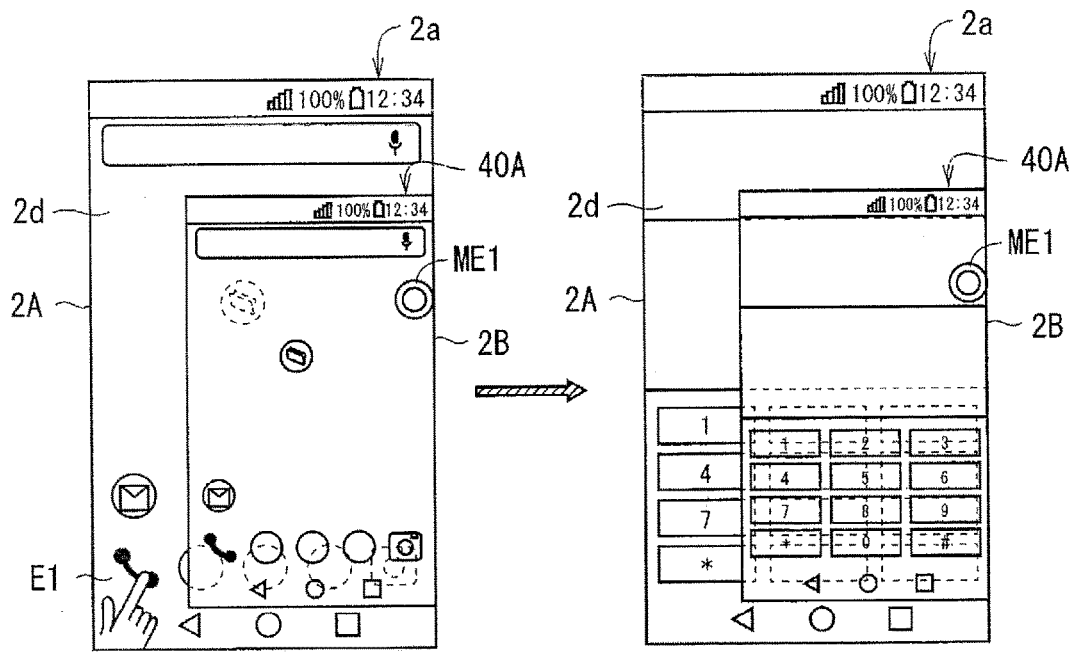
FIG. 68 schematically illustrates an example of the state in which an operation is performed on a background area.

FIG. 68 schematically illustrates an example of the state in which an operation is performed on the background area 2d. On the left side of the paper plane in FIG. 68, the element E1 indicative of the telephone function is displayed on the background area 2d. When an operation (e.g., a tap operation) is performed on the element E1 on the background area 2d, the processor 13 executes an application corresponding to the element E1 and then displays the result of execution on the scaled-down screen 40A and the background area 2d. In response to an operation performed on, for example, the element E1 indicative of the telephone function, the processor 13 displays an outgoing call screen all over the display area 2a and concurrently displays the outgoing call screen on the scaled-down screen 40A in a translucent manner.

As described above, operations performed on the background area 2d are valid, resulting in improved operability.

Figure 69:
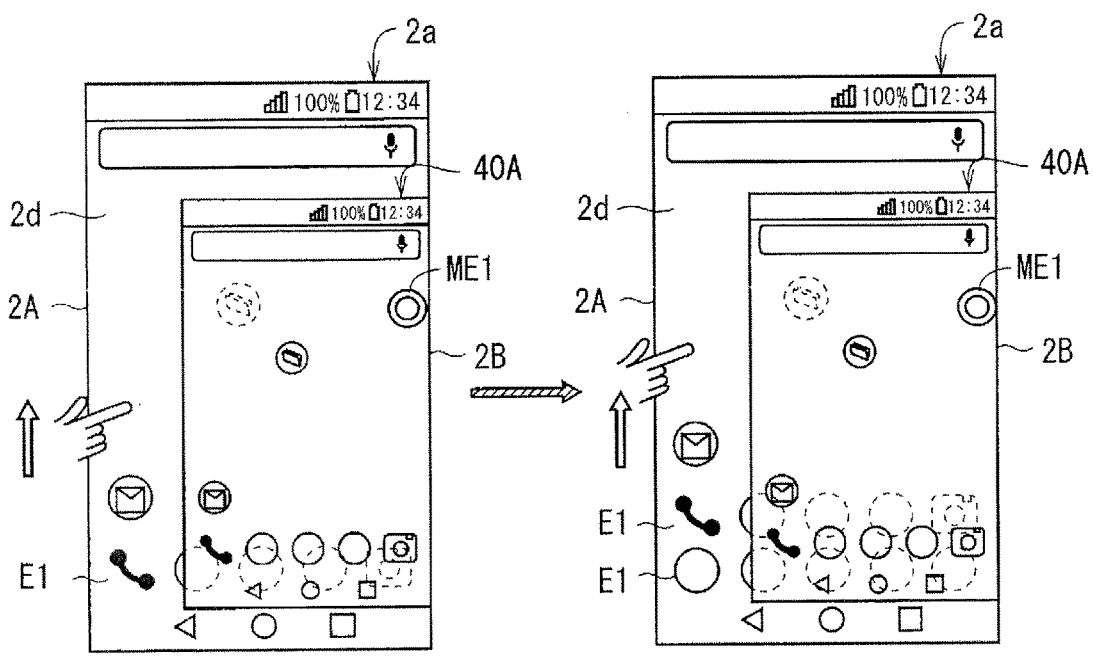
FIG. 69 schematically illustrates an example of the state in which an operation is performed on the background area.

In one example mentioned above, the background area 2d and the scaled-down screen 40A are linked to each other. However, the result of an operation performed on the background area 2d may be displayed only on the background area 2d, without being reflected on the scaled-down screen 40A. FIG. 69 schematically illustrates an example of the state in which an operation is performed on the background area 2d. In the illustration of FIG. 69, the home screen is displayed on the background area 2d. In response to, for example, an upward slide operation on the operator in the background area 2d, the processor 13 moves the home screen upward in the background area 2d, so that other elements E1 placed further below are also displayed on the background area 2d. Meanwhile, the processor 13 does not reflect the operation performed on the background area 2d upon the scaled-down screen 40A, in which display contents remain unchanged.

As illustrated in FIG. 69, the processor 13 may display the result of the operation performed on the background area 2d all over the display area 2a and concurrently display the scaled-down screen 40A, which is unaffected by the operation, in a translucent manner.

Alternatively, in response to an operation on, for example, the element E1 in the background area 2d, the processor 13 executes the application corresponding to the element E1 and then displays the display contents produced by the execution of the application on the background area 2d but not on the scaled-down screen 40A.

In this configuration, the background area 2d and the scaled-down screen 40A can be used separately.

In the case where different display contents can be displayed on the background area 2d and the scaled-down screen 40A, the display contents on the background area 2d and the display contents on the scaled-down screen 40A can be interchanged with each other in response to a predetermined operation. Examples of the predetermined operation include a slide operation of crossing the border between the scaled-down screen 40A and the background area 2d. FIG. 70 schematically illustrates an example of the state in which the above-mentioned operation is performed. In the display area 2a illustrated on the left side of the paper plane in FIG. 70, the home screen is displayed all over the display area 2a and the outgoing call screen is displayed on the scaled-down screen 40A in a translucent manner. For example, when the user slides the operator from the scaled-down screen 40A to the background area 2d, the processor 13 interchanges the display contents on the background area 2d and the display contents on the scaled-down screen 40A with each other. In the display area 2a illustrated on the right side of the paper plane in FIG. 70, the outgoing call screen is displayed all over the display area 2a and the home screen is displayed on the scaled-down screen 40A.

As described above, the display contents on the background area 2d and the display contents on the scaled-down screen 40A can be interchanged with each other in response to the predetermined operation. This results in improved operability.

Landscape Orientation

As described in the sixth embodiment, the scale-down mode may be inhibited from being enabled while the mobile electronic apparatus 1 is held in landscape orientation. However, while the mobile electronic apparatus 1 is held in landscape orientation, the GUI controller 11 may display the mode change element ME1. In this case, in response to the first operation on the mode change element ME1, the GUI controller 11 does not enable the scale-down mode and enables a dual screen mode. When the hold orientation detector 70 detects that the mobile electronic apparatus 1 is held in landscape orientation, the GUI controller 11 keeps the scale-down mode disabled and regards enabling the dual screen mode as the processing corresponding to the first operation on the mode change element ME1.

Figure 71:
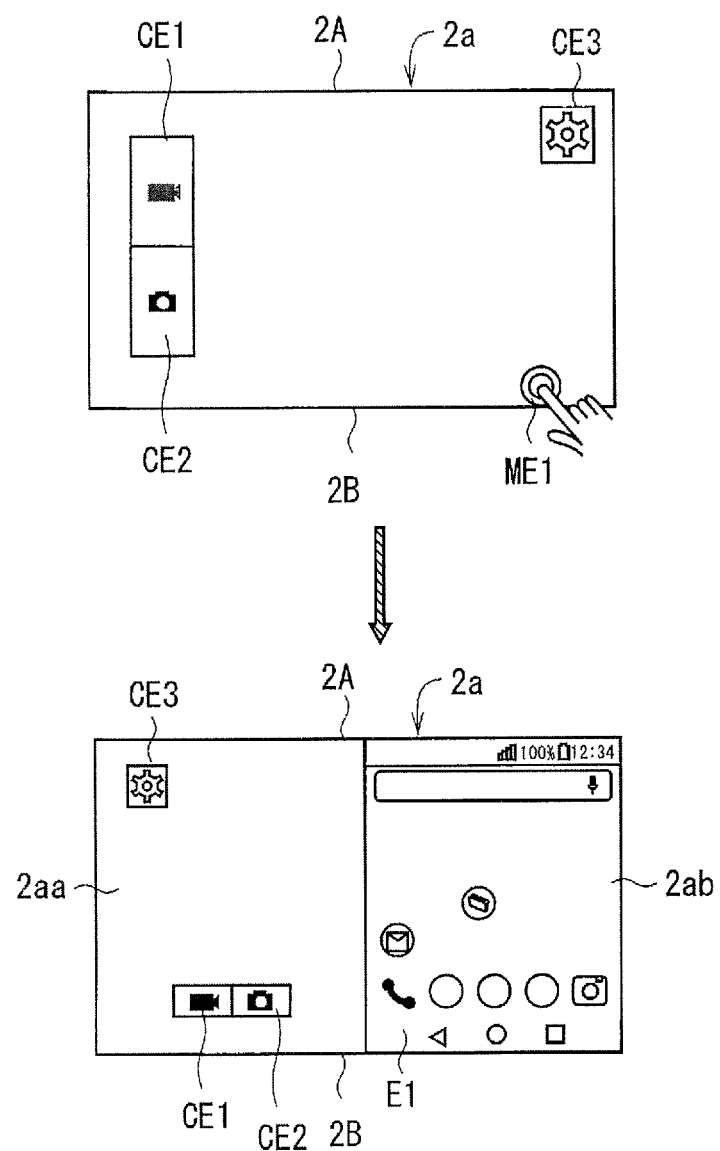
FIG. 71 schematically illustrates an example of the state in which a dual screen mode is enabled.

FIG. 71 schematically illustrates an example of the state in which the first operation is performed on the mode change element ME1 while the electronic apparatus 1 is held in landscape orientation. In the display area 2a illustrated on the upper side of the paper plane in FIG. 71, an imaging screen or the like is displayed all over the display area 2a. The mode change element ME1 is displayed while the mobile electronic apparatus 1 is held in landscape orientation. In response to the first operation (e.g., a tap operation) on the mode change element ME1, the processor 13 splits the display area 2a into a plurality of areas and then displays the imaging screen and other screens in the corresponding split areas. The display area 2a illustrated on the lower side of the paper plane in FIG. 71 is split in two in such a manner that split areas 2aa and 2ab are located side by side along the longitudinal direction D1. In the split area 2aa, the imaging screen displayed just before the operation on the mode change element ME1 is displayed. In the split area 2ab, the home screen is displayed.

Ninth Embodiment

Figure 72:
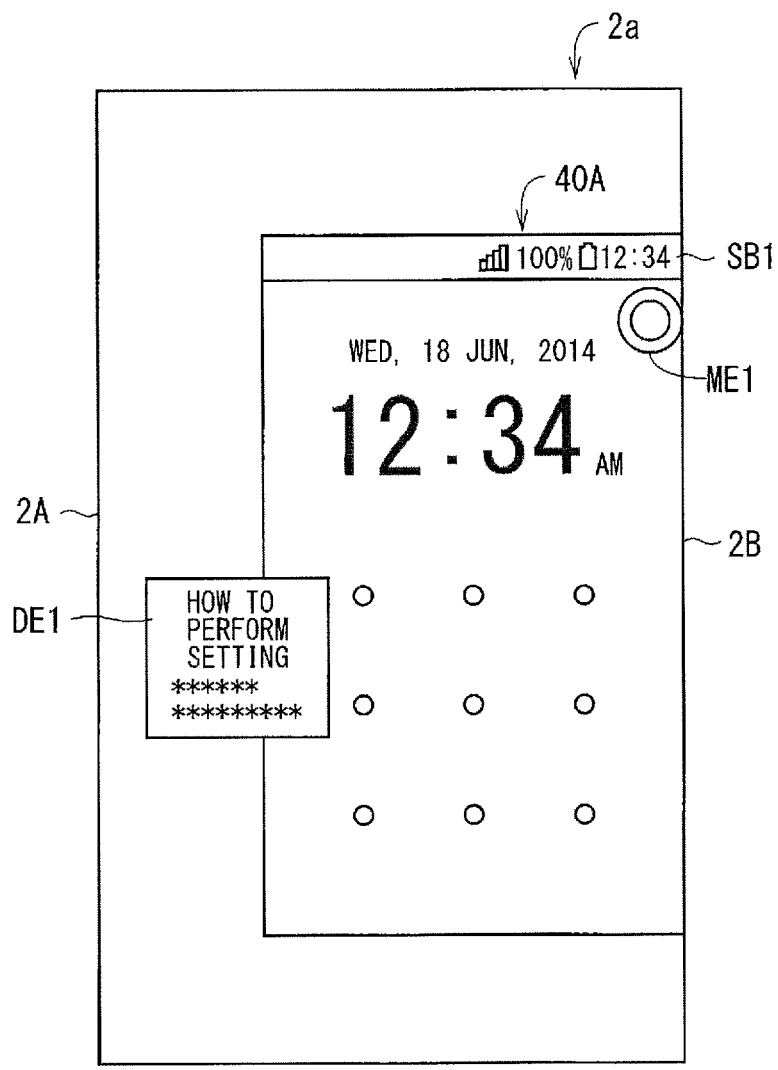
FIG. 72 schematically illustrates an example of the display area in the scale-down mode.

When enabling the GUI setting mode, the GUI setting unit 12 may display, on the display area 2a, a text describing how to perform setting associated with the mode change element ME1 or the scaled-down screen 40A. FIG. 72 schematically illustrates an example of the display area 2a. As illustrated in FIG. 72, the GUI setting unit 12 displays, for example, a description element DE1 on the display area 2a. The description element DE1 describes how to set at least one of the display position of the mode change element ME1, the display position of the scaled-down screen 40A, or the size of the scaled-down screen 40A.

While the mobile electronic apparatus has been described above in detail, the foregoing description is in all aspects illustrative and not restrictive. It is understood that numerous modifications which have not been exemplified can be devised without departing from the scope of the mobile electronic apparatus according to the present disclosure.

Embodiments are applicable in combination as long as they are consistent with each other. The method for setting the position of the mode change element ME1 in the transverse direction D2 and the position of the mode change element ME1 in the longitudinal direction D1, the method for setting the display position of the scaled-down screen 40A in the transverse direction D2 and the display position of the scaled-down screen 40A in the longitudinal direction D1, and the method for setting the size of the scaled-down screen 40A are applicable in combination.

What is claimed is:

1. A mobile electronic apparatus comprising:
 a display including a display area having a first edge and a second edge, the display being configured to display a display screen on the display area;
 an input unit including a detector configured to detect an operation performed on the display area; and
 at least one processor configured to
  place a movable mode change element adjacent to the first edge or the second edge of the display area,
  scale down the display screen in response to detection of a first operation performed on the mode change element, and
  display the scaled down display screen in a first sub-region of the display area, wherein the first sub-region is adjacent to the first edge when the movable mode change element is adjacent to the first edge when the first operation is detected and is adjacent to the second edge when the movable mode change element is adjacent to the second edge when the first operation is detected, wherein the movable mode change element is not scaled down but changes appearance thereof when the display screen is scaled down, and wherein the at least one processor displays, when accepting an operation performed on a corner of the scaled-down screen, a symbol near the corner such that at least a part of the symbol is located outside the scaled-down screen.

2. The mobile electronic apparatus according to claim 1, wherein
 the display area includes a first area that extends from a predetermined reference line to the first edge and a second area that extends from the predetermined line to the second edge, and
 the at least one processor
  sets a position of the mode change element to the first edge in response to a second operation performed on the first area, and
  sets the position of the mode change element to the second edge in response to the second operation performed on the second area.

3. The mobile electronic apparatus according to claim 2, wherein the at least one processor
 sets, in response to the second operation performed on the first area, a display position of the scaled-down screen in such a manner that the scaled-down screen adjoins the first edge, and
 sets, in response to the second operation performed on the second area, the display position of the sealed-down screen in such a manner that the scaled-down screen adjoins the second edge.

4. The mobile electronic apparatus according to claim 2, wherein the second operation comprises ending of a drag operation performed on the mode change element.

5. The mobile electronic apparatus according to claim 4, wherein the at least one processor sets a size of the scaled-down screen in such a manner that the size increases with decreasing distance between the reference line and an endpoint of the drag operation performed on the mode change element.

6. The mobile electronic apparatus according to claim 1, wherein the at least one processor sets, in response to an input to the input unit, a position of the mode change element in a first direction adjacent to the first edge or the second edge.

7. The mobile electronic apparatus according to claim 6, wherein the at least one processor sets a position of the scaled-down screen in the first direction in accordance with the position of the mode change element in the first direction.

8. The mobile electronic apparatus according to claim 1, wherein
 the detector detects a drag operation performed on one of sides that define an outline of the scale-down screen, and
 the at least one processor sets a position of the scaled-down screen in a first direction adjacent to the first edge or the second edge based on an endpoint of the drag operation performed on the side.

9. The mobile electronic apparatus according to claim 1, wherein
 the detector detects a drag operation performed on a corner of an outline of the scaled-down screen, and
 the at least one processor sets a size of the scaled-down screen based on an endpoint of the drag operation performed on the corner.

10. The mobile electronic apparatus according to claim 1, wherein the at least one processor displays, on the display area, at least one of a first setting element for determining which one of the first edge and the second edge is to adjoin the scaled-down screen, a second setting element for setting a position of the scaled-down screen in a first direction adjacent to the first edge or the second edge, or a third setting element for setting a size of the scaled-down screen.

11. The mobile electronic apparatus according to claim 1, wherein the at least one processor
 displays, on the display area, a plurality of positions adjacent to the first edge and a plurality of positions adjacent to the second edge, and
 sets a position of the mode change element to one of the plurality of positions selected by a user through the input unit.

12. The mobile electronic apparatus according to claim 1, wherein the at least one processor accepts an input for determining which one of the first edge and the second edge is to be adjacent to the mode change element when the detector detects a second operation performed on the mode change element, the second operation being different from the first operation.

13. The mobile electronic apparatus according to claim 1, further comprising a hold orientation detector configured to detect an orientation of the mobile electronic apparatus in a state in which the mobile electronic apparatus is held, wherein
 the display area includes an oblong shape elongated in a longitudinal direction,
 the first edge and the second edge extend along the longitudinal direction, and
 when the mobile electronic apparatus, on which the scaled-down screen is displayed, is held in such a manner that the longitudinal direction is nearly horizontal rather than vertical, the at least one processor scales up the scaled-down screen and then displays the scaled-down screen, which is scaled up, as the display screen on the display area.

14. The mobile electronic apparatus according to claim 13,
wherein when the first operation is performed on the mode change element in the state in which the mobile electronic apparatus is held in such a manner that the longitudinal direction is nearly horizontal rather than vertical, the at least one processor does not scale down the display screen.

15. The mobile electronic apparatus according to claim 1, further comprising a wireless communication unit configured to receive an incoming call signal for a voice call,
wherein when the incoming call signal is received, the at least one processor displays, on the display area, the display screen obtained before an occurrence of a scale-down of the display screen.

16. The mobile electronic apparatus according to claim 1, further comprising a power key that is located closer to the first edge than the second edge and is opposed to one part of the first edge,
wherein the at least one processor
performs, in response to a press down operation performed on the power key, switching between enabling and disabling a standby mode in which the display stops performing display, and
places the mode change element adjacent to the one part of the first edge when the standby mode is disabled in response to the press down operation performed on the power key.

17. The mobile electronic apparatus according to claim 1, wherein the at least one processor displays the symbol such that the symbol is located outside the scaled-down screen.

18. A non-transitory computer readable recording medium configured to store a control program for controlling a mobile electronic apparatus, the control program causing the mobile electronic apparatus to execute the steps of:
placing a movable mode change element adjacent to a first edge or a second edge of a display area included in a display,
scaling down a display screen displayed by the display in response to detection of a first operation performed on the mode change element, and
displaying the scaled down display screen in a first sub-region of the display area,
wherein the first sub-region is adjacent to the first edge when the movable mode change element is adjacent to the first edge when the first operation is detected and adjacent to the second edge when the movable mode change element is adjacent to the second edge when the first operation is detected, wherein the movable mode change element is not scaled down but changes appearance thereof when the display screen is scaled down, and wherein when accepting an operation performed on a corner of the scaled down display screen, a symbol is displayed near the corner such that at least a part of the symbol is located outside the scaled-down screen.

19. A mobile electronic apparatus comprising:
a display including a display area having a first edge and a second edge, the display being configured to display a display screen on the display area;
an input unit including a detector configured to detect an operation performed on the display area; and
at least one processor configured to
place a movable mode change element adjacent to the first edge or the second edge of the display area,
scale down the display screen in response to detection of a first operation performed on the movable mode change element,
display the scale down display screen in a first sub-region of the display area, and
change a position of the scale down display screen on the display area in response to detection of a second operation performed on the scale down display screen, wherein
the first sub-region is adjacent to the first edge when the movable mode change element is adjacent to the first edge when the first operation is detected and
the first sub-region is adjacent to the changed position when the first operation is detected after the second operation is detected and wherein
the movable mode change element is not scaled down but changes appearance thereof when the display screen is scaled down, wherein the at least one processor displays, when accepting an operation performed on a corner of the scaled-down screen, a symbol near the corner such that at least a part of the symbol is located outside the scaled-down screen.

* * * * *